US010272774B2

(12) United States Patent
Hashimoto

(10) Patent No.: US 10,272,774 B2
(45) Date of Patent: Apr. 30, 2019

(54) WORK VEHICLE

(71) Applicant: YANMAR CO., LTD., Osaka-shi, Osaka (JP)

(72) Inventor: Yusuke Hashimoto, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 67 days.

(21) Appl. No.: 15/488,868

(22) Filed: Apr. 17, 2017

(65) Prior Publication Data

US 2017/0217309 A1  Aug. 3, 2017

Related U.S. Application Data

(63) Continuation of application No. PCT/JP2015/078377, filed on Oct. 6, 2015.

(30) Foreign Application Priority Data

Oct. 15, 2014 (JP) .................................. 2014-211118
Apr. 9, 2015 (JP) .................................. 2015-079704

(51) Int. Cl.
*B60K 17/08* (2006.01)
*B60K 5/02* (2006.01)
(Continued)

(52) U.S. Cl.
CPC ................. *B60K 17/08* (2013.01); *B60K 5/02* (2013.01); *B60K 17/06* (2013.01); *B60K 17/10* (2013.01);
(Continued)

(58) Field of Classification Search
CPC .......... B60K 17/08; B60K 5/02; B60K 17/06; B60K 17/22; B60K 17/344; B60K 23/08;
(Continued)

(56) References Cited

U.S. PATENT DOCUMENTS

| 2002/0026853 A1 | 3/2002 | Matsufuji et al. |
| 2007/0193816 A1 | 8/2007 | Hidaka |

(Continued)

FOREIGN PATENT DOCUMENTS

| CN | 103080609 A | 5/2013 |
| EP | 1186801 A | 3/2002 |

(Continued)

OTHER PUBLICATIONS

Chinese Office Action dated Dec. 4, 2018 issued to the corresponding Chinese Patent Application No. 201580052706.5.

*Primary Examiner* — Joseph M Rocca
*Assistant Examiner* — Marlon A Arce
(74) *Attorney, Agent, or Firm* — Norton Rose Fulbright US LLP

(57) ABSTRACT

A work vehicle according to the present invention includes an engine installed in a traveling machine body supported by traveling units, and a transmission case incorporating a hydraulic continuously variable transmission. The transmission case incorporates a forward/backward traveling switching mechanism. The work vehicle includes forward traveling valves for forward traveling hydraulic clutches, a backward traveling valve for a backward traveling hydraulic clutch, and a master valve configured to control hydraulic oil supplying to the forward traveling valves and the backward traveling valve. A part of a hydraulic circuit is formed on a front lid member of the transmission case. The forward traveling valves, the backward traveling valve, and the master valve are attached on a front surface side of the front lid member.

12 Claims, 31 Drawing Sheets

(51) Int. Cl.
*B60K 17/10* (2006.01)
*B60K 17/22* (2006.01)
*B60K 17/344* (2006.01)
*B60K 23/08* (2006.01)
*B60T 11/12* (2006.01)
*B60T 11/28* (2006.01)
*F16H 3/093* (2006.01)
*F16H 3/14* (2006.01)
*F16H 39/42* (2006.01)
*F16H 47/02* (2006.01)
*F16H 57/025* (2012.01)
*F16H 61/00* (2006.01)
*B60K 17/06* (2006.01)
*B60T 1/06* (2006.01)
*B60T 11/21* (2006.01)
*F16H 47/04* (2006.01)
*B60K 17/28* (2006.01)
*F16C 3/03* (2006.01)
*F16H 57/02* (2012.01)

(52) U.S. Cl.
CPC ............ *B60K 17/22* (2013.01); *B60K 17/344* (2013.01); *B60K 23/08* (2013.01); *B60T 1/062* (2013.01); *B60T 11/12* (2013.01); *B60T 11/21* (2013.01); *B60T 11/28* (2013.01); *F16H 3/093* (2013.01); *F16H 3/14* (2013.01); *F16H 39/42* (2013.01); *F16H 47/02* (2013.01); *F16H 47/04* (2013.01); *F16H 57/025* (2013.01); *F16H 61/0009* (2013.01); *B60K 17/28* (2013.01); *B60Y 2200/221* (2013.01); *B60Y 2410/10* (2013.01); *F16C 3/03* (2013.01); *F16H 2057/02056* (2013.01)

(58) Field of Classification Search
CPC .......... B60T 1/062; B60T 11/12; B60T 11/21; B60T 11/28; F16H 3/093; F16H 3/14; F16H 39/42; F16H 47/02; F16H 47/04; F16H 57/025
See application file for complete search history.

(56) References Cited

U.S. PATENT DOCUMENTS

| | | | | |
|---|---|---|---|---|
| 2017/0174075 A1* | 6/2017 | Hashimoto | ............ | A01B 71/02 |
| 2017/0219076 A1* | 8/2017 | Hashimoto | ............ | F16H 61/42 |

FOREIGN PATENT DOCUMENTS

| | | |
|---|---|---|
| JP | 2-199364 A | 8/1990 |
| JP | 10-81255 A | 3/1998 |
| JP | 2002-79839 A | 3/2002 |
| JP | 2006-103430 A | 4/2006 |
| JP | 2006-103593 A | 4/2006 |
| JP | 2007-161051 A | 6/2007 |
| JP | 2009-45989 A | 3/2009 |
| JP | 2010-052734 A | 3/2010 |

* cited by examiner

WORK VEHICLE

CROSS-REFERENCE TO RELATED APPLICATIONS

The present application is a continuation application of International Application No. PCT/JP2015/078377, filed Oct. 6, 2015, which claims priority to Japanese Patent Application No. 2014-211118, filed Oct. 15, 2014 and Japanese Patent Application No. 2015-079704, filed Apr. 9, 2015. The contents of these applications are incorporated herein by reference in their entirety.

BACKGROUND OF THE INVENTION

The present invention relates to a work vehicle.

In conventional work vehicles, such as a tractor and a wheel loader, an engine is mounted on a front portion of a vehicle body frame, a transmission case is coupled to a rear portion of the vehicle body frame, and a traveling machine body is supported by front and rear traveling units. For example, the transmission case incorporates a traveling transmission gear mechanism, a differential gear mechanism, a PTO transmission gear mechanism, and the like. Driving force from the engine on the front side is transmitted to the transmission case on the rear side, and is transmitted to at least the left and right rear traveling units from the differential gear mechanism in the transmission case. The driving force is further transmitted to a working unit, such as a rotary tiller, from the PTO transmission gear mechanism in the transmission case (see, for example Japanese Unexamined Patent Application Publication No. 2010-52734).

In a work vehicle in Japanese Unexamined Patent Application Publication No. 2010-52734, an inline hydraulic continuously variable transmission is assembled in a transmission case. The hydraulic continuously variable transmission includes: a hydraulic pump unit that receives driving force from an engine via an input shaft; and a hydraulic motor unit that transmits a shifted output to rear traveling units and the like via an output shaft. The input shaft and the output shaft are coaxially positioned to form a double shaft. A cylinder block is fit on and integrally rotates with the input shaft. The hydraulic pump unit and the hydraulic motor unit are fit on the input shaft at portions respectively on one side and the other side of the cylinder block.

Some work vehicles include: a forward and backward switching mechanism that switches an output from the hydraulic continuously variable transmission between normal rotation and reverse rotation directions; a double speed driving mechanism that increases the rotation speed of left and right traveling units when a traveling machine body makes a turn while traveling forward; and a brake mechanism that is configured to automatically put a brake to a rear traveling unit on an inner side of the turn when the double speed driving mechanism is operating (see, for example, Japanese Unexamined Patent Application Publication No. H10-81255). In the work vehicle of this type, hydraulic oil from a hydraulic pressure source is supplied to hydraulic devices (hydraulic clutches, hydraulic cylinders, and the like) for the hydraulic continuously variable transmission, the forward and backward switching mechanism, the double speed driving mechanism, the brake mechanism, and the like, so that the mechanisms can operate.

SUMMARY OF THE INVENTION

The above-described hydraulic devices (including control valves therefor) are sporadically provided at various portions of a work vehicle. Thus, a hydraulic system between the hydraulic pressure source and the hydraulic devices is likely to be long and complex. Logically, the long and complex hydraulic system requires a large number of piping work processes that are cumbersome and costly. Furthermore, such a hydraulic system requires a cumbersome maintenance work.

A technical object of the invention according to the present application is to provide an improved work vehicle in view of the current situation described above.

A work vehicle according to one aspect of the present invention includes: an engine installed in a traveling machine body supported by a traveling unit; and a transmission case incorporating a hydraulic continuously variable transmission configured to shift driving force from the engine. The transmission case incorporates a forward/backward traveling switching mechanism configured to switch an output from the hydraulic continuously variable transmission between normal rotation and reverse rotation directions. The engine is installed in a front portion of a frame member forming the traveling machine body. The transmission case is coupled to a rear portion of the frame member. The engine and the transmission case are coupled to each other in a driving-force transmittable manner via a driving force transmission shaft. The work vehicle further includes: a forward traveling valve for a forward traveling hydraulic clutch configured to enable and disable a normal rotation output transmitted toward the traveling unit; a backward traveling valve for a backward traveling hydraulic clutch configured to enable and disable a reverse rotation output transmitted toward the traveling unit; and a master valve configured to control hydraulic oil supplying to the forward traveling valve and the backward traveling valve. A part of a hydraulic circuit establishing connection between the hydraulic pressure source and the hydraulic clutches is formed on a front lid member that is detachably attached to close a front surface opening of the transmission case. The forward traveling valve, the backward traveling valve, and the master valve are attached on a front surface side of the front lid member.

In the work vehicle, the forward traveling valve, the backward traveling valve, and the master valve may be assembled to an oil path block to form a unit, and the oil path block may be attached to the front surface side of the front lid member.

In the work vehicle, the forward traveling hydraulic clutch and the backward traveling hydraulic clutch of the forward/backward traveling switching mechanism may be disposed on a front side in the transmission case.

The work vehicle may further include a main transmission input shaft with which driving force is transmitted into the transmission case from the driving force transmission shaft. The main transmission input shaft may be formed of separate sections including: a front input shaft protruding forward from the front lid member; and a rear input shaft in the transmission case. A coupling may be rotatably fit in an insertion hole, in a form of a through hole formed in the front lid member in a front and rear direction, via a bearing member. The front input shaft and the rear input shaft may be coupled to the coupling in such a manner as to be slidable in the front and rear direction and to be not relatively rotatable. The front input shaft, the bearing member, and the coupling may be able to be pulled out in a forward direction with the rear input shaft remaining in the transmission case.

In the work vehicle, a rear end side of the coupling may be in contact with a flange portion of the rear input shaft. The coupling may be detachably held by the front lid member together with the bearing member with a stopper ring that contacts a front end side of the bearing member fit on an inner circumference side of the insertion hole.

A work vehicle according to another aspect of the present invention includes: an engine installed in a traveling machine body supported by four front and rear wheels; and a transmission case incorporating a hydraulic continuously variable transmission configured to shift driving force from the engine. The transmission case incorporates a two-wheel drive/four-wheel drive switching mechanism configured to switch between two wheel drive and four wheel drive of the four front and rear wheels. The work vehicle includes: a double speed valve for a double speed hydraulic clutch forming the two-wheel drive/four-wheel drive switching mechanism; and a four-wheel drive valve for a four-wheel drive hydraulic clutch forming the two-wheel drive/four-wheel drive switching mechanism. The double speed valve and the four-wheel drive valve are disposed at positions on one of left and right side surfaces of the transmission case overlapping with the double speed hydraulic clutch and the four-wheel drive hydraulic clutch in side view.

In the work vehicle, the transmission case may be divided into three sections including a front case, an intermediate case, and a rear case. The double speed hydraulic clutch and the four-wheel drive hydraulic clutch may be disposed in the front case. The double speed valve and the four-wheel drive valve may be attached to one of left and right surfaces of the front case In the work vehicle, the engine may be installed in the front portion of the frame member forming the traveling machine body. The intermediate case of the transmission case may be coupled to the rear portion of the frame member. A recess portion recessed inward in a left and right direction may be formed on one of left and right sides of the front case. The double speed valve and the four-wheel drive valve may be attached to the recessed portion. The double speed valve and the four-wheel drive valve may have outer sides in the left and right direction covered with the frame member on one of left and right sides.

A work vehicle according to another aspect of the present invention includes: an engine installed in a traveling machine body; a transmission case incorporating a hydraulic continuously variable transmission configured to shift driving force from the engine; and rear traveling units on left and right sides of the transmission case via rear axle cases. Left and right brake mechanisms with which a braking operation is performed on the left and right rear traveling units are disposed in the transmission case. A hydraulic lifting and lowering mechanism is installed on an upper surface of the transmission case. The work vehicle further includes: a pair of brake cylinders with which the brake mechanisms perform the braking operation; and an auto brake valve configured to control hydraulic oil supplying to the brake cylinders. The pair of brake cylinders and the pair of auto brake valves are assembled to a brake control case to form a unit. The brake control case is disposed on a portion of the upper surface of the transmission case more on a front side than the hydraulic lifting and lowering mechanism.

In the work vehicle, the transmission case may be divided into three sections including a front case, an intermediate case, and a rear case. The brake control case may be attached on a front portion of an upper surface of the rear case.

In the work vehicle, the rear case may incorporate: a PTO transmission mechanism with which driving force from the engine is shifted and transmitted to a PTO shaft protruding rearward from the transmission case; and a PTO hydraulic clutch configured to enable and disable transmission of the driving force to the PTO transmission mechanism. A PTO valve with which the PTO hydraulic clutch is operated may be attached to one of left and right side surfaces of the rear case. The brake control case and the PTO valve may be disposed close to each other.

A work vehicle according to the other aspect of the present invention includes: an engine installed in a traveling machine body; and a transmission case incorporating a hydraulic continuously variable transmission configured to shift driving force from the engine. The transmission case incorporates: a PTO transmission mechanism with which driving force from the engine is shifted and transmitted to a PTO shaft protruding rearward from the transmission case; and a PTO hydraulic clutch configured to enable and disable transmission of the driving force to the PTO transmission mechanism. The work vehicle further includes a PTO valve with which the PTO hydraulic clutch is operated. The PTO valve is disposed at a position on one of left and right side surfaces of the transmission case overlapping with the PTO hydraulic clutch in side view.

In the work vehicle, the transmission case may be divided into three sections including a front case, an intermediate case, and a rear case. The PTO hydraulic clutch and the PTO transmission mechanism may be disposed in the rear case. The PTO valve may be attached to one of left and right surfaces of the rear case.

In the work vehicle, the PTO valve may be positioned more on the front side than the rear axle case in the rear case, and on one of left and right side surfaces positioned on a side opposite to the hydraulic pump.

According to the embodiment of the present invention, a work vehicle includes: an engine installed in a traveling machine body supported by a traveling unit; and a transmission case incorporating a hydraulic continuously variable transmission configured to shift driving force from the engine. The transmission case incorporates a forward/backward traveling switching mechanism configured to switch an output from the hydraulic continuously variable transmission between normal rotation and reverse rotation directions. The engine is installed in a front portion of a frame member forming the traveling machine body. The transmission case is coupled to a rear portion of the frame member. The engine and the transmission case are coupled to each other in a driving-force transmittable manner via a driving force transmission shaft. The work vehicle further includes: a forward traveling valve for a forward traveling hydraulic clutch configured to enable and disable a normal rotation output transmitted toward the traveling unit; a backward traveling valve for a backward traveling hydraulic clutch configured to enable and disable a reverse rotation output transmitted toward the traveling unit; and a master valve configured to control hydraulic oil supplying to the forward traveling valve and the backward traveling valve. A part of a hydraulic circuit establishing connection between the hydraulic pressure source and the hydraulic clutches is formed on a front lid member that is detachably attached to close a front surface opening of the transmission case. The forward traveling valve, the backward traveling valve, and the master valve are attached on a front surface side of the front lid member. Thus, the forward traveling valve, the backward traveling valve, and the master valve can be disposed with a dead space between the engine and the transmission case effectively utilized, whereby space saving can be achieved.

According to the embodiment of the present invention, the forward traveling valve, the backward traveling valve, and the master valve are assembled to an oil path block to form a unit, and the oil path block is attached to the front surface side of the front lid member. Thus, a compact hydraulic system related to the traveling of the work vehicle can be achieved. Assembling processes for the hydraulic system related to the traveling can be reduced in a manufacturing line for the work vehicle. The forward traveling valve, the backward traveling valve, and the master valve can be attached to and detached from the front surface side of the front lid member by attaching and detaching the oil path block, whereby a maintainability of the valves can be improved.

According to the embodiment of the present invention, the forward traveling hydraulic clutch and the backward traveling hydraulic clutch of the forward/backward traveling switching mechanism are disposed on a front side in the transmission case. Thus, a group of the valves and a group of the hydraulic clutches can be arranged closed to each other in the front and rear direction. Thus, the group of the valves and the group of the hydraulic clutches can be connected to each other with the hydraulic piping having a short length, whereby the hydraulic piping can be provided with a simple routing and a hydraulic pressure loss can be reduced.

According to the embodiment of the present invention, the work vehicle further includes a main transmission input shaft with which driving force is transmitted into the transmission case from the driving force transmission shaft. The main transmission input shaft is formed of separate sections including: a front input shaft protruding forward from the front lid member; and a rear input shaft in the transmission case. A coupling is rotatably fit in an insertion hole, in a form of a through hole formed in the front lid member in a front and rear direction, via a bearing member. The front input shaft and the rear input shaft are coupled to the coupling in such a manner as to be slidable in the front and rear direction and to be not relatively rotatable. The front input shaft, the bearing member, and the coupling are able to be pulled out in a forward direction with the rear input shaft remaining in the transmission case. Thus, the front input shaft, the bearing member, and the coupling can be in a form of a unit to be attached to and detached from the front lid member of the transmission case. For example, when the maintenance work such as cleaning of the portion around the main transmission input shaft is performed, the input unit including the front input shaft, the bearing member, and the coupling can be easily replaced with the rear input shaft remaining in the transmission case. Thus, even when the bearing member and the like are damaged by muddy water entering from the side of the front input shaft, the transmission case needs not to be disassembled. Instead, only the input unit including the front input shaft, the bearing member, and the coupling needs removed to be replaced or for performing cleaning. All things considered, much higher assemblability/disassemblability of the driving force input system with respect to the transmission case 17 can be achieved.

According to the embodiment of the present invention, a work vehicle includes: an engine installed in a traveling machine body supported by four front and rear wheels; and a transmission case incorporating a hydraulic continuously variable transmission configured to shift driving force from the engine. The transmission case incorporates a two-wheel drive/four-wheel drive switching mechanism configured to switch between two wheel drive and four wheel drive of the four front and rear wheels. The work vehicle includes: a double speed valve for a double speed hydraulic clutch forming the two-wheel drive/four-wheel drive switching mechanism; and a four-wheel drive valve for a four-wheel drive hydraulic clutch forming the two-wheel drive/four-wheel drive switching mechanism. The double speed valve and the four-wheel drive valve are disposed at positions on one of left and right side surfaces of the transmission case overlapping with the double speed hydraulic clutch and the four-wheel drive hydraulic clutch in side view. Thus, the group of the valves and the group of the hydraulic clutches can be connected to each other with the hydraulic piping having a short length, whereby the hydraulic piping can be provided with a simple routing and a hydraulic pressure loss can be reduced.

According to the embodiment of the present invention, the transmission case is divided into three sections including a front case, an intermediate case, and a rear case. The double speed hydraulic clutch and the four-wheel drive hydraulic clutch are disposed in the front case. The double speed valve and the four-wheel drive valve are attached to one of left and right surfaces of the front case. The engine is installed in the front portion of the frame member forming the traveling machine body. The intermediate case of the transmission case is coupled to the rear portion of the frame member. A recess portion recessed inward in a left and right direction is formed on one of left and right sides of the front case. The double speed valve and the four-wheel drive valve are attached to the recessed portion. The double speed valve and the four-wheel drive valve have outer sides in the left and right direction covered with the frame member on one of left and right sides. Thus, the front case of the transmission case and one of the left and right frame members sandwich the left and right sides of the double speed valve and the four-wheel drive valve, whereby the double speed valve and the four-wheel drive valve can be protected with the front case of the transmission case and one of the left and right frame members. All things considered, a risk of mud of a paddy and the like making the double speed valve and the four-wheel drive valve dirty or damaged can be reduced.

According to the embodiment of the present invention, a work vehicle includes: an engine installed in a traveling machine body; a transmission case incorporating a hydraulic continuously variable transmission configured to shift driving force from the engine; and rear traveling units provided on left and right sides of the transmission case via rear axle cases. Left and right brake mechanisms with which a braking operation is performed on the left and right rear traveling units are disposed in the transmission case. A hydraulic lifting and lowering mechanism is installed on an upper surface of the transmission case. The work vehicle further includes: a pair of brake cylinders with which the brake mechanisms perform the braking operation; and an auto brake valve configured to control hydraulic oil supplying to the brake cylinders. The pair of brake cylinders and the pair of auto brake valves are assembled to a brake control case to form a unit. The brake control case is disposed on a portion of the upper surface of the transmission case more on a front side than the hydraulic lifting and lowering mechanism. Thus, the brake control case in which the pair of brake cylinders and the pair of auto brake valves are assembled can be disposed with the dead space on the upper surface of the transmission case effectively utilized, whereby space saving can be achieved. Thus, a compact hydraulic system related to the braking of the work vehicle can be achieved. Assembling processes for the hydraulic system related to the braking can be reduced in a manufacturing line for the work vehicle. The pair of brake cylinders and the pair of auto brake valves can be attached to and detached from the portion on the upper surface of the transmission case more on the front side than the hydraulic lifting and lowering mechanism by attaching and detaching the brake control case. Thus, the maintainability of the brake control case can be improved.

According to the embodiment of the present invention, the transmission case is divided into three sections including a front case, an intermediate case, and a rear case. The brake control case is attached on a front portion of an upper surface of the rear case. The rear case incorporates: a PTO transmission mechanism with which driving force from the engine is shifted and transmitted to a PTO shaft protruding rearward from the transmission case; and a PTO hydraulic clutch configured to enable and disable transmission of the driving force to the PTO transmission mechanism. A PTO valve with which the PTO hydraulic clutch is operated is attached to one of left and right side surfaces of the rear case. The brake control case and the PTO valve are disposed close to each other. Thus, the common hydraulic piping can be provided for the brake control case and the PTO valve. The brake control case and the PTO valve can be connected to each other with the hydraulic piping having a short length. Thus, the hydraulic piping can be provided with a simple routing and a compact hydraulic system can be achieved in the work vehicle as a whole. Furthermore, a hydraulic pressure loss can be reduced.

According to the embodiment of the present invention, a work vehicle includes: an engine installed in a traveling machine body; and a transmission case incorporating a hydraulic continuously variable transmission configured to shift driving force from the engine. The transmission case incorporates: a PTO transmission mechanism with which driving force from the engine is shifted and transmitted to a PTO shaft protruding rearward from the transmission case; and a PTO hydraulic clutch configured to enable and disable transmission of the driving force to the PTO transmission mechanism. The work vehicle further includes a PTO valve with which the PTO hydraulic clutch is operated. The PTO valve is disposed at a position on one of left and right side surfaces of the transmission case overlapping with the PTO hydraulic clutch in side view. Thus, the PTO valve and the PTO hydraulic clutch are closely arranged, whereby the PTO valve and the PTO hydraulic clutch can be connected to each other with the hydraulic piping having a short length. Thus, the hydraulic piping can be provided with a simple routing and a hydraulic pressure loss can be reduced.

A work vehicle according to the embodiment of the present invention, the transmission case is divided into three sections including a front case, an intermediate case, and a rear case. The PTO hydraulic clutch and the PTO transmission mechanism are disposed in the rear case. The PTO valve is attached to one of left and right surfaces of the rear case. The PTO valve is positioned more on the front side than the rear axle case in the rear case, and on one of left and right side surfaces positioned on a side opposite to the hydraulic pump. Thus, the hydraulic pump and the PTO valve are separately arranged on the left and right sides of the rear case. Thus, the hydraulic pump and the PTO valve can be efficiently arranged with the portion on the front side of the rear axle case where the work space can be easily provided effectively utilized. All things considered, the maintenance work for the hydraulic pump and the PTO valve can be easily performed on the front side of the rear axle case.

DESCRIPTION OF THE EMBODIMENTS

Figure 1:
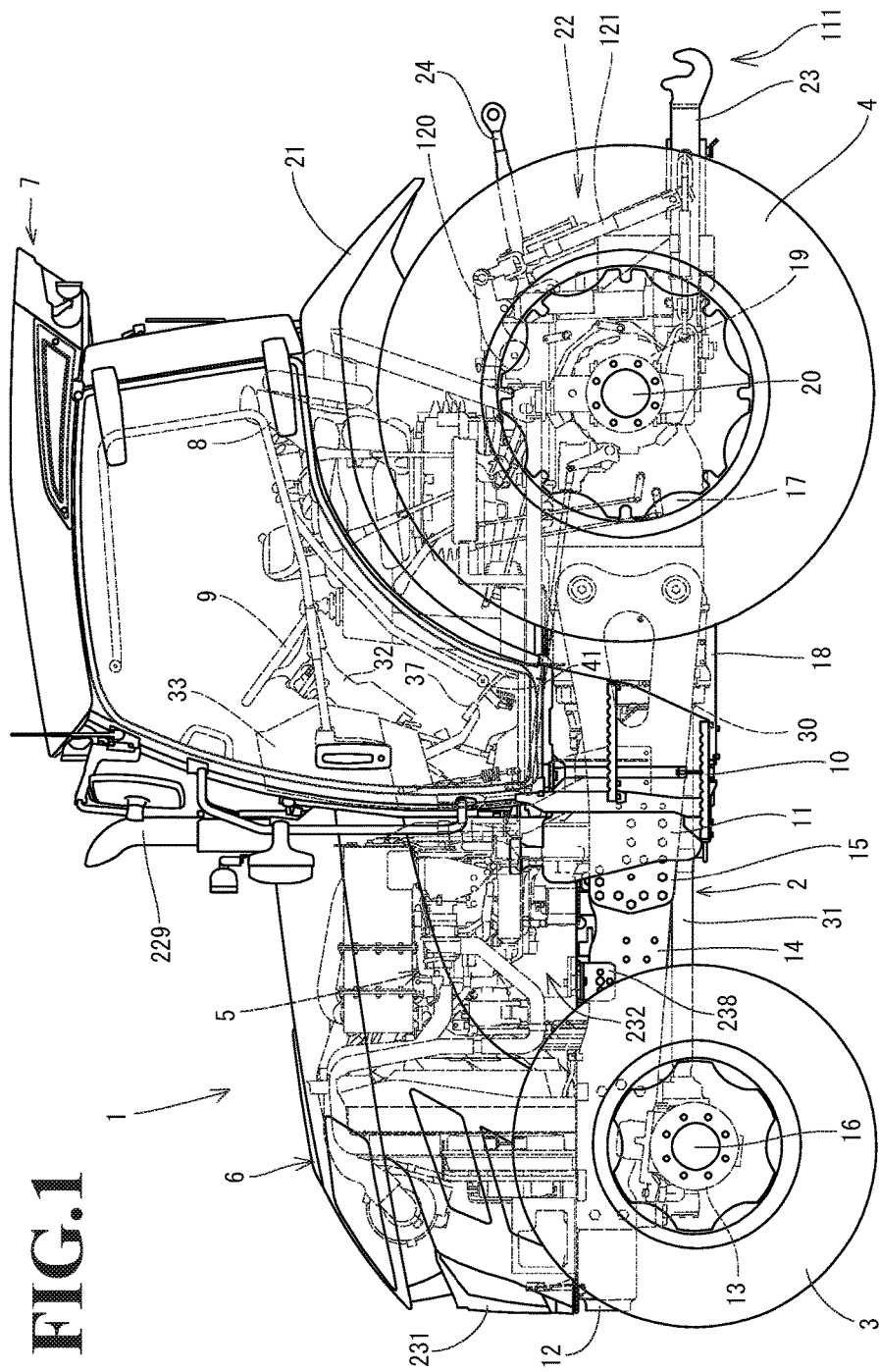
FIG. 1 is a left side view of a tractor.

A farming tractor as an embodiment of the present invention is described below with reference to the drawings. As illustrated in FIG. 1 to FIG. 8, a traveling machine body 2 of a tractor 1 is supported with a pair of left and right front wheels 3 as a traveling unit and with a pair of left and right rear wheels 4 corresponding to a rear traveling unit. A diesel engine 5 (hereinafter, simply referred to as an engine) is mounted on a front portion of the traveling machine body 2 and drives the rear wheels 4 or the front wheels 3, so that the tractor 1 can travel forward and backward. The engine 5 is covered by a hood 6. The traveling machine body 2 has an upper surface provided with a cabin 7. The cabin 7 incorporates an operating seat 8 and a steering wheel 9 for performing a steering operation for the front wheels 3. Steps 10 with which an operator gets on and off the vehicle are provided to left and right outer sides of the cabin 7. Fuel tanks 11 for supplying fuel to the engine 5 are disposed on a lower side of a bottom portion of the cabin 7.

The traveling machine body 2 includes: an engine frame 14 including a front bumper 12 and a front axle casing 13; and left and right vehicle body frames 15 detachably fixed to a rear portion of the engine frame 14. A front axle 16 rotatably protrudes outward from both left and right ends of the front axle casing 13. The front wheels 3 are attached to the both left and right ends of the front axle casing 13 via the front axle 16. A transmission case 17 is coupled to the rear portions of the vehicle body frames 15. The transmission case 17 shifts the rotary driving force from the engine 5 as appropriate, and transmits the force to the four front and rear wheels 3, 3, 4, and 4. A tank frame 18 having a rectangular plate shape in bottom view and protruding outward toward the left and right is fastened to a lower surface side of the transmission case 17 and the left and right vehicle body frames 15 with bolts. In this embodiment, the fuel tanks 11 include two left and right tanks. The left and the right fuel tanks 11 are respectively mounted on the upper surface sides of the left and right protruding portions of the tank frame 18. Left and right rear axle cases 19 are mounted to left and right outer side surfaces of the transmission case 17 while protruding outward. Left and right rear axles 20 are rotatably inserted in the left and right rear axle cases 19. The rear wheels 4 are attached to the transmission case 17 via the rear axles 20. The left and the right rear wheels 4 have upper sides covered with left and right rear fenders 21.

A hydraulic lifting and lowering mechanism 22 that can lift and lower a ground work machine (not illustrated), such as a rotary tiller for example, is detachably attached to a rear portion of the transmission case 17. The ground work machine is coupled to the rear portion of the transmission case 17 via a three-point linkage mechanism 111 including a pair of left and right lower links 23 and a top link 24. A power-take off (PTO) shaft 25 protrudes rearward from a rear side surface of the transmission case 17 and is used for transmitting a PTO driving force to the work machine such as a rotary tiller.

A flywheel 26 is attached to be directly coupled to an output shaft (piston rod) of the engine 5 that protrudes rearward from a rear side surface of the engine 5 (see FIGS. 4 to 6, FIG. 10, and FIG. 11). A main driving shaft 27 protruding rearward from the flywheel 26 and a main transmission input shaft 28 protruding forward from a front surface side of the transmission case 17 are coupled to each other via a driving force transmission shaft 29 including universal joints on both ends (see FIGS. 4 to 6). The transmission case 17 incorporates a hydraulic continuously variable transmission 500, a forward/backward traveling switching mechanism 501, a traveling transmission gear mechanism, and a rear wheel differential gear mechanism 506. The rotary driving force from the engine 5 is transmitted to the main transmission input shaft 28 of the transmission case 17 via the main driving shaft 27 and the driving force transmission shaft 29, and appropriate shifting is achieved with the hydraulic continuously variable transmission 500 and the traveling transmission gear mechanism, and the resultant shifted driving force is transmitted to the left and right rear wheels 4 via the rear wheel differential gear mechanism 506.

A front wheel output shaft 30 protruding forward from a lower portion of a front surface of the transmission case 17 is coupled to a front wheel transmission shaft 508 protruding rearward from the front axle casing 13 incorporating a front wheel differential gear mechanism 507, via a front wheel driving shaft 31. The shifted driving force, obtained by the hydraulic continuously variable transmission 500 and the traveling transmission gear mechanism in the transmission case 17, is transmitted to the left and right front wheels 3 from the front wheel output shaft 30, the front wheel driving shaft 31 and the front wheel transmission shaft 508, via the front wheel differential gear mechanism 507 in the front axle casing 13.

Next, an internal structure of the cabin 7 is described with reference to figures such as FIGS. 3, 7, and 8. A steering column 32 is disposed on a front side of the operating seat 8 in the cabin 7. The steering column 32 stands while being buried on a rear surface side of a dashboard 33 disposed on a front surface side in the cabin 7. The steering wheel 9 having a substantially circular shape in plan view is attached to an upper end side of a steering shaft protruding upward from an upper surface of the steering column 32.

A pair of left and right brake pedals 35 used for performing a braking operation for the traveling machine body 2 are disposed on the right side of the steering column 32. A forward and backward travel switching lever 36 (reverser lever) and a clutch pedal 37 are disposed on the left side of the steering column 32. The forward and backward travel switching lever 36 is used for switching the traveling direction of the traveling machine body 2 between forward and backward. The clutch pedal 37 is used for performing disengagement operation for a clutch (not illustrated) for driving force engagement/disengagement.

A misoperation preventing member 38 (reverser guard), which is disposed below and extends along the forward and backward travel switching lever 36, is disposed on the left side of the steering column 32. The misoperation preventing member 38 as a contact prevention member is disposed below the forward and backward travel switching lever 36 so that the operator getting on and off the tractor 1 can be prevented from accidentally being in contact with the forward and backward travel switching lever 36. An operation display board 39, incorporating a liquid crystal panel, is disposed on the upper portion side of a back surface of the dashboard 33.

An acceleration pedal 41 is disposed on the right side of the steering column 32 on a floor plate 40 in front of the operating seat 8 in the cabin 7. The acceleration pedal 41 is used for controlling an engine speed of the engine 5, a vehicle speed, or the like. The floor plate 40 has an upper surface that is flat substantially over the entire area. Side columns 42 are disposed on left and right sides of the operating seat 8. A parking brake lever 43, an ultra-low speed lever 44 (creep lever), a sub transmission lever 45, and a PTO transmission lever 46 are disposed between the operating seat 8 and the left side column 42. The parking brake lever 43 is used for executing an operation of maintaining a braking state of both left and right rear wheels 4. The ultra-low speed lever 44 (creep lever) is used for forcibly and largely reducing the traveling speed (vehicle speed) of the tractor 1. The sub transmission lever 45 is used for switching an output range of a traveling sub transmission gear mechanism in the transmission case 17. The PTO transmission lever 46 is used for performing a switching operation for a driving speed of the PTO shaft 25. A diff-lock pedal 47, for activating and deactivating differential driving of both left and right rear wheels 4 is disposed on the lower side of the operating seat 8. A reverse PTO lever 48 for causing reverse driving of the PTO shaft 25 is disposed on the rear-left side of the operating seat 8.

An arm rest 49 where the arm or the elbow of the operator seated on the operating seat 8 rests is disposed between the operating seat 8 and the left side column 42. The arm rest 49 is provided separately from the operating seat 8, and includes a main transmission lever 50 and a work machine position dial 51 (lifting and lowering dial). The main transmission lever 50 is used for increasing and reducing the traveling speed of the tractor 1. The work machine position dial 51 is a dial with which the height position of the ground work machine, such as a rotary tiller, is manually changed and adjusted. The arm rest 49 is configured to be pivotable about its rear end lower portion to be raised by a plurality of stages.

A throttle lever 52, a PTO clutch switch 53, and a plurality of hydraulic operation levers 54 (SCV levers) are disposed in order from the front side on the left side column 42. The throttle lever 52 is used for setting and maintaining the engine speed of the engine 5. The PTO clutch switch 53 is for performing an engagement/disengagement operation for driving force transmission from the PTO shaft 25 to the work machine such as a rotary tiller. The plurality of hydraulic operation levers 54 (SCV levers) are used for performing a switching operation for a hydraulic pressure output valve 430 (see FIG. 14) disposed on the upper surface side of the transmission case 17. The hydraulic pressure output valve 430 is used for controlling supplying of hydraulic oil to a hydraulic device of another work machine, such as a front loader retrofitted to the tractor 1. In the embodiment, the number of the hydraulic operation levers 54 is four so as to be the same as the number of (four) the hydraulic pressure output valves.

As illustrated in figures such as FIGS. 9 to 12, left and right front supporting platforms 96 that support the front side of the cabin 7 and left and right rear supporting platforms 97 that support a rear portion of the cabin 7 are provided. The front supporting platforms 96 are bolted onto intermediate portions of vehicle outer side surfaces of the left and right vehicle body frames 15 in a front and rear direction. The cabin 7 has front side bottom portions supported on the upper surface sides of the front supporting platforms 96 in a vibration proof manner via anti-vibration rubber piece members 98. The rear supporting platforms 97 are bolted on left and right intermediate portions of the upper surfaces of the left and right rear axle cases 19, in a width direction. The rear axle cases 19 extend horizontally in a left and right direction. The cabin 7 has rear side bottom portions supported on the upper surface sides of the rear supporting platforms 97 in a vibration proof manner via anti-vibration rubber piece members 99. As illustrated in figures such as FIGS. 4 and 5, the rear supporting platforms 97 are disposed on the upper surface side of the rear axle cases 19. An anti-vibration bracket 101 is disposed on the lower surface side of the rear axle case 19, and is fastened to the rear supporting platform 97 with a bolt. A stopper rod member 103, with a turnbuckle that can be adjusted to extend and contract, has both end portions coupled to intermediate portions of the lower links 23, extending in the front and rear direction, and the anti-vibration bracket 101. Thus, swing vibrations of the lower links 23 in the left and right direction are prevented.

Next, the diesel engine 5 below the hood 6 and an engine compartment structure are described with reference to figures such as FIGS. 4 to 8. The diesel engine 5 has a cylinder head mounted on a cylinder block incorporating an engine output shaft and a piston. The diesel engine 5 (cylinder head) has a right side surface provided with an intake manifold 203 and an EGR device 210. The intake manifold 203 is coupled to an air cleaner 221 via a turbo supercharger 211. The EGR device 210 partially recirculates exhaust gas from an exhaust manifold 204. When the exhaust gas discharged to the exhaust manifold 204 partially recirculates to the intake manifold 203, the maximum combustion temperature at the time of high load driving is reduced, whereby an amount of nitrogen oxides (NOx) discharged from the diesel engine 5 is reduced. The diesel engine 5 (cylinder head) has a left side surface provided with the exhaust manifold 204 coupled to a tail pipe 229 and the turbo supercharger 211. Thus, the engine 5 has the intake manifold 203 and the exhaust manifold 204 respectively arranged on the left and right side surfaces along the engine output shaft. A cooling fan 206 is disposed on the front surface side of the diesel engine 5 (cylinder block).

As illustrated in figures such as FIGS. 4 to 8, the diesel engine 5 includes a continuously regenerating exhaust gas purifying device 224 (DPF) disposed on the upper surface side (above the exhaust manifold 204) of the diesel engine 5. The exhaust gas purifying device 224 has an exhaust side coupled to the tail pipe 229. The exhaust gas purifying device 224 removes particulate matters (PM), and reduces carbon oxide (CO) and hydrogen carbon (HC) in the exhaust gas discharged from the engine 5 to the outside of the vehicle through the tail pipe 229.

Figure 2:
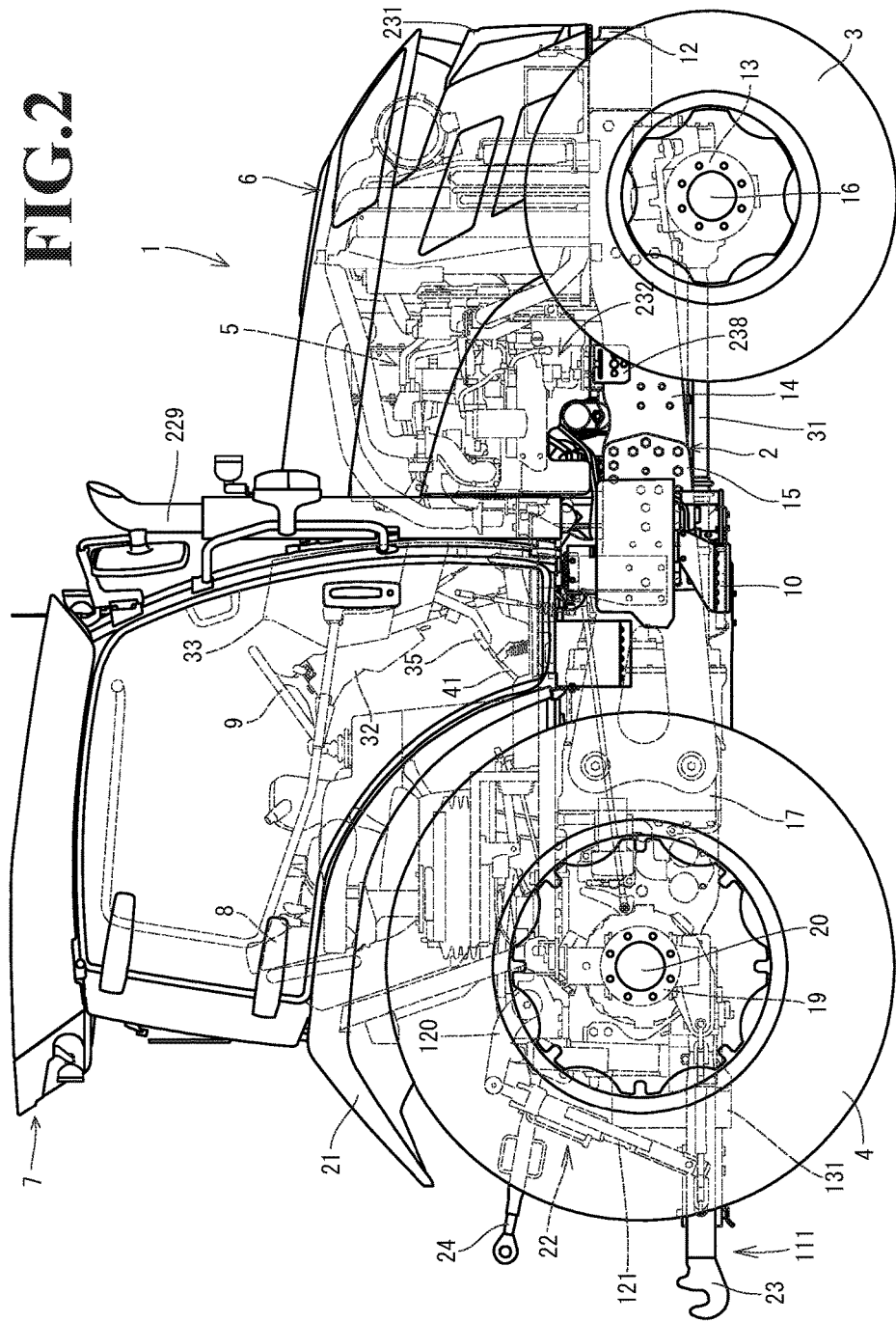
FIG. 2 is a right side view of the tractor.
Figure 3:
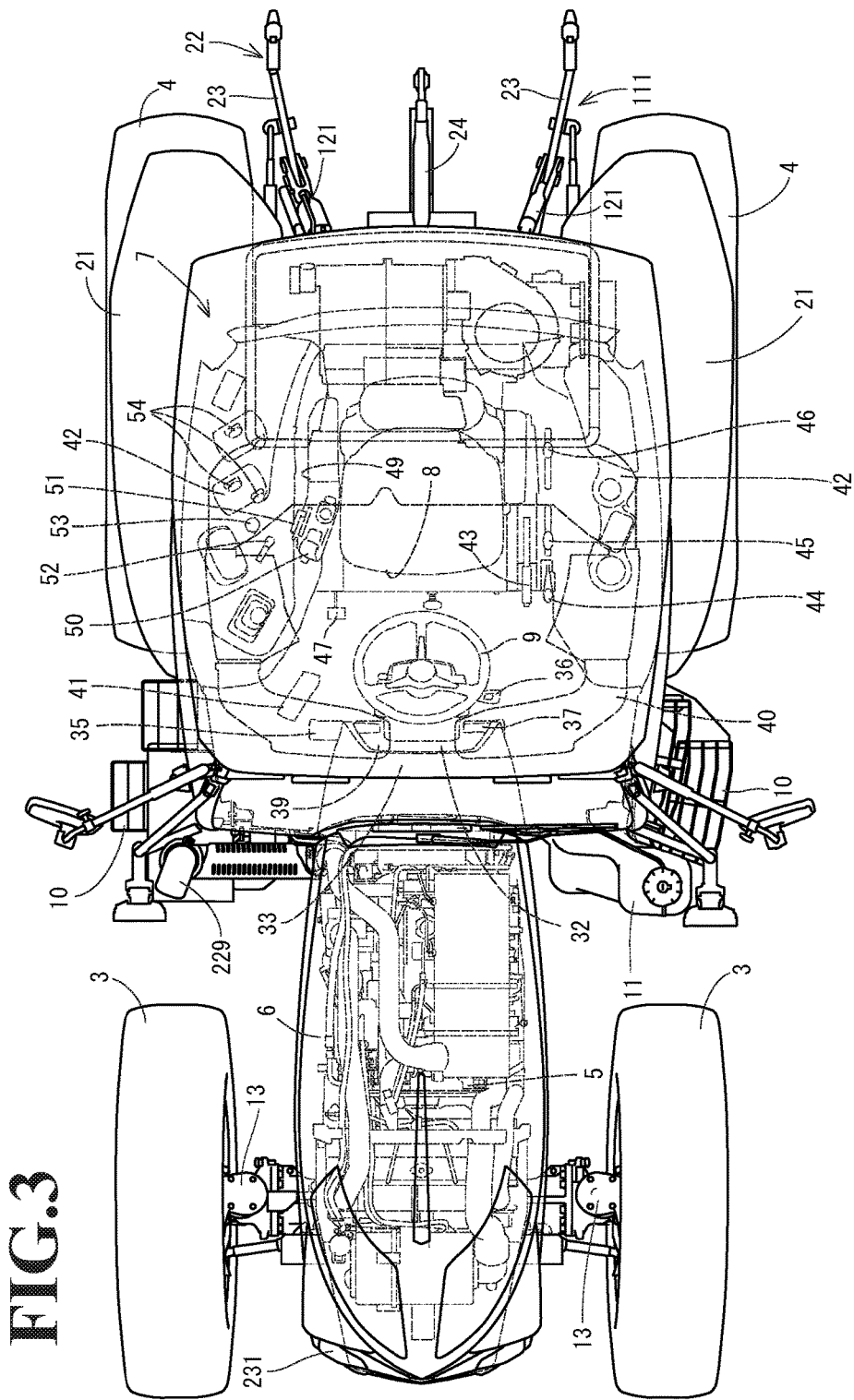
FIG. 3 is a plan view of the tractor.

As illustrated in figures such as FIGS. 1 to 3, the hood 6 has a front portion having the lower side provided with a front grille 231 covering the upper surface side and the front surface side of an engine compartment 200. Side engine covers 232 formed of porous plates are disposed on left and right lower sides of the hood 6 to cover left and right sides of the engine compartment 200. Thus, the hood 6 and the engine covers 232 cover the front, upper, left, and right sides of the diesel engine 5.

A radiator 235 having a rear surface side on which a fan shroud 234 is attached stands on the engine frame 14 to be positioned on the front surface side of the engine 5 as illustrated in FIGS. 4 to 8. The fan shroud 234 surrounds the outer circumference side of the cooling fan 206, and establishes a communication between the radiator 235 and the cooling fan 206. The air cleaner 221 is provided on an upper position of the front surface of the radiator 235. The front surface side of the radiator 235 is provided with the intercooler described above, as well as oil and fuel coolers and the like.

As illustrated in figures such as FIGS. 9 to 12, the pair of left and right vehicle body frames 15 are coupled to each other via a supporting beam frame 236. The supporting beam frame 236 is bolted onto each of the left and right vehicle body frames 15 to bridge between front end portions (rear surface side of the engine 5) of the left and right vehicle body frames 15. The diesel engine 5 has a rear portion coupled to the upper surface of the supporting beam frame 236 via engine legs with anti-vibration rubber pieces. As illustrated in FIGS. 1, 2, 4, 5, 11, and 12, the left and right side surfaces of the front portion of the diesel engine 5 are coupled to intermediate portions of the pair of left and right engine frames 14, via left and right front engine legs 238 having anti-vibration rubber pieces. Thus, the diesel engine 5 has the front side supported in a vibration proof manner by the engine frame 14, and has a rear portion supported in a vibration proof manner by the front end side of the pair of left and right vehicle body frames 15 via the supporting beam frame 236.

Next, an attachment structure for the transmission case 17, the hydraulic lifting and lowering mechanism 22, and the three-point linkage mechanism 111 will be described with reference to FIGS. 4 to 12. The transmission case 17 includes: a front transmission case 112 including the main transmission input shaft 28 and the like; a rear transmission case 113 including the rear axle case 19 and the like; and an intermediate case 114 that couples the front side of the rear transmission case 113 to the rear side of the front transmission case 112. The left and right vehicle body frames 15 have rear end portions coupled to the left and right side surfaces of the intermediate case 114 via left and right upper and lower vehicle body coupling shaft members 115 and 116. The left and right vehicle body frames 15 have rear end portions coupled to the left and right side surfaces of the intermediate case 114 via the two upper vehicle body coupling shaft members 115 and the two lower vehicle body coupling shaft members 116. Thus, the vehicle body frames 15 and the transmission case 17 are integrated for forming the rear portion of the traveling machine body 2. The front transmission case 112, the driving force transmission shaft 29, or the like is provided between the left and right vehicle body frames 15, whereby the front transmission case 112 or the like is protected. The left and the right rear axle cases 19 are attached on both the left and right sides of the rear transmission case 113 in such a manner as to protrude outward. In the embodiment, the intermediate case 114 and the rear transmission case 113 are made of cast iron and the front transmission case 112 is made of die-cast aluminum.

In the configuration described above, the transmission case 17 is divided into three sections of the front transmission case 112, the intermediate case 114, and the rear case 113. Thus, the transmission case 17 can be assembled accurately and efficiently with the front transmission case 112, the intermediate case 114, and the rear transmission case 113 provided with parts such as a shaft and a gear in advance, and then assembled.

The left and the right rear axle cases 19 are attached to left and right sides of the rear transmission case 113. The intermediate case 114 coupling the front transmission case 112 and the rear transmission case 113 to each other is coupled to the left and right vehicle body frames 15 forming the traveling machine body 2. Thus, for example, only the front transmission case 112 can be detached, for performing operations such as replacement of the shaft and the gear, with the intermediate case 114 and the rear transmission case 113 remaining attached to the vehicle body frames 15. Thus, the transmission case 17 as a whole is much less frequently removed (detached) from the tractor 1, whereby the maintenance and repairing can be performed with much higher operability.

The intermediate case 114 and the rear transmission case 113 are made of case iron, and the front transmission case 112 is made of die-cast aluminum. Thus, the intermediate case 114 coupled to the vehicle body frames 15 and the rear transmission case 113 to which the left and right rear axle cases 19 are coupled can be formed as highly rigid members forming the traveling machine body 2. The front transmission case 112 is not a rigid member but can have a light weight. All things considered, the transmission case 17 as a whole can be made to have a light weight, with sufficient rigidity of the traveling machine body 2 guaranteed.

As illustrated in FIGS. 4 to 12, the hydraulic lifting and lowering mechanism 22 includes left and right hydraulic lift cylinders 117, left and right lift arms 120, and left and right lift rods 121. The hydraulic lift cylinders 117 are operated and controlled in accordance with an operation on the work machine position dial 51 or the like. The lift arms 120 have base end sides pivotally supported by an openable upper surface lid member 118, provided on the side of the upper surface of the rear transmission case 113 in the transmission case 17, via a lift supporting shaft 119. The left and right lift rods 121 couple the left and right lift arms 120 to the left and right lower links 23. The right lift rod 121 is partially formed of a horizontal cylinder 122 for hydraulic control, and thus the length of the right lift rod 121 can be adjusted to be increased or reduced with the horizontal cylinder 122.

Figure 7:
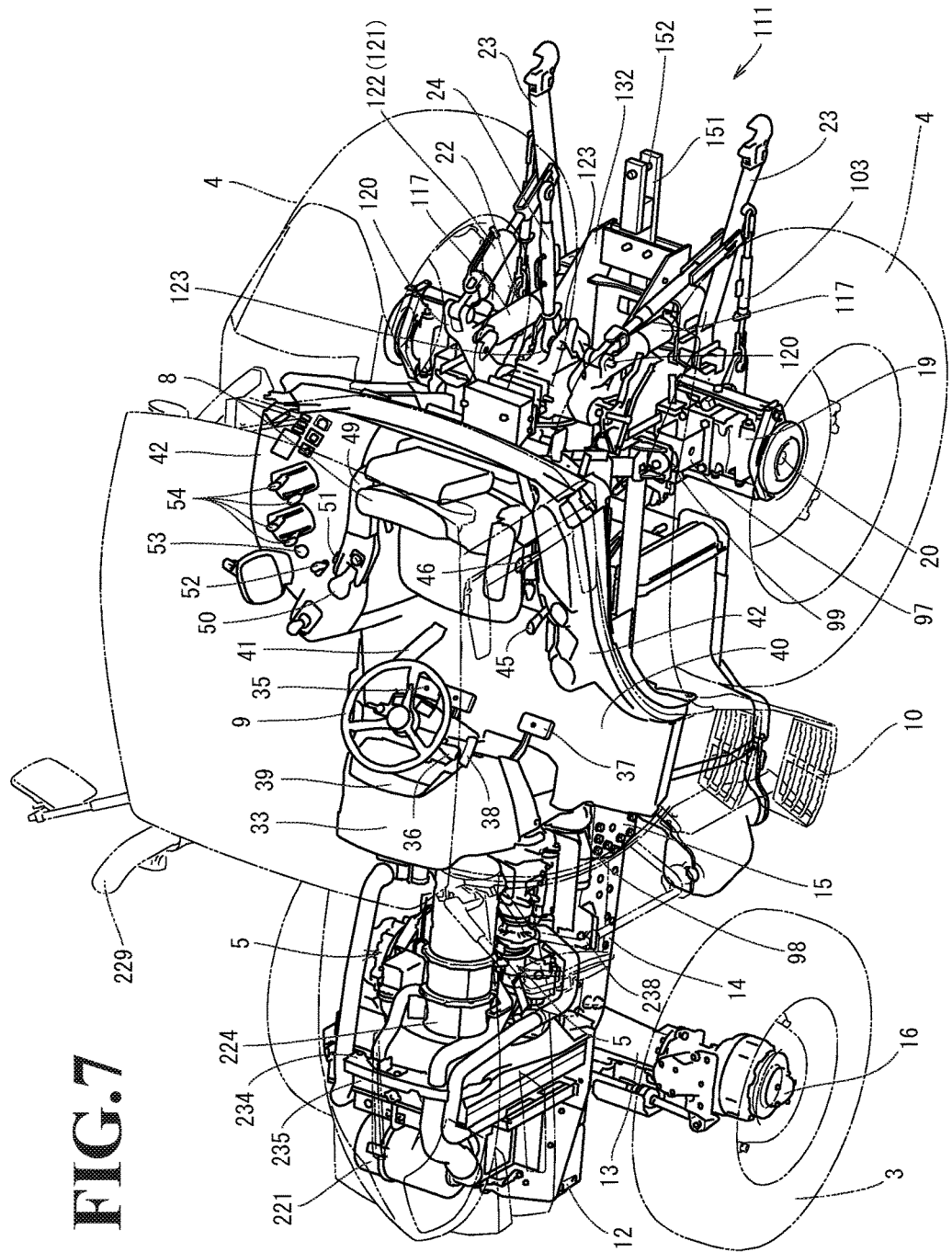
FIG. 7 is a perspective view of the traveling machine body as diagonally viewed from a rear left side.
Figure 8:
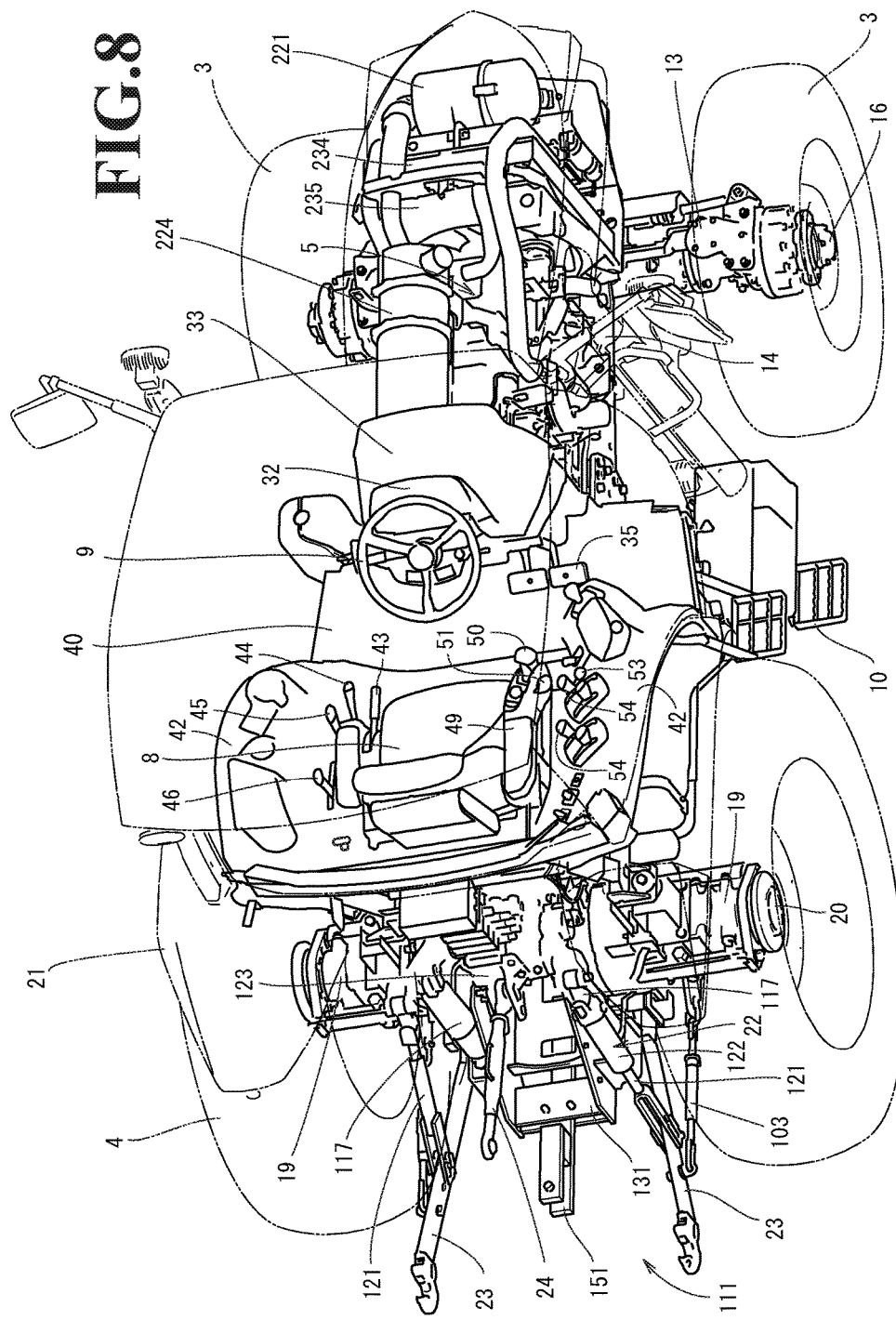
FIG. 8 is a perspective view of the traveling machine body as diagonally viewed from a rear right side.
Figure 9:
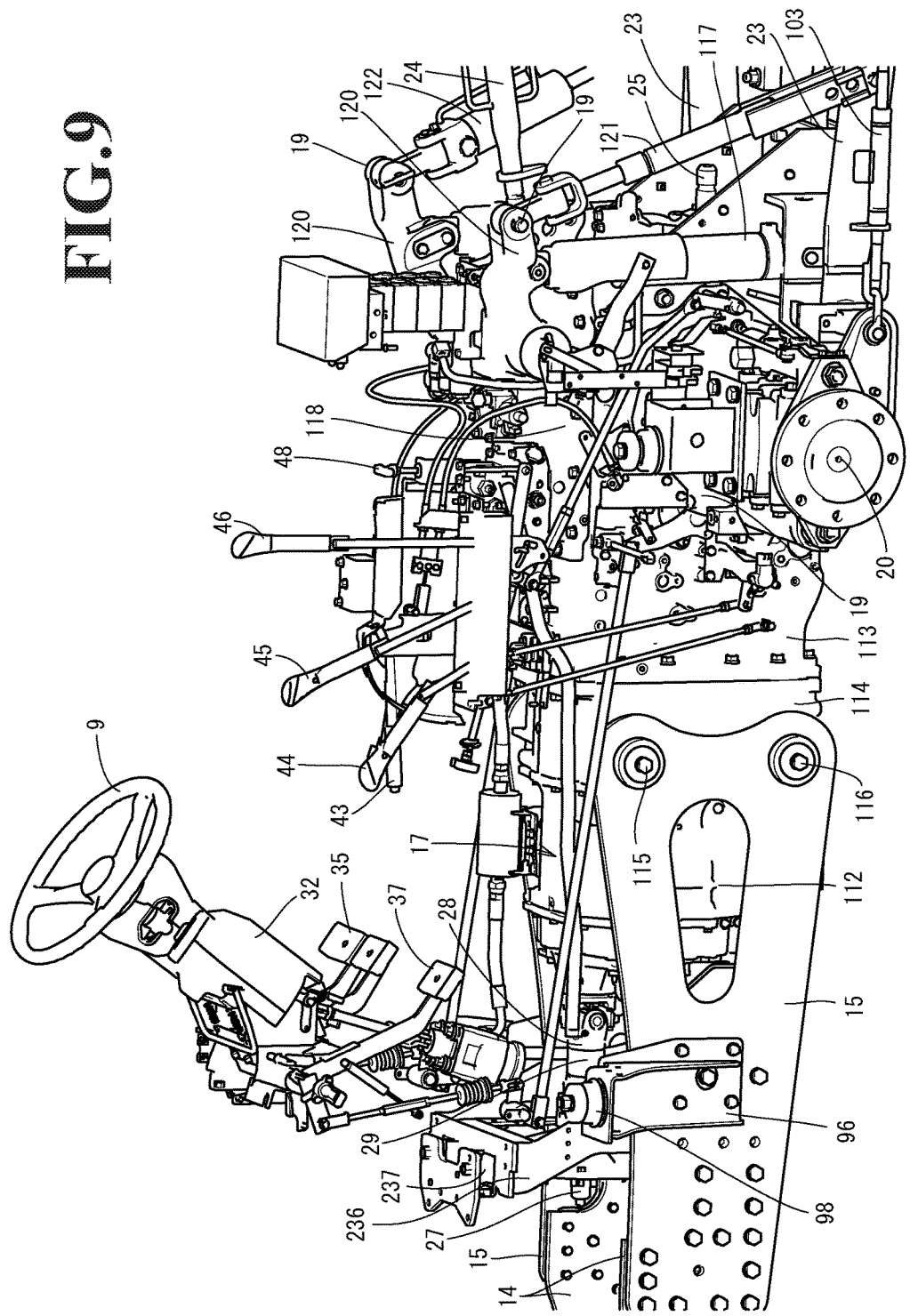
FIG. 9 is an enlarged perspective view of the traveling machine body as viewed from the left side.
Figure 10:
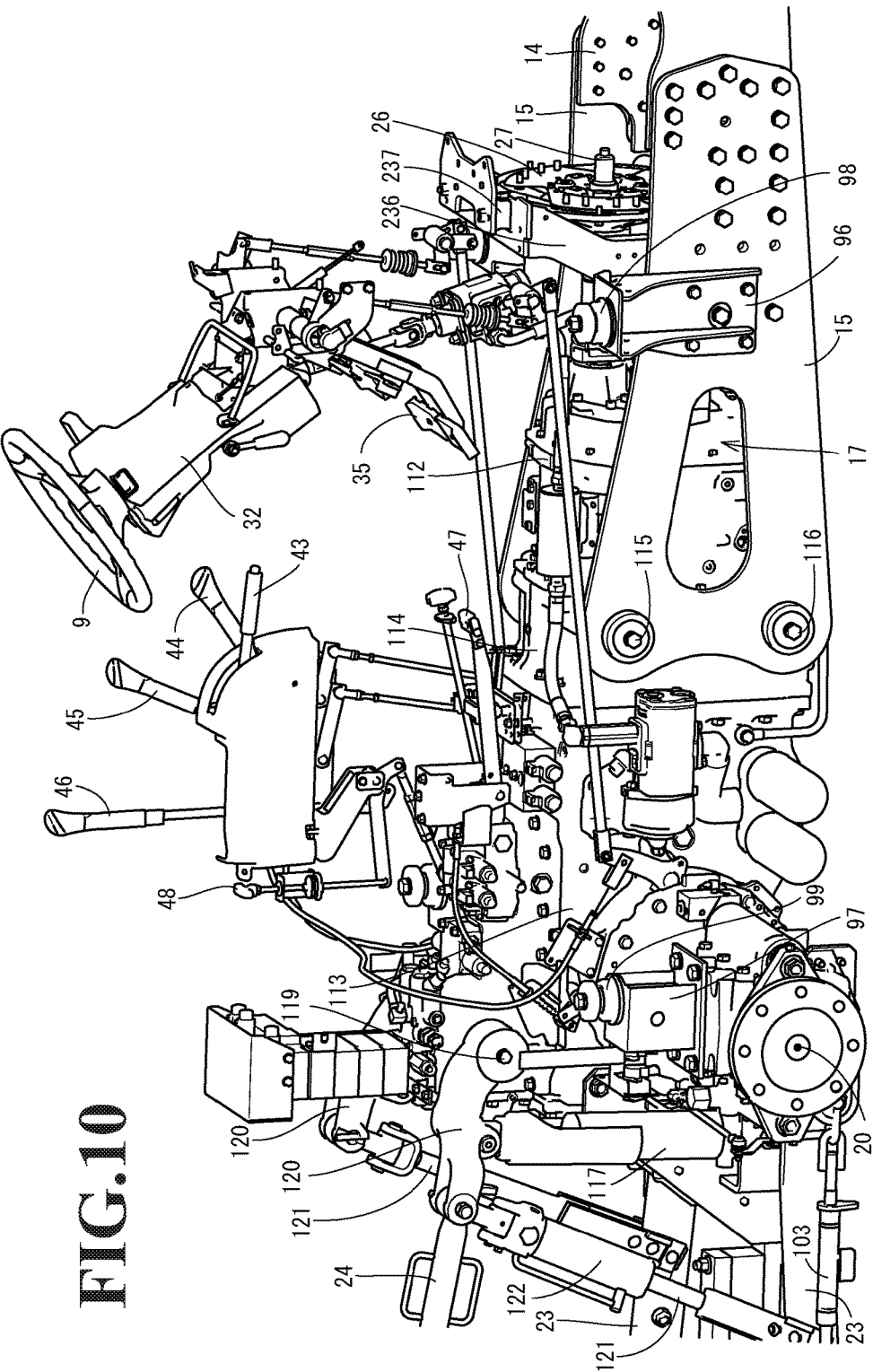
FIG. 10 is an enlarged perspective view of the traveling machine body as viewed from the right side.
Figure 11:
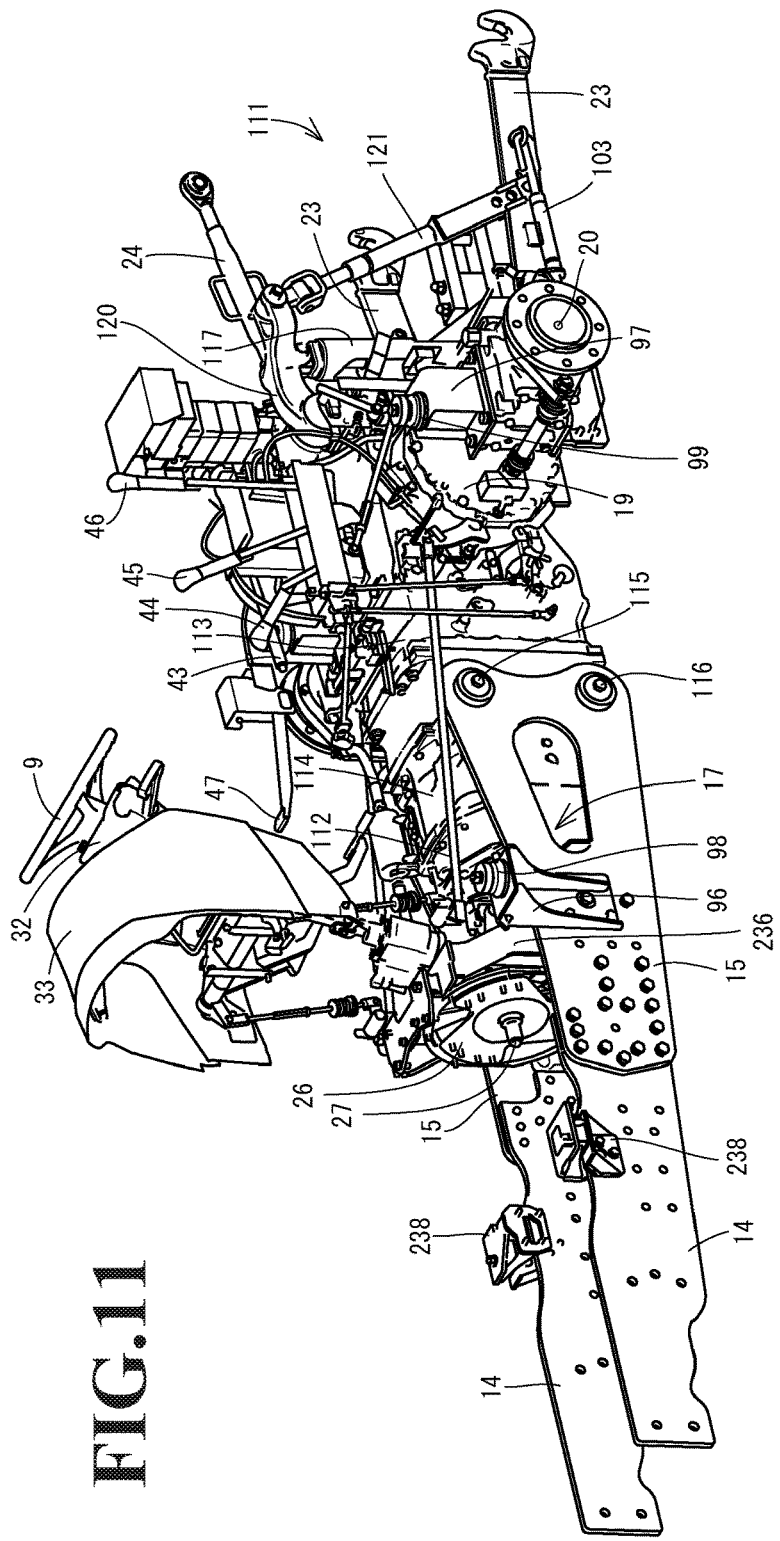
FIG. 11 is a perspective view of the traveling machine body as viewed from a left front side.
Figure 12:
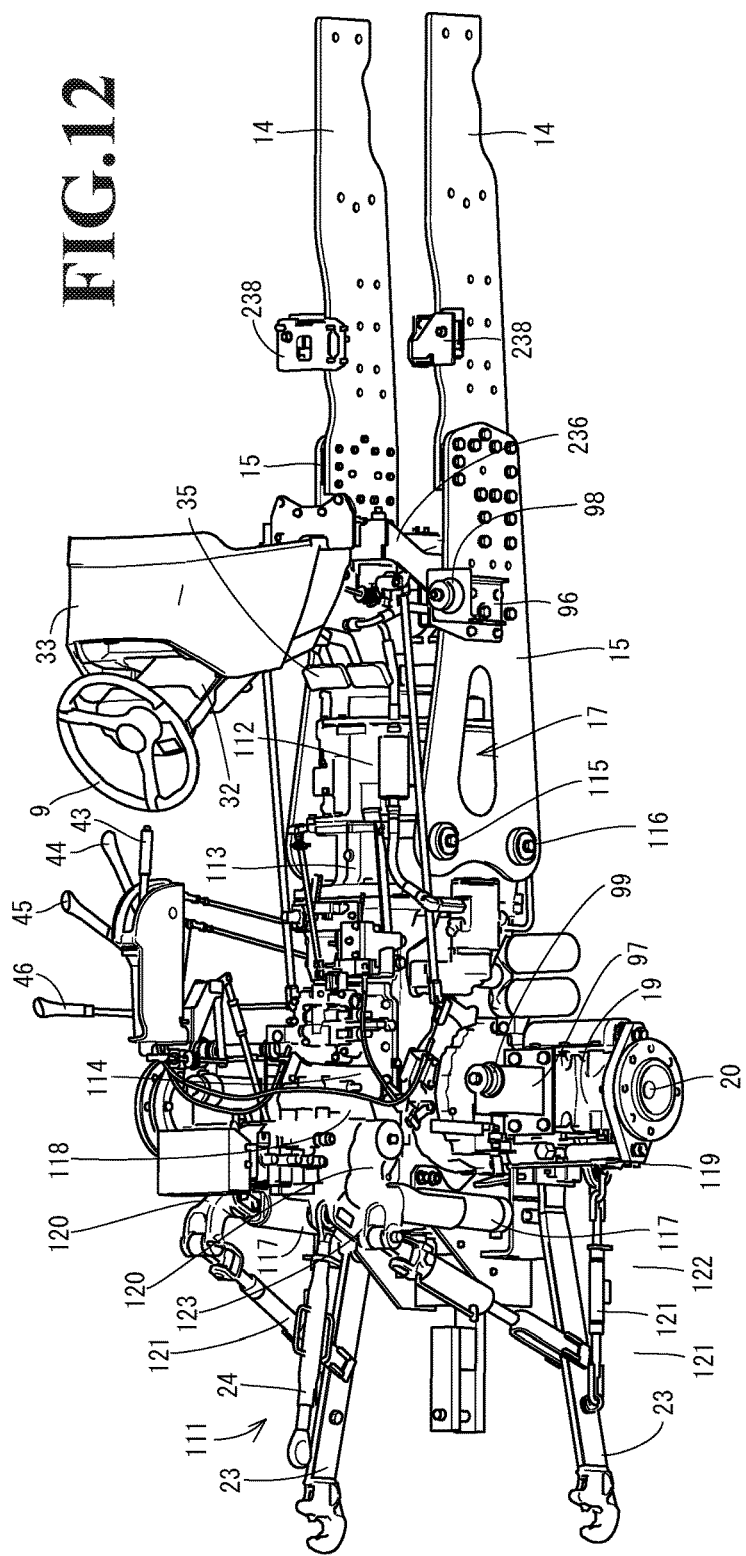
FIG. 12 is a perspective view of the traveling machine body as viewed from the right side.
Figure 13:
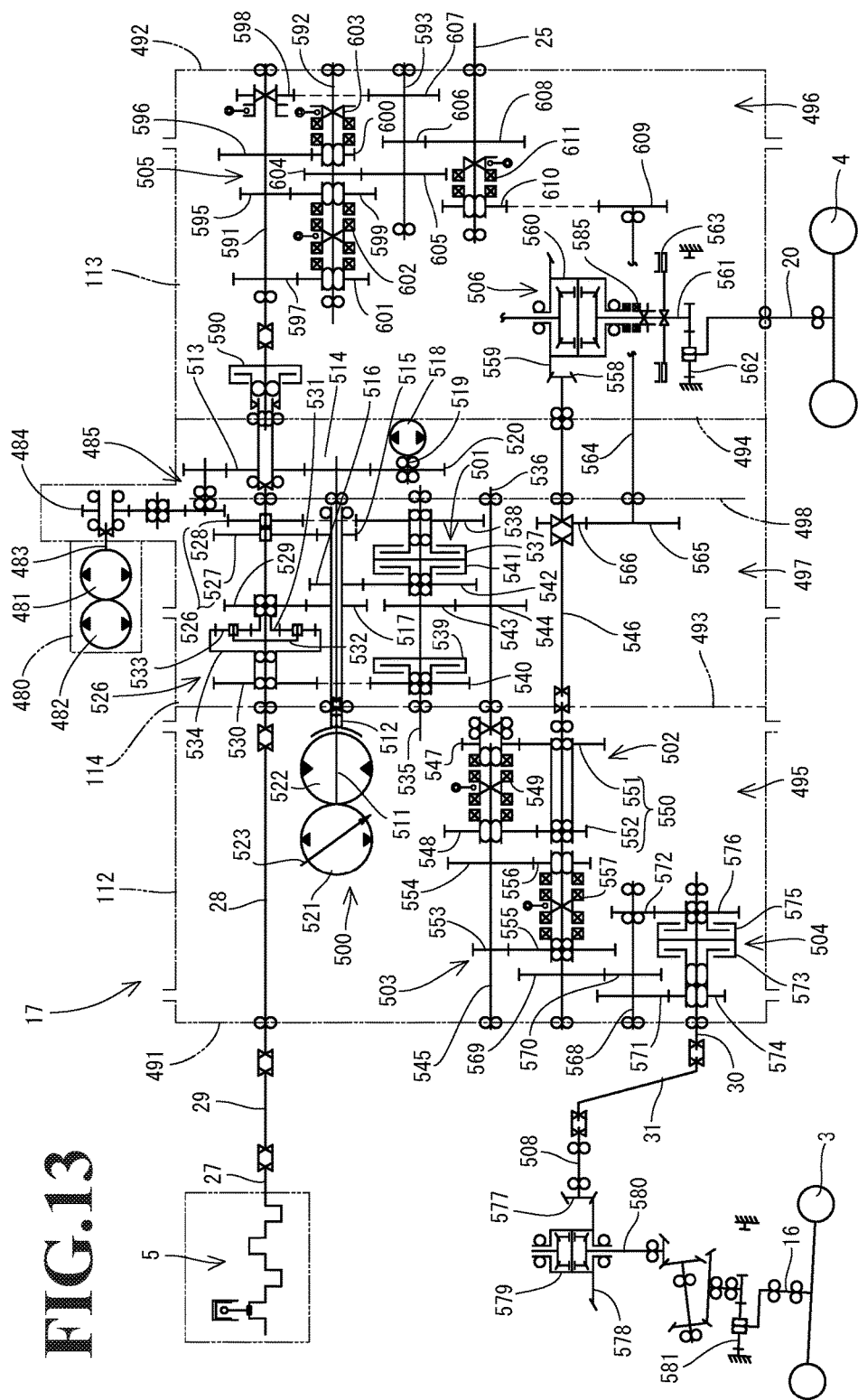
FIG. 13 a skeleton diagram illustrating a driving force transmission system of the tractor.

As illustrated in figures such as FIGS. 7, 8, and 10, a top link hinge 123 is fixed to the rear surface side of the upper surface lid member 118, and the top link 24 is coupled to the top link hinge 123 via a hinge pin. When the piston of the horizontal cylinder 122 is extended and contracted for changing the length of the right lift rod 121 with the ground work machine being supported by the top link 24 and the left and right lower links 23, the left and right inclined angle of the ground work machine changes.

Next, an internal structure of the transmission case 17 and a driving force transmission system of the tractor 1 are described with reference to figures such as FIGS. 13 and 15 to 20. The transmission case 17 includes: the front transmission case 112 including the main transmission input shaft 28 and the like; the rear transmission case 113 including the rear axle case 19 and the like; and the intermediate case 114 coupling the front side of the rear transmission case 113 to the rear side of the front transmission case 112. The transmission case 17 has a hollow box shape as a whole.

A front lid member 491 is disposed on a front surface of the transmission case 17, that is, a front surface of the front transmission case 112. The front lid member 491 is detachably fastened to the front surface of the front transmission case 112 with a plurality of bolts. A rear lid member 492 is disposed on a rear surface of the transmission case 17, that is, a rear surface of the rear transmission case 113. The rear lid member 492 is detachably fastened to the rear surface of the rear transmission case 113 with a plurality of bolts. An intermediate partitioning wall 493, partitioning between the front transmission case 112 and the intermediate case 114, is integrally formed on the front surface side in the intermediate case 114. A rear partitioning wall 494 that partitions between front and rear portions in the rear transmission case 113 is integrally formed on an intermediate portion of the rear transmission case 113 in the front and rear direction.

Thus, the inside of the transmission case 17 is divided, by the intermediate and the rear partitioning walls 493 and 494, into three chambers including a front chamber 495, a rear chamber 496, and an intermediate chamber 497. The front chamber 495 is a space in the transmission case 17 between the front lid member 491 and the intermediate partitioning wall 493 (in the front transmission case 112). The rear chamber 496 is provided between the rear lid member 492 and the rear partitioning wall 494 (a rear portion inside the rear transmission case 113). The intermediate chamber 497 is a space between the intermediate partitioning wall 493 and the rear partitioning wall 494 (inside the intermediate case 114 and on a front side in the rear transmission case 113). The partitioning walls 493 and 494 are partially notched so that the front chamber 495, the intermediate chamber 497, and the rear chamber 496 communicate with each other. Thus, hydraulic oil (lubricant oil) can move among the chambers 495 to 497.

The hydraulic continuously variable transmission 500, a mechanical creep transmission gear mechanism 502, a traveling sub transmission gear mechanism 503, and a two-wheel drive/four-wheel drive switching mechanism 504 are disposed in the front chamber 495 of the transmission case 17 (in the front transmission case 112). The mechanical creep transmission gear mechanism 502 shifts the rotational driving force transmitted thereto via the forward/backward traveling switching mechanism 501 described later. The two-wheel drive/four-wheel drive switching mechanism 504 switches between two-wheel drive and four-wheel drive of the front and the rear wheels 3 and 4. The forward/backward traveling switching mechanism 501 is disposed in the intermediate chamber 497 of the transmission case 17 (inside the intermediate case 114 and on the front side of the rear transmission case 113). A PTO transmission mechanism 505 and the rear wheel differential gear mechanism 506 are disposed in the rear chamber 496 of the transmission case 17 (inside the rear side of the rear transmission case 113). The forward/backward traveling switching mechanism 501 switches the rotational driving force from the hydraulic continuously variable transmission 500 between a normal rotation direction and a reverse rotation direction. The PTO transmission mechanism 505 appropriately shifts the rotational driving force from the engine 5, and transmits the rotational driving force to the PTO shaft 25. The rear wheel differential gear mechanism 506 transmits the rotational driving force from the creep transmission gear mechanism 502 or the traveling sub transmission gear mechanism 503 to the left and right rear wheels 4. The creep transmission gear mechanism 502 and the traveling sub transmission gear mechanism 503 correspond to the traveling transmission gear mechanism achieving multistage shifting of the shifted output from the forward/backward traveling switching mechanism 501. A pump case 480 accommodating a work machine hydraulic pump 481 and a traveling hydraulic pump 482 driven by the rotational driving force from the engine 5, is attached to the front portion of the right outer surface of the rear transmission case 113.

Figure 4:
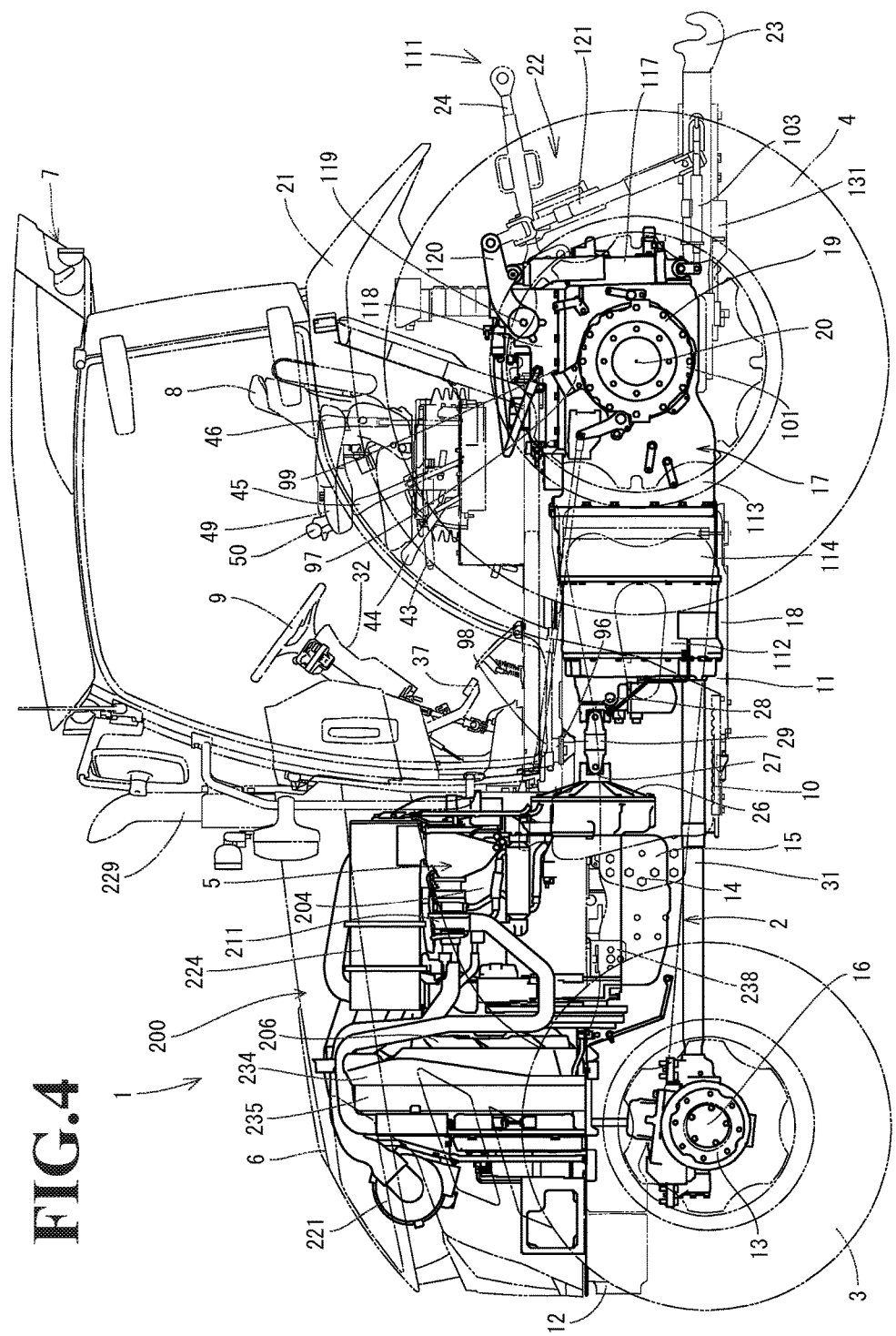
FIG. 4 is a left side view illustrating a traveling machine body.
Figure 5:
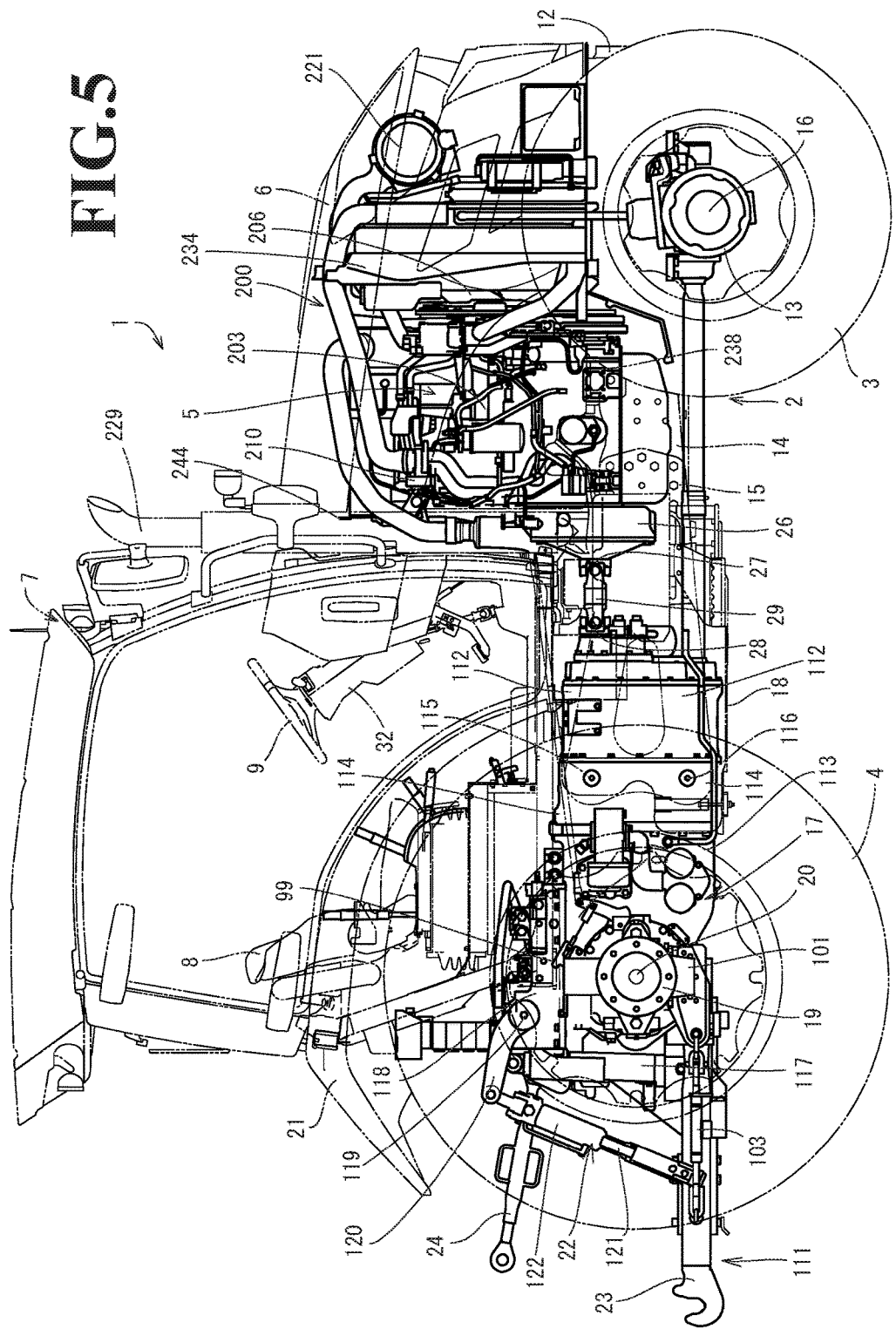
FIG. 5 is a right side view illustrating the traveling machine body.
Figure 6:
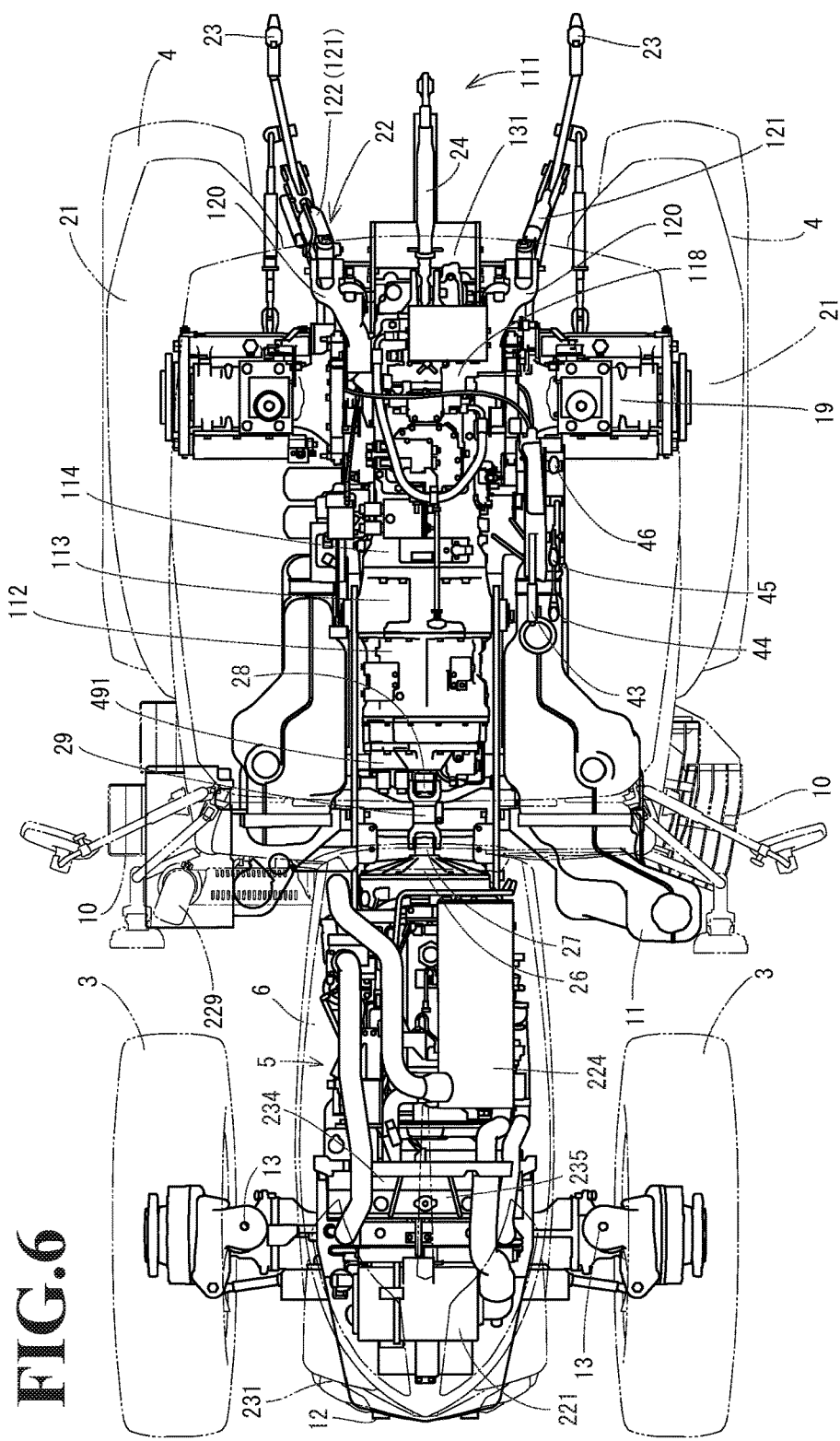
FIG. 6 is a plan view of the traveling machine body.

As illustrated in FIGS. 4 to 6, the flywheel 26 is directly coupled to the output shaft of the engine 5 protruding rearward from the rear side surface of the engine 5. The main transmission input shaft 28 is coupled to the main driving shaft 27 protruding rearward from the flywheel 26, via the driving force transmission shaft 29 having universal joints on both ends. The main transmission input shaft 28 protrudes forward from the front surface (front lid member 491) side of the transmission case 17. The rotational driving force from the engine 5 is transmitted to the main transmission input shaft 28 of the transmission case 17 (front transmission case 112) via the main driving shaft 27 and the driving force transmission shaft 29. Then the driving force is appropriately shifted by the hydraulic continuously variable transmission 500 and the creep transmission gear mechanism 502 or the traveling sub transmission gear mechanism 503, and then is transmitted to the rear wheel differential gear mechanism 506. Thus, the left and right rear wheels 4 are driven. The shifted driving force from the creep transmission gear mechanism 502 or the traveling sub transmission gear mechanism 503 is transmitted to the front wheel differential gear mechanism 507 in the front axle casing 13, from the two-wheel drive/four-wheel drive switching mechanism 504 via the front wheel output shaft 30, the front wheel driving shaft 31, and the front wheel transmission shaft 508. Thus, the left and right front wheels 3 are driven.

The main transmission input shaft 28, protruding forward from the front lid member 491, extends in the front and rear direction, from the front transmission case 112 to the intermediate case 114 (from the front chamber 495 to the intermediate chamber 497). The intermediate partitioning wall 493 rotatably supports the intermediate portion of the main transmission input shaft 28 in the front and rear direction. The main transmission input shaft 28 has a rear end side rotatably supported by an intermediate supporting plate 498 detachably fastened on the front surface side (side of the intermediate chamber 497) of the rear partitioning wall 494. The intermediate supporting plate 498 and the rear partitioning wall 494 are disposed in such a manner that a gap in the front and rear direction is provided between the members 498 and 494. The input transmission shaft 511, arranged in parallel with the main transmission input shaft 28, extends from the front transmission case 112 to the intermediate case 114 (from the front chamber 495 to the intermediate chamber 497) and receives the driving force from the main transmission input shaft 28. The hydraulic continuously variable transmission 500 is disposed in the front transmission case 112 (in the front chamber 495) via the input transmission shaft 511. The front side of the hydraulic continuously variable transmission 500 is attached to the inner surface side of the front lid member 491 that is detachably attached to close the opening on the front surface of the front transmission case 112. The input transmission shaft 511 has a rear end side rotatably supported by the intermediate supporting plate 498 and the rear partitioning wall 494.

The hydraulic continuously variable transmission 500 in the front chamber 495 is of an inline type with a main transmission output shaft 512 coaxially disposed with the input transmission shaft 511. The main transmission output shaft 512 having a cylindrical shape is fit on a portion of the input transmission shaft 511 inside the intermediate chamber 497. The main transmission output shaft 512 has a front end side disposed through the intermediate partitioning wall 493 to be rotatably supported by the intermediate partitioning wall 493. The main transmission output shaft 512 has a rear end side rotatably supported by the intermediate supporting plate 498. Thus, the rear end side, as the input side, of the input transmission shaft 511 protrudes rearward beyond the read end of the main transmission output shaft 512. A main transmission input gear 513 is fit on the rear end side of the main transmission input shaft 28 (between the intermediate supporting plate 498 and the rear partitioning wall 494) in a relatively non-rotatable manner. An input transmission gear 514, constantly in mesh with the main transmission input gear 513, is fixed to the read end side of the input transmission shaft 511 (between the intermediate supporting plate 498 and the rear partitioning wall 494). Thus, the rotational driving force from the main transmission input shaft 28 is transmitted to the hydraulic continuously variable transmission 500 via the main transmission input gear 513, the input transmission gear 514, and the input transmission shaft 511. A main transmission high speed gear 516, a main transmission reverse gear 517, and a main transmission low speed gear 515, for traveling output, are fit on the main transmission output shaft 512 in a relatively non-rotatable manner.

The hydraulic continuously variable transmission 500 includes: a variable capacity hydraulic pump unit 521; and a fixed capacity hydraulic motor unit 522 operated by high pressure hydraulic oil discharged from the hydraulic pump unit 521. The hydraulic pump unit 521 includes a pump swash plate 523 of which an inclined angle relative to the axis of the input transmission shaft 511 can be changed for adjusting the supplied amount of the hydraulic oil. A main transmission hydraulic cylinder 524 for changing and adjusting the inclined angle of the pump swash plate 523 relative to the axis of the input transmission shaft 511 is coupled to and interlocked with the pump swash plate 523. In the embodiment, the main transmission hydraulic cylinder 524 is assembled to the hydraulic continuously variable transmission 500 to be a unit as a single member. By driving the main transmission hydraulic cylinder 524 to change the inclined angle of the pump swash plate 523, a main transmission operation of the hydraulic continuously variable transmission 500 is performed with the amount of the hydraulic oil supplied to the hydraulic motor unit 522 from the hydraulic pump unit 521 changed and adjusted.

Specifically, when the main transmission hydraulic cylinder 524 is driven in proportion to the amount of operation on the main transmission lever 50, the inclined angle of the pump swash plate 523 relative to the axis of the input transmission shaft 511 is changed accordingly. The angle of the pump swash plate 523 according to the embodiment can be adjusted within a range between the maximum inclined angles on one side (positive side) and the other side (negative side) of a neutral angle corresponding to the substantially zero inclined angle (±several angles from the zero angle), based on an inclined angle on one side when the vehicle speed of the traveling machine body 2 is the lowest (the inclined angle close to the maximum negative angle in this case).

When the inclined angle of the pump swash plate 523 is substantially zero (neutral angle), the hydraulic motor unit 522 in the hydraulic pump unit 521 is not driven, and the main transmission output shaft 512 rotates at the substantially the same rotation speed as the input transmission shaft 511. When the pump swash plate 523 is inclined toward the one side (positive inclined angle) relative to the axis of the input transmission shaft 511, the hydraulic pump unit 521 causes the hydraulic motor unit 522 to perform an accelerating operation, whereby the main transmission output shaft 512 rotates at a higher rotation speed than the input transmission shaft 511. Thus, the driving force corresponding to the sum of the rotation speed of the input transmission shaft 511 and the rotation speed of the hydraulic motor unit 522 is transmitted to the main transmission output shaft 512. As a result, the shifted driving force (vehicle speed) from the main transmission output shaft 512 changes in proportion to the inclined angle (positive inclined angle) of the pump swash plate 523 in a rotation speed range higher than the rotation speed of the input transmission shaft 511. The traveling machine body 2 is at the maximum vehicle speed, when the inclined angle of the pump swash plate 523 is close to the maximum positive inclined angle.

When the pump swash plate 523 is inclined toward the other side (negative inclined angle) relative to the axis of the input transmission shaft 511, the hydraulic pump unit 521 causes the hydraulic motor unit 522 to perform a decelerating (reverse) operation, whereby the main transmission output shaft 512 rotates at a lower rotation speed than the input transmission shaft 511. Thus, the driving force corresponding to a result of subtracting the rotation speed of the hydraulic motor unit 522 from the rotation speed of the input transmission shaft 511 is transmitted to the main transmission output shaft 512. As a result, the shifted driving force from the main transmission output shaft 512 changes in proportion to the inclined angle (negative inclined angle) of the pump swash plate 523 in a rotation speed range lower than the rotation speed of the input transmission shaft 511. The traveling machine body 2 is at the lowest vehicle speed when the inclined angle of the pump swash plate 523 is close to the maximum negative inclined angle.

A pump drive gear 484 is fit on a pump drive shaft 483, for driving the work machine and the traveling hydraulic pumps 481 and 482, in a relatively non-rotatable manner. The pump drive gear 484 is coupled to the main transmission input gear 513 of the main transmission input shaft 28 via a flat gear mechanism 485, in a driving force transmittable manner. A lubricant oil pump 518 for supplying the hydraulic oil for lubrication to the hydraulic continuously variable transmission 500, the forward/backward traveling switching mechanism 501, and the like, is provided between the intermediate supporting plate 498 and the rear partitioning wall 494. The pump gear 520 fixed to a pump shaft 519 of the lubricant oil pump 518 is constantly in mesh with the input transmission gear 514 of the input transmission shaft 511. The work machine and traveling hydraulic pumps 481 and 482 for the work machine and the lubricant oil pump 518 are driven by the rotational driving force from the engine 5.

Next, a structure for switching between the forward traveling and the backward traveling via the forward/backward traveling switching mechanism 501 is described. A planetary gear mechanism 526 as a forward traveling high speed gear mechanism and a pair of low speed gears 525 as a forward traveling low speed gear mechanism are disposed on portions of the main transmission input shaft 28 in the intermediate chamber 497 (on the rear side of the main transmission input shaft 28). The planetary gear mechanism 526 includes: a sun gear 531 that integrally rotates with an input side transmission gear 529 rotatably supported on the main transmission input shaft 28; a carrier 532 rotatably supporting a plurality of planetary gears 533 on the same radius; and a ring gear 534 with an inner circumference surface provided with internal teeth. The sun gear 531 and the ring gear 534 are rotatably fit on the main transmission input shaft 28. The carrier 532 is fit on the main transmission input shaft 28 in a relatively non-rotatable manner. The sun gear 531 meshes with the planetary gears 533 of the carrier 532 from a radially inner side. The internal teeth of the ring gear 534 mesh with the planetary gears 533 from a radially outer side. The main transmission input shaft 28 further rotatably supports an output side transmission gear 530 that integrally rotates with the ring gear 534. An input side low speed gear 527 and an output side low speed gear 528, forming the pair of low speed gears 525, form an integrated structure, and are rotatably supported on a portion of the main transmission input shaft 28 between the planetary gear mechanism 526 and the main transmission input gear 513.

A traveling relay shaft 535 and a traveling transmission shaft 536, extending in parallel with the main transmission input shaft 28, the input transmission shaft 511, and the main transmission output shaft 512, are disposed in the intermediate chamber 497 of the transmission case 17 (in the intermediate case 114 and on the front side in the rear transmission case 113). The traveling relay shaft 535 has a front end side rotatably supported by the intermediate partitioning wall 493. The traveling relay shaft 535 has a rear end side rotatably supported by the intermediate supporting plate 498. The traveling transmission shaft 536 has a front end side rotatably supported by the intermediate partitioning wall 493. The traveling transmission shaft 536 has a rear end side rotatably supported by the intermediate supporting plate 498.

The traveling relay shaft 535 is provided with the forward/backward traveling switching mechanism 501. More specifically, a front traveling high speed gear 540, a backward traveling gear 542, and a forward traveling low speed gear 538 are fit on the traveling relay shaft 535. The front traveling high speed gear 540 is coupled with a multiple wet forward traveling high speed hydraulic clutch 539. The backward traveling gear 542 is coupled with a multiple wet backward traveling hydraulic clutch 541. The forward traveling low speed gear 538 is coupled with a multiple wet forward traveling low speed hydraulic clutch 537. A traveling relay gear 543 is fit on a portion of the traveling relay shaft 535 between the forward traveling high speed hydraulic clutch 539 and the backward traveling gear 542 in a relatively non-rotatable manner. A traveling transmission gear 544, constantly in mesh with the traveling relay gear 543, is fit on the traveling transmission shaft 536 in a relatively non-rotatable manner. The input side low speed gear 527 of the pair of low speed gears 525 on the side of the main transmission input shaft 28 is constantly in mesh with the main transmission low speed gear 515 of the main transmission output shaft 512. The output side low speed gear 528 is constantly in mesh with the forward traveling low speed gear 538. The input side transmission gear 529 of the planetary gear mechanism 526 on the side of the main transmission input shaft 28 is constantly in mesh with the main transmission high speed gear 516 of the main transmission output shaft 512. The output side transmission gear 530 is constantly in mesh with the front traveling high speed gear 540. The main transmission reverse gear 517 of the main transmission output shaft 512 is constantly in mesh with the backward traveling gear 542.

When a forward traveling side operation is performed on the forward and backward travel switching lever 36, the forward traveling low speed hydraulic clutch 537 or the forward traveling high speed hydraulic clutch 539 transitions to a driving force connected state, and the forward traveling low speed gear 538 or the front traveling high speed gear 540 and the traveling relay shaft 535 are coupled to each other in a relatively non-rotatable manner. As a result, the forward traveling low speed or forward traveling high speed rotational driving force is transmitted from the main transmission output shaft 512 to the traveling relay shaft 535 via the pair of low speed gears 525 or the planetary gear mechanism 526. Thus, the driving force is transmitted from the traveling relay shaft 535 to the traveling transmission shaft 536. When a backward traveling side operation is performed on the forward and backward travel switching lever 36, the backward traveling hydraulic clutch 541 transitions to the driving force connected state, and the backward traveling gear 542 and the traveling relay shaft 535 are coupled to each other in a relatively non-rotatable manner. As a result, backward traveling rotational driving force is transmitted from the main transmission output shaft 512 to the traveling relay shaft 535 via the pair of low speed gears 525 or the planetary gear mechanism 526, and the driving force is transmitted from the traveling relay shaft 535 to the traveling transmission shaft 536.

Which one of the forward traveling low speed hydraulic clutch 537 and the forward traveling high speed hydraulic clutch 539 transitions to the driving force connected state due to the forward traveling side operation on the forward and backward travel switching lever 36 is determined in accordance with an amount of operation on the main transmission lever 50. When the forward and backward travel switching lever 36 is at the neutral position, all the hydraulic clutches 537, 539, and 541 are in a driving force disconnected state, and the traveling driving force from the main transmission output shaft 512 is substantially zero (main clutch disengaged state).

Next, a structure of switching among ultra-low speed, low speed, and high speed via the creep transmission gear mechanism 502 and the traveling sub transmission gear mechanism 503 as the traveling transmission gear mechanism will be described. The mechanical creep transmission gear mechanism 502 and the traveling sub transmission gear mechanism 503, for shifting the rotational driving force transmitted via the forward/backward traveling switching mechanism 501, are disposed in the front chamber 495 of the transmission case (in the front transmission case 112). In this configuration, a traveling counter shaft 545, coaxially extending with the traveling transmission shaft 536, is disposed in the front chamber 495 (in the front transmission case 112). A sub transmission shaft 546 extends from the front transmission case 112 to the rear transmission case 113 (from the front chamber 495 to the rear chamber 496 via the intermediate chamber 497) while being in parallel with the traveling counter shaft 545. The traveling counter shaft 545 has the front end side rotatably supported by the front lid member 491. The traveling counter shaft 545 has the rear end side rotatably supported by the intermediate partitioning wall 493. The sub transmission shaft 546 has the front end side rotatably supported by the front lid member 491. The sub transmission shaft 546 has an intermediate portion, in the front and rear direction, rotatably supported by the intermediate partitioning wall 493. The sub transmission shaft 546 has the rear end side rotatably supported by the intermediate supporting plate 498 and the rear partitioning wall 494.

The traveling counter shaft 545 has a rear side provided with a transmission gear 547 and a creep gear 548. The transmission gear 547 is rotatably fit on the traveling counter shaft 545, and is rotatably supported by the intermediate partitioning wall 493 while being coupled to the traveling transmission shaft 536 in an integrally rotating manner. The creep gear 548 is fit on the traveling counter shaft 545 in a relatively non-rotatable manner. A creep shifter 549 is spline fit to a portion of the traveling counter shaft 545 between the transmission gear 547 and the creep gear 548, in such a manner as to be relatively non-rotatable and slidable in an axial direction. When the ultra-low speed lever 44 operated to turn ON and OFF, the creep shifter 549 slides in such a manner that the transmission gear 547 or the creep gear 548 is selectively coupled to the traveling counter shaft 545. A pair of reduction gears 550 are rotatably fit on a portion of the sub transmission shaft 546 inside the front chamber 495 (front transmission case 112). The pair of reduction gears 550 include an input side reduction gear 551 and an output side reduction gear 552 that form an integrated structure. The transmission gear 547 of the traveling counter shaft 545 is constantly in mesh with the input side reduction gear 551 of the sub transmission shaft 546, and the creep gear 548 is constantly in mesh with the output side reduction gear 552.

The traveling counter shaft 545 has a front side provided with a low speed relay gear 553 and a high speed relay gear 554. The low speed relay gear 553 is fixed to the traveling counter shaft 545. The high speed relay gear 554 is fit on the traveling counter shaft 545 in a relatively non-rotatable manner. A low speed gear 555 and a high speed gear 556 are rotatably fit on a portion of the sub transmission shaft 546 further toward the front side than the pair of reduction gears 550. The low speed gear 555 meshes with the low speed relay gear 553. The high speed gear 556 meshes with the high speed relay gear 554. A sub transmission shifter 557 is spline fit to a portion of the sub transmission shaft 546 between the low speed gear 555 and the high speed gear 556 in such a manner as to be relatively non-rotatable and slidable in the axial direction. When the sub transmission lever 45 is operated, the sub transmission shifter 557 slides in such a manner that the low speed gear 555 or the high speed gear 556 is selectively coupled to the sub transmission shaft 546.

In the embodiment, when the ultra-low speed lever 44 is operated to turn ON and the sub transmission lever 45 is operated to be on the low speed side, the creep gear 548 is coupled to the traveling counter shaft 545 in a relatively non-rotatable manner, and the low speed gear 555 is coupled to the sub transmission shaft 546 in a relatively non-rotatable manner. Thus, the ultra-low speed traveling driving force is output to the front wheels 3 and/or the rear wheels 4 from the traveling transmission shaft 536 via the traveling counter shaft 545 and the sub transmission shaft 546. The ultra-low speed lever 44 and the sub transmission lever 45 are coupled to each other in an interlocking manner via a restraining mechanism (not illustrated) so that the sub transmission lever 45 cannot be operated to be on the high speed side, when the ultra-low speed lever 44 is in the state of being operated to turn ON.

When the ultra-low speed lever 44 is operated to turn OFF and the sub transmission lever 45 is operated to be on the low speed side, the transmission gear 547 is coupled to the traveling counter shaft 545 in a relatively non-rotatable manner and the low speed gear 555 is coupled to the sub transmission shaft 546 in a relatively non-rotatable manner. Thus, low speed traveling driving force is output from the traveling transmission shaft 536 to the front wheels 3 and/or the rear wheels 4 via the traveling counter shaft 545 and the sub transmission shaft 546. When the ultra-low speed lever 44 is operated to turn OFF and the sub transmission lever 45 is operated to be on the high speed side, the transmission gear 547 is coupled to the traveling counter shaft 545 in a relatively non-rotatable manner and the high speed gear 556 is coupled to the sub transmission shaft 546 in a relatively non-rotatable manner. Thus, the high speed traveling driving force is output from the traveling transmission shaft 536 to the front wheels 3 and/or the rear wheels 4 via the traveling counter shaft 545 and the sub transmission shaft 546.

The sub transmission shaft 546 has a rear end side extending through the rear partitioning wall 494 and into the rear chamber 496. The sub transmission shaft 546 has a rear end portion provided with a pinion 558. The rear wheel differential gear mechanism 506, which transmits the traveling driving force to the left and right rear wheels 4, is disposed in the rear chamber 496 (inside the rear transmission case 113 on the rear side). The rear wheel differential gear mechanism 506 includes: a ring gear 559 that meshes with the pinion 558 of the sub transmission shaft 546; a differential gear case 560 provided to the ring gear 559; and a pair of differential output shafts 561 extending in the left and right direction. The differential output shaft 561 is coupled to the rear axles 20 via a final gear 562 and the like. The rear wheels 4 are attached on the distal end side of the rear axle 20.

The left and right differential output shafts 561 are each provided with a brake mechanism 563. The brake mechanism 563 puts a brake on the left and right rear wheels 4 with two systems corresponding to operating and automatic controlling of the brake pedal 35. Specifically, each brake mechanism 563 is configured to put a brake on the corresponding differential output shaft 561 and the rear wheel 4 in accordance with a depressing operation on the brake pedal 35. When a steering angle of the steering wheel 9 reaches or exceeds a predetermined angle, a brake cylinder 630 (see FIG. 14) is operated in accordance with a switching operation of an auto brake solenoid valve 631 (see FIG. 14) for one of the rear wheels 4 on the inner side of the turning vehicle (what is known as an auto brake). Thus, the brake mechanism 563 for the one of the rear wheels 4 on the inner side of the turning vehicle is automatically operated for braking. Thus, the tractor 1 can be easily make a small turn such as U turn (turning the direction at the headland of the farm field).

The rear wheel differential gear mechanism 506 is provided with a diff-lock mechanism 585 for stopping a differential operation of the rear wheel differential gear mechanism 506 (for constantly driving the left and right differential output shafts 561 at the same speed). When the diff-lock pin in the diff-lock mechanism 585 is engaged with the differential gear of the differential gear case 560 due to the depressing operation on the diff-lock pedal 47, the differential gear is fixed to the differential gear case 560. Thus, the differential function of the differential gear stops, and the left and right differential output shafts 561 are driven at the same speed.

Next, the structure for switching between the two-wheel drive and the four-wheel drive of the front and the rear wheels 3 and 4 executed via the two-wheel drive/four-wheel drive switching mechanism 504 will be described. The two-wheel drive/four-wheel drive switching mechanism 504 is disposed in the front chamber 495 (front transmission case 112) of the transmission case. In this configuration, a front wheel input shaft 568 and the front wheel output shaft 30, extending in parallel with the traveling counter shaft 545 and the sub transmission shaft 546, are disposed in the front chamber 495 (the front transmission case 112). A driving gear 569 is fit on the front end side of the sub transmission shaft 546 in a relatively non-rotatable manner and is constantly in mesh with a driven gear 570 fit on the front wheel input shaft 568 in a relatively non-rotatable manner. A double speed relay gear 571 and a four-wheel drive relay gear 572 are respectively disposed on both front and rear sides of the driven gear 570 on the front wheel input shaft 568, in a relatively non-rotatable manner.

The wheel output shaft 30 is provided with the two-wheel drive/four-wheel drive switching mechanism 504. Specifically, a double speed gear 574 and a four-wheel drive gear 576 are fit on the front wheel output shaft 30. The double speed gear 574 is coupled with a wet multi double speed hydraulic clutch 573. The four-wheel drive gear 576 is coupled with a wet multi four-wheel drive hydraulic clutch 575. The double speed relay gear 571 of the front wheel input shaft 568 is constantly in mesh with the double speed gear 574 of the front wheel output shaft 30, and the four-wheel drive relay gear 572 is in mesh with the four-wheel drive gear 576.

When a driving switching switch or a driving switching lever (not illustrated) is operated to be on the four-wheel drive side, the four-wheel drive hydraulic clutch 575 is in the driving force connected state and the front wheel output shaft 30 and the four-wheel drive gear 576 are coupled to each other in a relatively non-rotatable manner. The rotational driving force is transmitted from the sub transmission shaft 546 to the front wheel output shaft 30 via the front wheel input shaft 568 and the four-wheel drive gear 576. As a result, the tractor 1 transitions to a four-wheel drive state in which the rear wheels 4 as well as the front wheels 3 are driven. When the steering angle of the steering wheel 9 reaches or exceeds the predetermined angle due to the U turn operation or the like, the double speed hydraulic clutch 573 transitions to the driving force connected state, and the front wheel output shaft 30 and the double speed gear 574 are coupled to each other in a relatively non-rotatable manner. The rotational driving force is transmitted from the sub transmission shaft 546 to the front wheel output shaft 30 via the front wheel input shaft 568 and the double speed gear 574. As a result, the front wheels 3 are driven at high speed that is about two times as high as the rotation speed of the front wheels 3 corresponding to the rotational driving force from the four-wheel drive gear 576.

The front wheel transmission shaft 508, extending rearward from the front axle casing 13, and the front wheel output shaft 30, protruding forward from the lower portion of the front surface of the transmission case 17 (front lid member 491), are coupled to each other via the front wheel driving shaft 31 for transmitting the driving force to the front wheels 3. The front wheel differential gear mechanism 507 for transmitting traveling driving force to the left and right front wheels 3 is disposed in the front axle casing 13. The front wheel differential gear mechanism 507 includes: a ring gear 578 that meshes with a pinion 577 provided to the front end side of the front wheel transmission shaft 508; a differential gear case 579 provided to the ring gear 578; and a pair of differential output shafts 580 extending in the left and right direction. The differential output shaft 580 is coupled to the front axle 16 via a final gear 581 and the like. The front wheels 3 are attached to the distal end sides of the front axle 16. The front axle casing 13 has an outer side surface provided with a steering hydraulic cylinder 622 (see FIG. 14) for power steering for changing the traveling direction of the front wheels 3 between left and right in accordance with the steering operation on the steering wheel 9.

Figure 20:
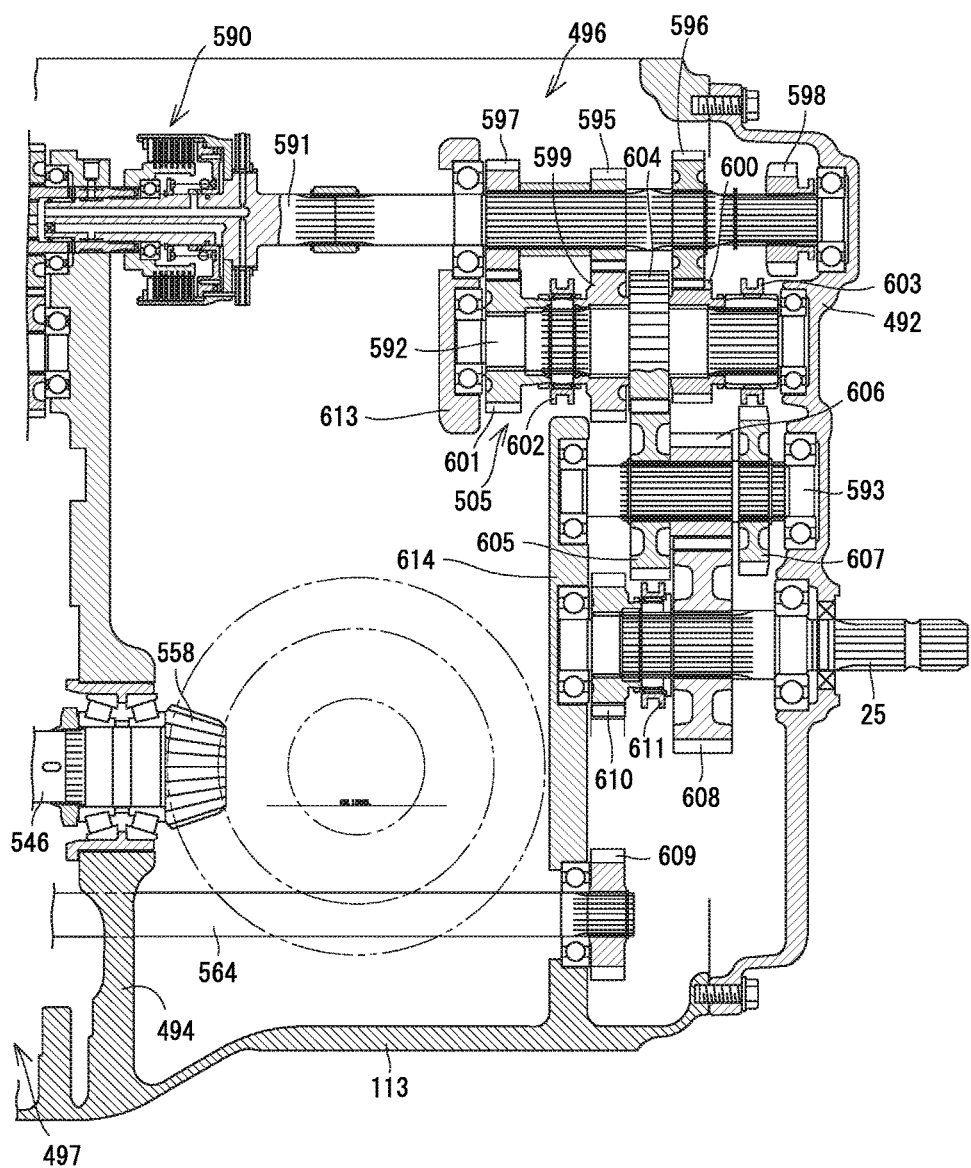
FIG. 20 is a left cross-sectional view of a rear portion of the transmission case.

Next, a structure for the driving speed switching of the PTO shaft 25 (three stages in the normal rotation direction and a single stage in the reverse rotation direction) executed via the PTO transmission mechanism 505 is described. The PTO transmission mechanism 505 for transmitting the driving force from the engine 5 to the PTO shaft 25 is disposed in the rear chamber 496 of the transmission case 17 (rear side in the rear transmission case 113). In this configuration, a PTO input shaft 591 is coupled to the rear end side of the main transmission input shaft 28 via a PTO hydraulic clutch 590 for enabling/disabling the transmission of the driving force. The PTO input shaft 591 coaxially extends with the main transmission input shaft 28. The PTO input shaft 591 is disposed in the rear chamber 496. In this configuration, the PTO input shaft 591 has a front end side rotatably supported by the rear partitioning wall 494. As illustrated in FIG. 20, upper and lower supporting walls 613 and 614, which divide the rear chamber 496 into front and rear sides, are integrally formed in the rear chamber 496. The PTO input shaft 591 has an intermediate portion in the front and rear direction rotatably supported by the upper supporting wall 613 in the rear chamber 496. The PTO input shaft 591 has a rear end side rotatably supported on the inner surface side of the rear lid member 492.

The PTO shifting shaft 592, the PTO counter shaft 593, and the PTO shaft 25 extending in parallel with the PTO input shaft 591 are disposed in the rear chamber 496. The PTO shifting shaft 592 has a front end side rotatably supported by the upper supporting wall 613. The PTO shifting shaft 592 has a rear end side rotatably supported on the inner surface side of the rear lid member 492. The PTO counter shaft 593 has a front end side rotatably supported by the lower supporting wall 614. The PTO counter shaft 593 has a rear end side rotatably supported on the inner surface side of the rear lid member 492. The PTO shaft 25 extends rearward from the rear lid member 492. The PTO shaft 25 has a front end side rotatably supported by the lower supporting wall 614.

When the PTO clutch switch 53 is operated for transmitting driving force, the PTO hydraulic clutch 590 transitions to the driving force connected state, and the main transmission input shaft 28 and the PTO input shaft 591 are coupled to each other in a relatively non-rotatable manner. As a result, the rotational driving force is transmitted from the main transmission input shaft 28 to the PTO input shaft 591.

The PTO input shaft 591 is provided with a mid speed input gear 597, a low speed input gear 595, a high speed input gear 596, and a reversing shifter gear 598, in this order from the front side. The mid speed input gear 597, the low speed input gear 595, and the high speed input gear 596 fit on the PTO input shaft 591 in a relatively non-rotatable manner. The reversing shifter gear 598 is spline fit to the PTO input shaft 591 in such a manner as to be relatively non-rotatable and slidable in the axial direction.

A PTO mid speed gear 601 that meshes with the mid speed input gear 597, a PTO low speed gear 599 that meshes with the low speed input gear 595, and a PTO high speed gear 600 that meshes with the high speed input gear 596 are rotatably fit on the PTO shifting shaft 592. A pair of front and rear PTO transmission shifters 602 and 603 are spline fit to the PTO shifting shaft 592 in such a manner as to be relatively non-rotatable and to be slidable in the axial direction. The first PTO transmission shifter 602 is disposed between the PTO mid speed gear 601 and the PTO low speed gear 599. The second PTO transmission shifter 603 is disposed further on the rear end side than the PTO high speed gear 600. The pair of front and rear PTO transmission shifters 602 and 603 slides in the axial direction in accordance with the operation on the PTO transmission lever 46. A PTO transmission gear 604 is fixed to a portion of the PTO shifting shaft 592 between the PTO low speed gear 599 and the PTO high speed gear 600.

A PTO counter gear 605, in mesh with the PTO transmission gear 604, a PTO relay gear 606, in mesh with a PTO output gear 608 fit on the PTO shaft 25 in a relatively non-rotatable manner, and a PTO reverse gear 607 are fit on the PTO counter shaft 593 in a relatively non-rotatable manner. When the reverse PTO lever 48 is operated to turn ON reverse in a state where the PTO transmission lever 46 is in a state of having been operated to be in neutral, the reversing shifter gear 598 slides to mesh with the PTO reverse gear 607 of the PTO counter shaft 593.

When the PTO transmission lever 46 is operated for shifting, the pair of front and rear PTO transmission shifters 602 and 603 slide along the PTO shifting shaft 592, in such a manner that the PTO low speed gear 595, the PTO mid speed gear 597, or the PTO high speed gear 596 is selectively coupled to the PTO shifting shaft 592. As a result, the PTO shifted output corresponding to any one of low speed, mid speed, and high speed is transmitted from the PTO shifting shaft 592 to the PTO counter shaft 593 via the PTO transmission gear 604 and the PTO counter gear 605, and is further transmitted to the PTO shaft 25 via the PTO relay gear 606 and the PTO output gear 608. The PTO transmission lever 46 and the reverse PTO lever 48 coupled to each other via the restraining mechanism (not illustrated) in an interlocking manner. Thus, the reverse PTO lever 48 cannot be operated to turn ON reverse when the PTO transmission lever 46 is operated for shifting to be in a state other than neutral.

When the reverse PTO lever 48 is operated to turn ON reverse, the reversing shifter gear 598 meshes with the PTO reverse gear 607. Thus, the rotational driving force is transmitted from the PTO input shaft 591 to the PTO counter shaft 593 via the reversing shifter gear 598 and the PTO reverse gear 607. Then, the reverse PTO shifted output is transmitted from the PTO counter shaft 593 to the PTO shaft 25 via the PTO relay gear 606 and the PTO output gear 608.

As is apparent from the above description, the PTO transmission mechanism 505 according to the embodiment is disposed more on the rear side than upper and lower supporting wall portions 613 and 614 in the rear chamber 496. The rear wheel differential gear mechanism 506 is disposed more on the forward side than the upper and lower supporting wall portions 613 and 614 in the rear chamber 496. As described above, in the embodiment, the rear wheel differential gear mechanism 506 and the PTO transmission mechanism 505 (PTO transmission system) are separately arranged in a simple and compact manner in the rear chamber 496 of the transmission case 17, whereby the assemblability and maintainability of the transmission case 17 can be improved.

As is apparent from the supporting structure for the shafts 25, 591, 592, and 593 such as the PTO shaft 25, the PTO transmission mechanism 505 can be put into and out from a portion more on the rear side than the upper and lower supporting wall portions 613 and 614 in the rear chamber 496 by detaching the rear lid member 492 that is detachably attached to close a rear surface opening portion of the transmission case 17. When the PTO transmission mechanism 505 is installed in the portion more on the rear side than the upper and lower supporting wall portions 613 and 614 in the rear chamber 496, the PTO transmission mechanism 505 is supported by the upper and lower supporting wall portions 613 and 614 and the rear lid member 492. Thus, the PTO transmission mechanism 505 can be exposed when the rear lid member 492 is detached from the transmission case 17. All things considered, the assemblability/disassemblability of the transmission case 17 and the maintainability of the PTO transmission mechanism 505 can further be improved.

Figure 21:
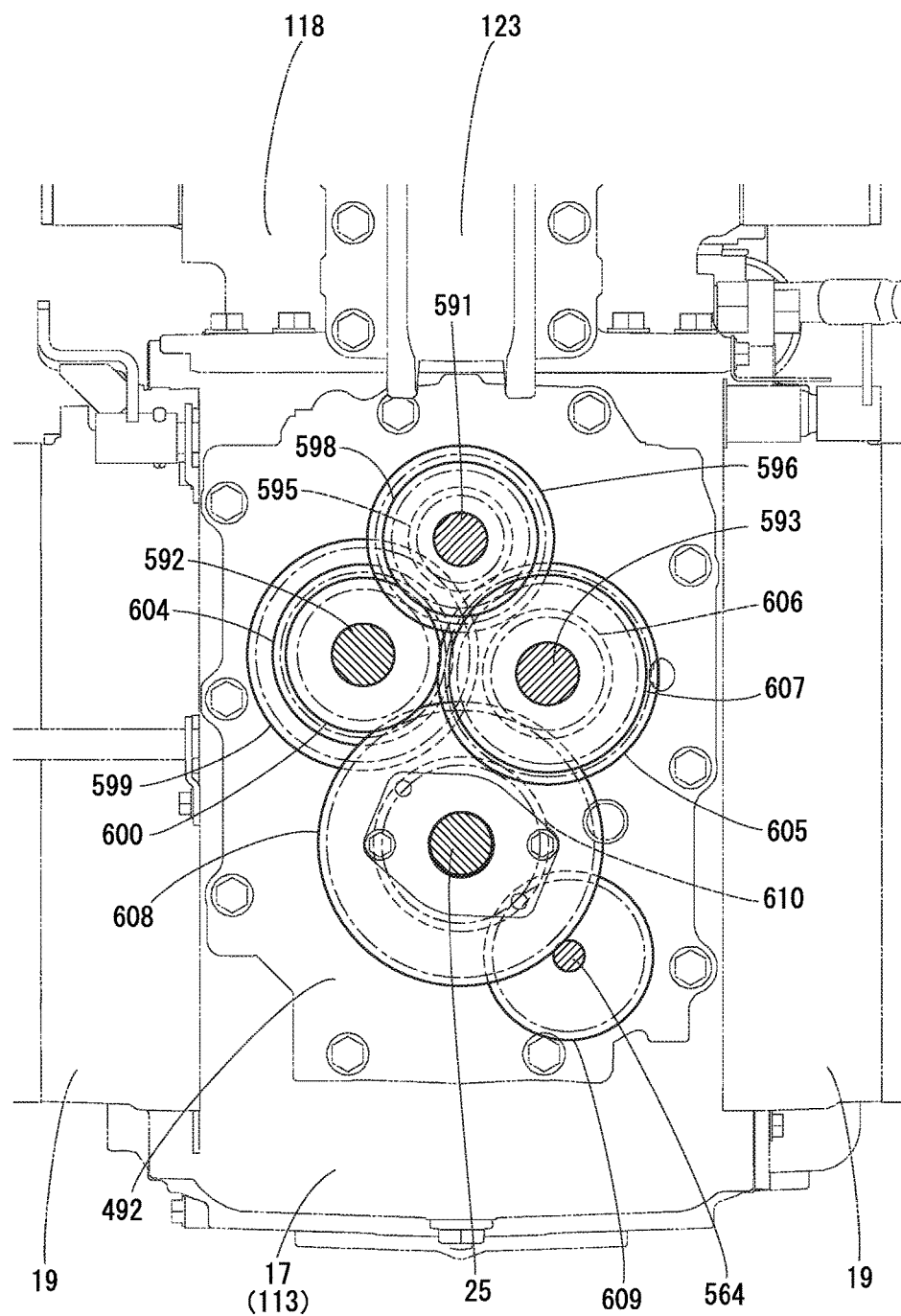
FIG. 21 is a back view illustrating the transmission case.

In the embodiment, the PTO input shaft 591 and the PTO shifting shaft 592 are supported with the upper supporting wall portion 613 and the rear lid member 492, and the PTO counter shaft 593 and the PTO shaft 25 are supported by the lower supporting wall portion 614 and the rear lid member 492. The positional relationship among the shafts 25 and 591 to 593 are set in such a manner that the shafts are positioned at apices of a rectangular form in back view (see FIG. 21), and the PTO output is transmitted from the PTO input shaft 591 at an upper stage to the PTO shaft 25 at a lower stage via the PTO shifting shaft 592 and the PTO counter shaft 593 at middle stages. With this configuration, reaction force from the shafts 25 and 591 to 593, due to increased PTO output, can be canceled out. As a result, the vibration transmitted to the transmission case 17 and the traveling machine body 2 can be reduced.

A vehicle speed synchronizing shaft 564, extending in the front and rear direction and in parallel with the sub transmission shaft 546 from the intermediate chamber 497 to the rear chamber 496, is disposed in the rear transmission case 113. A vehicle speed synchronizing input gear 565 is fit on the front end side of the vehicle speed synchronizing shaft 564 in a relatively non-rotatable manner. The vehicle speed synchronizing input gear 565 is constantly in mesh with a driving force branching gear 566 fit on a portion of the sub transmission shaft 546 inside the intermediate chamber 497 in a relatively non-rotatable manner. A vehicle speed synchronizing output gear 610 is rotatably fit on a portion of the PTO shaft 25 more on the front side than the PTO output gear 608 and is constantly in mesh with a vehicle speed synchronizing relay gear 609 fixed to the rear end portion of the vehicle speed synchronizing shaft 564. A vehicle speed synchronizing shifter 611 is spline fit to a portion of the PTO shaft 25 between the vehicle speed synchronizing output gear 610 and the PTO output gear 608 in such a manner as to be relatively non-rotatable and slidable in the axial direction. When a PTO vehicle speed synchronizing lever (not illustrated) is operated to turn ON, the vehicle speed synchronizing shifter 611 slides so that the vehicle speed synchronizing output gear 610 is coupled to the PTO shaft 25. As a result, a vehicle speed synchronized output is transmitted from the sub transmission shaft 546 to the PTO shaft 25 via the vehicle speed synchronizing shaft 564.

Figure 14:
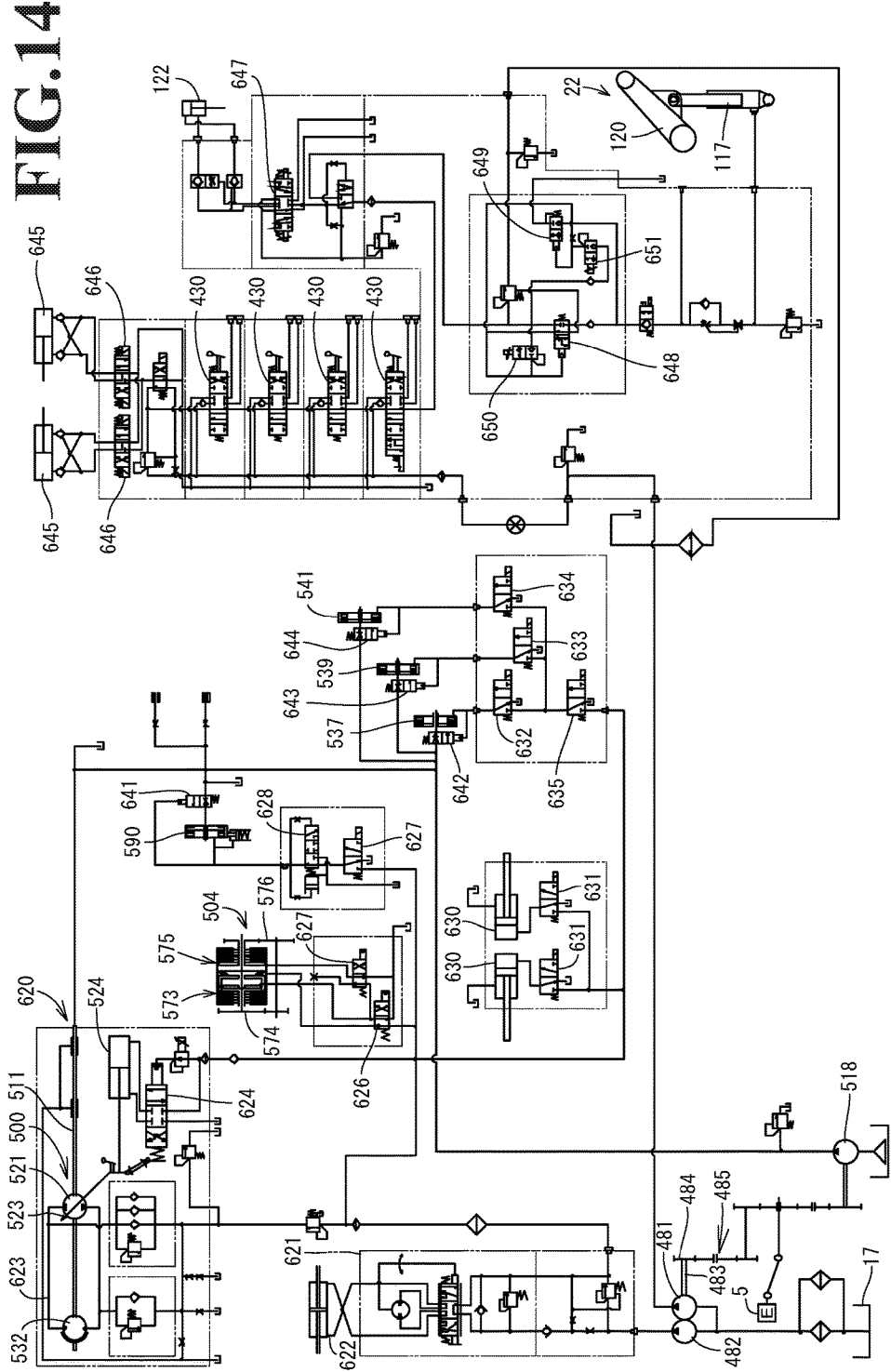
FIG. 14 is a hydraulic circuit diagram of the tractor.

Next, a structure of a hydraulic circuit 620 of the tractor 1 is described with reference to FIG. 14. The hydraulic circuit 620 of the tractor 1 includes the work machine hydraulic pump 481 and the traveling hydraulic pump 482 driven by the rotational driving force from the engine 5. In the embodiment, the transmission case 17 is used as a hydraulic oil tank, and the hydraulic oil in the transmission case 17 is supplied to the work machine hydraulic pump 481 and the traveling hydraulic pump 482. The traveling hydraulic pump 482 is coupled to the steering hydraulic cylinder 622, for power steering by the steering wheel 9, and to a closed loop oil path 623, coupling the hydraulic pump 521 and the hydraulic motor 522 of the hydraulic continuously variable transmission 500 to each other, via the control valve mechanism 621 for power steering. While the engine 5 is driving, the hydraulic oil is constantly supplied from the traveling hydraulic pump 482 to the closed loop oil path 623.

The traveling hydraulic pump 482 is coupled to: a main transmission hydraulic switching valve 624 for the main transmission hydraulic cylinder 524 of the hydraulic continuously variable transmission 500; a double speed hydraulic switching valve 625 for the double speed hydraulic clutch 573; a four-wheel drive hydraulic switching valve 626 for the four-wheel drive hydraulic clutch 575; a PTO clutch solenoid valve 627 for the PTO hydraulic clutch 590; and a switching valve 628 operated by the PTO clutch solenoid valve 627.

Furthermore, the traveling hydraulic pump 482 is coupled to: left and right auto brake solenoid valves 631 as switching valves each operating a corresponding one of a pair of left and right brake cylinders 630 for auto braking; a forward traveling low speed clutch solenoid valve 632 for operating the forward traveling low speed hydraulic clutch 537; a forward traveling high speed clutch solenoid valve 633 for operating the forward traveling high speed hydraulic clutch 539; a backward traveling clutch solenoid valve 634 for operating the backward traveling hydraulic clutch 541; and a master control solenoid valve 635 for controlling supplying of hydraulic oil to the clutch solenoid valve 632 to 634.

The work machine hydraulic pump 481 is coupled to a plurality of the hydraulic output valves 430 stacked on an upper surface of the hydraulic lifting and lowering mechanism 22 on a rear side of the upper surface of the transmission case 17, left and right track adjustment solenoid valves 646 for controlling hydraulic oil supplying to left and right track adjustment hydraulic cylinders 645 for adjusting the track (axle track) between the left and right rear wheels 4, an inclining control solenoid valve 647 for controlling hydraulic oil supplying to the horizontal cylinder 122 provided to the right lift rod 121, a lifting hydraulic switching valve 648 and a lowering hydraulic switching valve 649 for controlling hydraulic oil supplying to the hydraulic lift cylinders 117 in the hydraulic lifting and lowering mechanism 22, a lifting control solenoid valve 650 with which a switching operation for the lifting hydraulic switching valve 648 is performed, and a lowering control solenoid valve 651 for operating the lowering hydraulic switching valve 649.

When the left and right track adjustment solenoid valves 646 are drivingly switched, the left and right track adjustment hydraulic cylinders 645 make a telescopic movement, and thus the left and right rear axle cases 19 make a telescopic movement in the left and right direction. As a result, the track between the left and right rear wheels 4 increases or decreases. When the inclining control solenoid valve 647 is drivingly switched, the horizontal cylinder 122 makes a telescopic movement, and the right lower link 23 moves upward and downward via a lower link pin on a front side. As a result, the ground work machine inclines left and right with respect to the traveling machine body 2 via the left and right lower links 23, and thus the left and right inclined angle of the ground work machine changes via the left and right lower links 23. When the switching operation is performed on the lifting hydraulic switching valve 648 with the lifting control solenoid valve 650 or performed on the lowering hydraulic switching valve 649 with the lowering control solenoid valve 651, the hydraulic lift cylinder 117 makes a telescopic movement and the lift arm 120 and the left and right lower links 23 move together upward or downward. Thus, the position of the ground work machine in the height direction changes.

The hydraulic circuit 620 of the tractor 1 includes the work machine hydraulic pump 481 and the traveling hydraulic pump 482 as described above, and further includes the lubricant oil pump 518 driven by rotational driving force of the engine 5. The lubricant oil pump 518 is connected to a PTO clutch hydraulic switching valve 641 with which hydraulic oil (lubricant oil) is supplied to a lubricated portion of the PTO hydraulic clutch 590, a forward traveling low speed clutch hydraulic switching valve 642 with which the hydraulic oil (lubricant oil) is supplied to a lubricated portion of the input transmission shaft 511 that supports the hydraulic continuously variable transmission 500 and a lubricated portion of the forward traveling low speed hydraulic clutch 537, a forward traveling high speed clutch hydraulic switching valve 643 with which the hydraulic oil (lubricant oil) is supplied to a lubricated portion of the forward traveling high speed hydraulic clutch 539, and a backward clutch hydraulic switching valve 644 with which the hydraulic oil (lubricant oil) is supplied to a lubricated portion of the backward traveling hydraulic clutch 541. The hydraulic circuit 620 includes a relief valve, a flowrate adjustment valve, a check valve, an oil cooler, an oil filter, and the like.

As is apparent from the description above and FIG. 13 and FIG. 15 to FIG. 20, a work vehicle includes: the engine 5 installed in the traveling machine body 2; the transmission case 17 configured to shift the driving force from the engine 5; and the rear traveling units 4 provided on left and right sides of the transmission case 17 via the rear axle cases 19. The transmission case 17 incorporates the differential mechanism 506 with which the driving force shifted through the transmission case 17 is transmitted to the left and right rear traveling units 4. The front chamber 495, the intermediate chamber 497, and the rear chamber 496 are formed in the transmission case 17. The rear chamber 496 is provided with the supporting wall portions 613 and 614 that partition the rear chamber 496 into front and rear portions. The differential mechanism 506 is disposed more on the front side than the supporting wall portions 613 and 614 in the rear chamber 496. The PTO transmission mechanism 505, with which the driving force from the engine 5 is shifted and transmitted to the PTO shaft 25 protruding rearward from the transmission case 17, is disposed more on the rear side than the supporting wall portions 613 and 614 in the rear chamber 496. Thus, the differential mechanism 506 and the PTO transmission mechanism 505 (PTO transmission system) are separately arranged in a simple and compact manner in the rear chamber 496 of the transmission case 17, whereby the assemblability and maintainability of the transmission case 17 can be improved.

The rear lid member 492 that is detachably attached to close the rear surface opening portion of the transmission case 17 is provided. The PTO transmission mechanism 505 can be put into and out from a portion more on the rear side than the upper and lower supporting wall portions 613 and 614 in the rear chamber 496 by detaching the rear lid member 492. When the PTO transmission mechanism 505 is installed in the portion more on the rear side than the upper and lower supporting wall portions 613 and 614 in the rear chamber 496, the PTO transmission mechanism 505 is supported by the upper and lower supporting wall portions 613 and 614 and the rear lid member 492. Thus, the PTO transmission mechanism 505 can be exposed when the rear lid member 492 is detached from the transmission case 17. All things considered, the assemblability/disassemblability of the transmission case 17 and the maintainability of the PTO transmission mechanism 505 can further be improved.

The three shafts forming the PTO transmission mechanism 505 and the PTO shaft 25, positioned at the apices of the rectangular form in back view, are supported by the supporting wall portions 613 and 614 and the rear lid member 492. Thus, the reaction force from the shafts 25 and 591 to 593, due to increased PTO output, can be canceled out. As a result, a longer service life of the bearing structure for the shafts 25 and 591 to 593 can be achieved, and the vibration transmitted to the transmission case 17 and the traveling machine body 2 can be reduced.

Next, a hydraulic oil suction structure for the transmission case 17 is described with reference to FIG. 22 to FIG. 25. The work machine and traveling hydraulic pumps 481 and 482, driven by the driving force transmitted through the transmission case 17, are disposed on one of left and right portions of the transmission case 17. Double oil filters 656 that protrude outward and filter the hydraulic oil in the transmission case 17 are disposed below the work machine and traveling hydraulic pumps 481 and 482 disposed on one of left and right portions of the transmission case 17, via a filter bracket 655.

In the embodiment illustrated in FIG. 22 to FIG. 25, the pump case 480 is disposed on a front portion of the right outer surface of the rear transmission case 113 in the transmission case 17. The pump case 480 accommodates the work machine hydraulic pump 481 and the traveling hydraulic pump 482. The work machine hydraulic pump 481 and the traveling hydraulic pump 482 have inlet sides connected to the double oil filters 656, disposed below the pump case 480 in the front portion of the right outer surface of the rear transmission case 113, via the filter bracket 655. The double oil filters 656 are detachably attached to the filter bracket 655. A suction nozzle 657 extending into the transmission case 17 (into the rear transmission case 113) is attached to the filter bracket 655. The suction nozzle 657 in the rear transmission case 113 communicates with the double oil filters 656 via the filter bracket 655. The suction nozzle 657 is positioned below a front portion of the intermediate supporting plate 498 in the rear transmission case 113.

Figure 24:
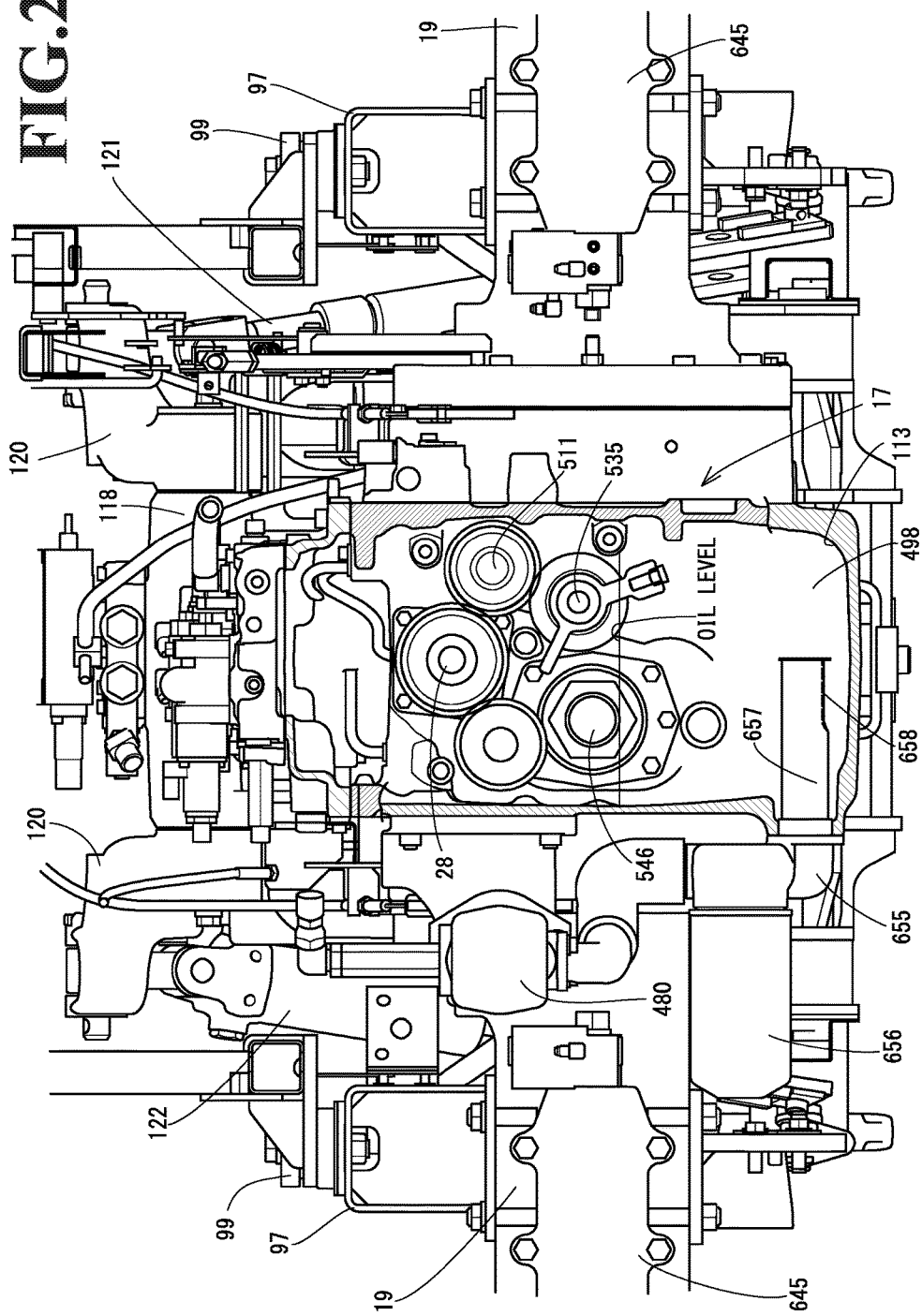
FIG. 24 is a front cross-sectional view of the rear transmission case.

As illustrated in FIG. 20 and FIG. 24, a hydraulic oil surface in the transmission case 17 is maintained to be approximately at a level immediately below the vehicle speed synchronizing shaft 564. The suction nozzle 657 is constantly positioned below the hydraulic oil surface in the transmission case 17 (in the rear transmission case 113), and extends to a lower center side in the transmission case 17 (in the rear transmission case 113). A suction port 658, open downward, is formed on a distal end side of the suction nozzle 657.

Figure 25:
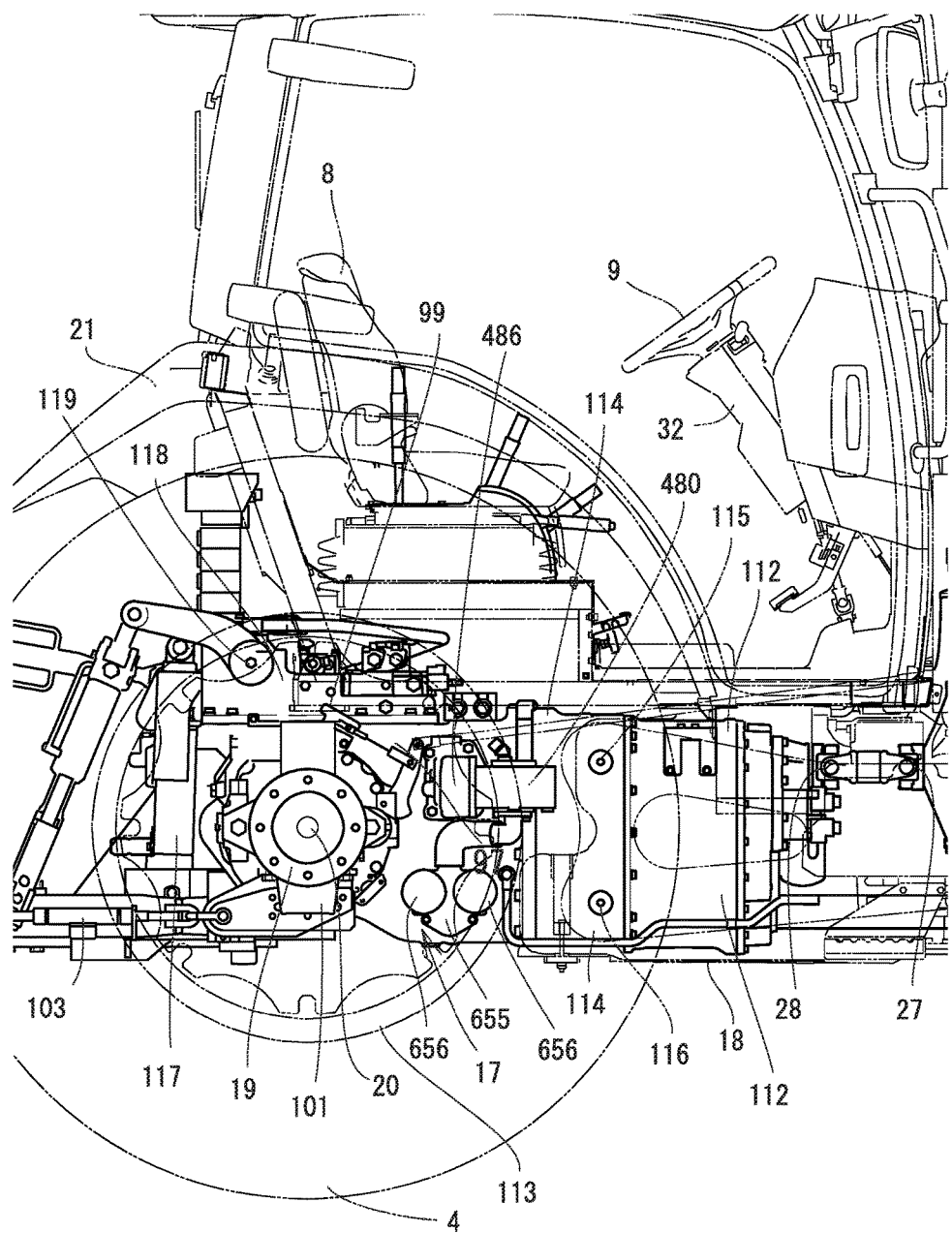
FIG. 25 is a right side enlarged view illustrating the traveling machine body.
Figure 26:
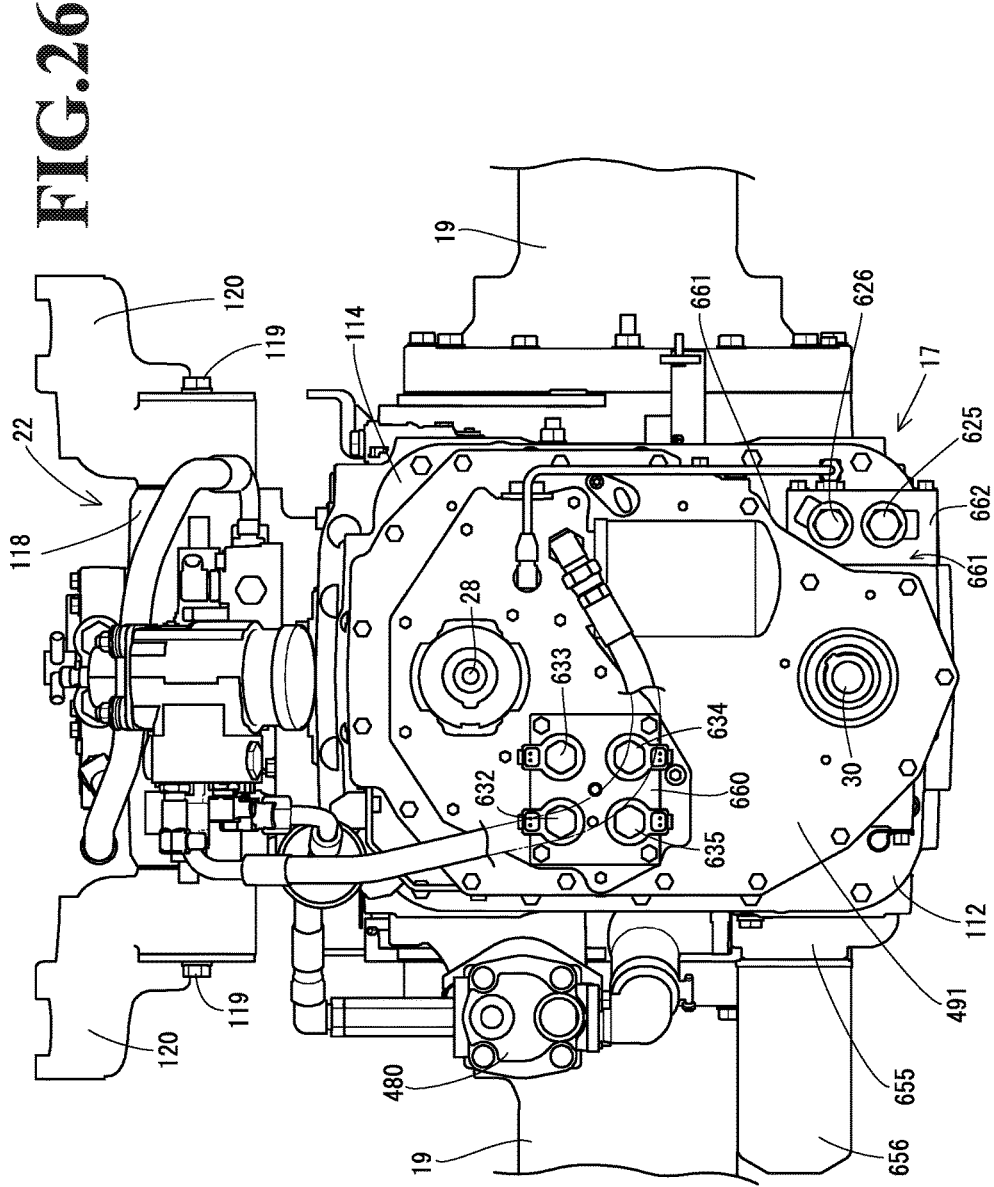
FIG. 26 is a front view of the transmission case.
Figure 27:
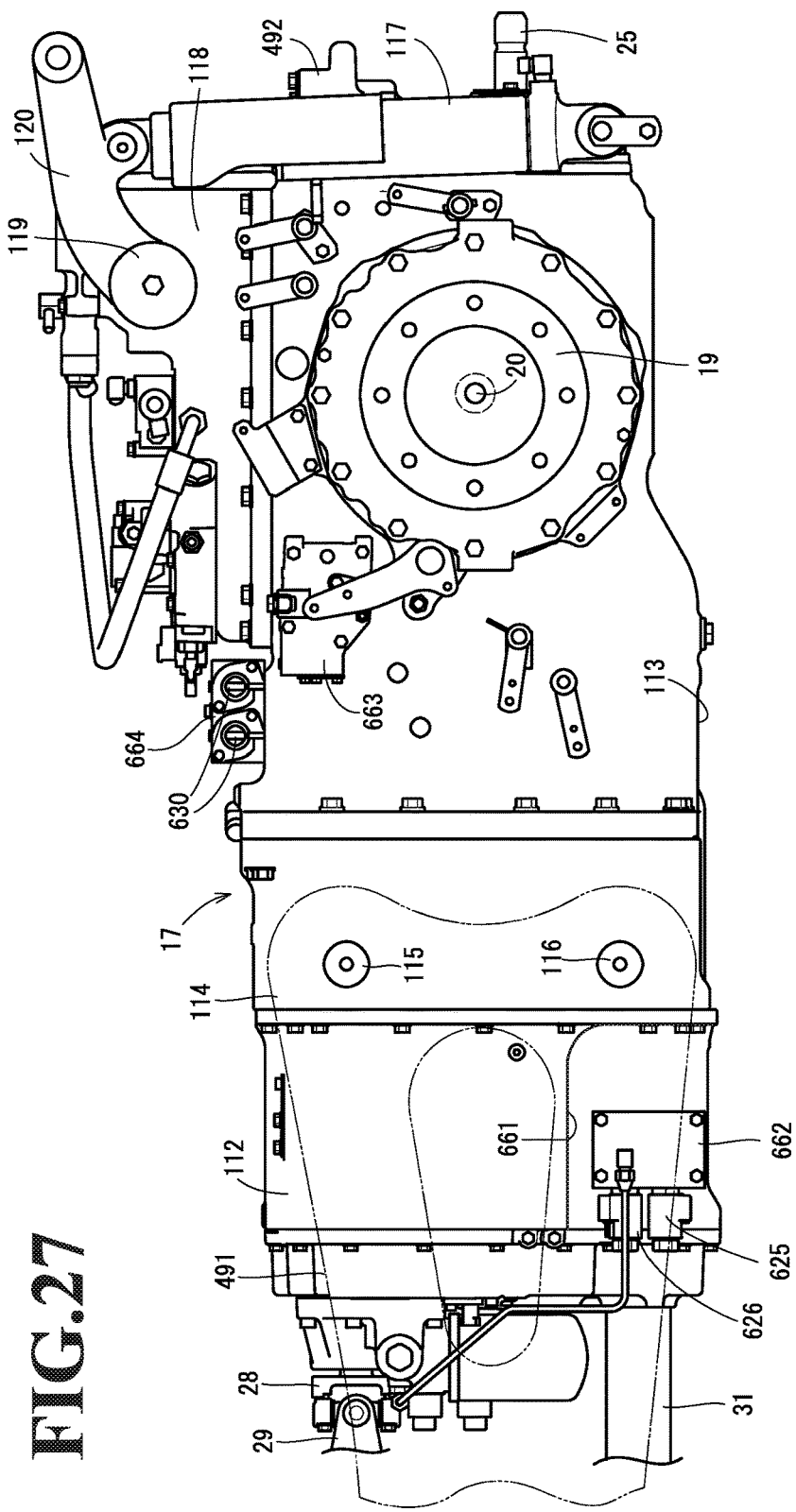
FIG. 27 is a light side view of the transmission case.
Figure 28:
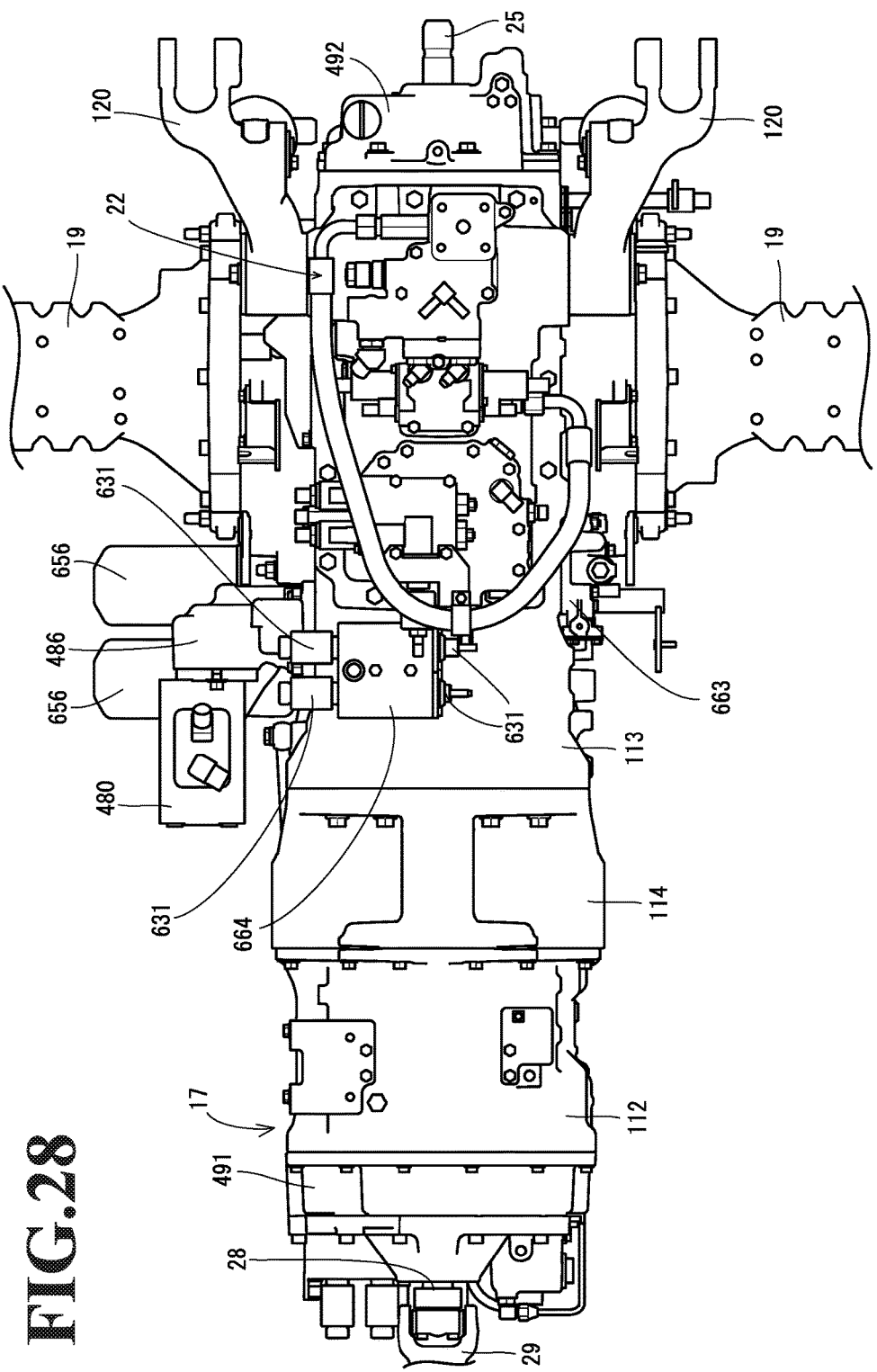
FIG. 28 is a plan view of the transmission case.

As illustrated in FIG. 25, the work machine and traveling hydraulic pumps 481 and 482 and the double oil filters 656 are positioned more on the front side than the rear axle case 19 (the right rear axle case 19 in the embodiment) protruding outward in the left and right direction from the rear transmission case 113, and below the operating seat 8 on the traveling machine body 2 (see FIG. 25). Thus, the work machine and traveling hydraulic pumps 481 and 482 and the double oil filters 656 are disposed while being separated from the operating seat 8 surrounded by the cabin 7.

Figure 22:
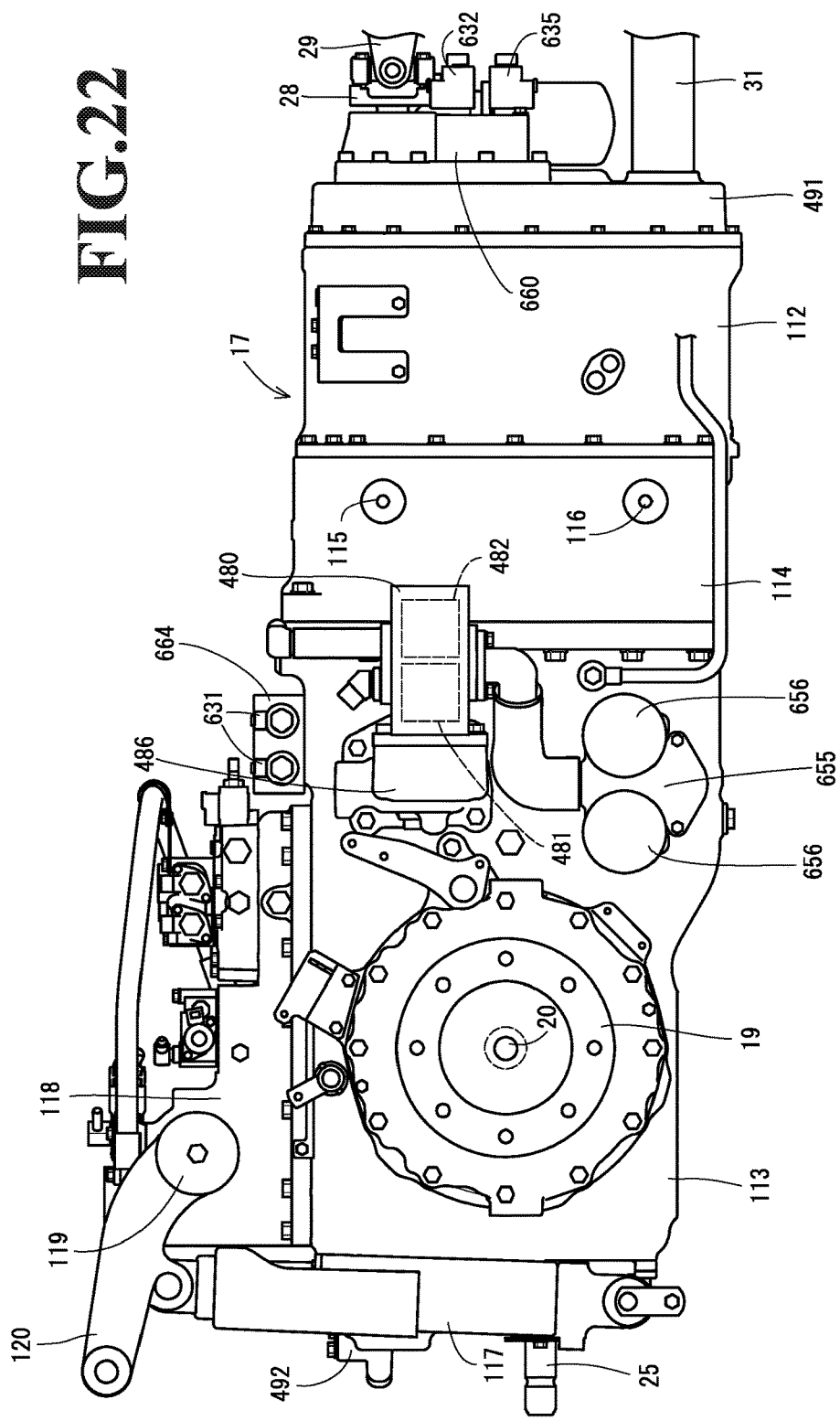
FIG. 22 is a right side view of the transmission case.
Figure 23:
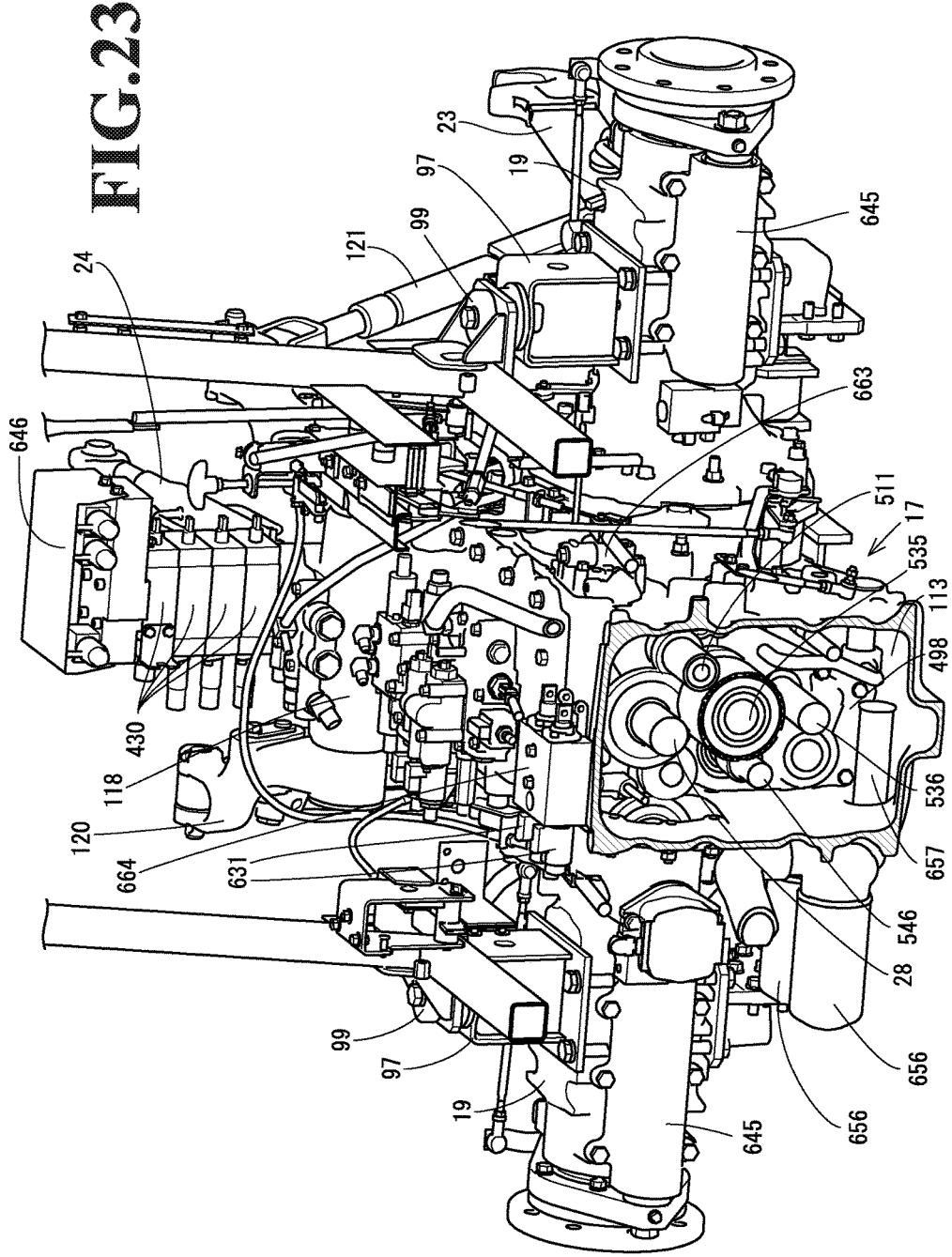
FIG. 23 is a perspective view of an internal structure of a rear transmission case as viewed from a front left side.

As FIG. 22, FIG. 24, and FIG. 25, a gear case 486 accommodating a flat gear mechanism 485 protrudes outward in the left and right direction, from a portion of the front portion of the right outer surface of the rear transmission case 113 on the upper side of the double oil filters 656. The pump case 480 is attached on the front surface side of the gear case 486. A pump drive shaft 483 protruding from the work machine and traveling hydraulic pumps 481 and 482 in the pump case 480 extends into the gear case 486. In the gear case 486, the pump drive gear 484 fixed to the pump drive shaft 483 in such a manner as to be capable of transmitting driving force to the flat gear mechanism 485 (see FIG. 13).

As illustrated in FIG. 9 to FIG. 12, the ultra-low speed lever 44 and the sub transmission lever 45 as traveling operation members and the PTO transmission lever 46 as a work operation member are disposed on the other one of the left and right sides (the left outer surface side of the rear transmission case 113) positioned on the side of the transmission case 17 opposite to the side provided with the pump case 480. The ultra-low speed lever 44 is coupled to the creep transmission gear mechanism 502, in the front chamber 495 (in the front transmission case 112) of the transmission case 17 in an interlocking manner, and the sub transmission lever 45 is coupled to the traveling sub transmission gear mechanism 503 also in the front chamber 495, in an interlocking manner. The PTO transmission lever 46 is coupled to the PTO transmission mechanism 505 in the rear chamber 496 (in the rear side portion of the rear transmission case 113) of the transmission case 17. As is apparent from FIG. 3, the ultra-low speed lever 44, the sub transmission lever 45, and the PTO transmission lever 46 protrude on the left side of the operating seat 8 corresponding to the left outer surface side of the rear transmission case 113.

As is apparent from the above description and FIG. 22 to FIG. 25, a work vehicle includes: the engine 5 installed in the traveling machine body 2; and the transmission case 17 with which the driving force from the engine 5 is shifted and transmitted to the traveling units 3 and 4 that support the traveling machine body 2. The hydraulic pumps 481 and 482 driven by the driving force transmitted through the transmission case 17 are attached to one of the left and right sides of the transmission case 17. The double oil filters 656 that filter the hydraulic oil in the transmission case 17 and protrude outward are disposed below the hydraulic pumps 481 and 482 on the one of left and right sides of the transmission case 17, via the filter bracket 655. Thus, a capacity can be increased and a sufficient amount of hydraulic oil can be certainly supplied to various hydraulic devices, without using a large piece of oil filter. The hydraulic pumps 481 and 482 and the double oil filters 656 are adjacently arranged in the upper and lower direction. Thus, the hydraulic pumps 481 and 482 and the double oil filters 656 can be connected to each other with hydraulic piping having a short length and thus, the hydraulic piping can be provided with a simple routing.

The double oil filters 656 are detachable attached to the filter bracket 655. The double oil filters 656 communicates with the suction nozzle 657 extending into the transmission case 17 via the filter bracket 655. Thus, the double oil filters 656 can be easily attached and detached, and thus a higher maintainability can be achieved for the double oil filters 656.

The suction nozzle 657 is constantly positioned below the oil surface of the hydraulic oil in the transmission case 17 and extends to the lower center side in the transmission case 17. The suction port 658 of the suction nozzle 657 is open downward. Thus, the hydraulic oil in the transmission case 17 can be sucked without air entrainment.

The hydraulic pumps 481 and 482 and the double oil filters 656 are positioned more on the front side than the rear axle case 19 provided on the left and right sides of the transmission case 17 and is positioned below the operating seat 8 on the traveling machine body 2. Thus, the hydraulic pumps 481 and 482 and the double oil filters 656 are disposed on the front side of the rear axle case 19, that is, on the inner side of the rear traveling unit 4 in the left and right direction where a work place can be easily provided. Furthermore, operation sound (noise) from the hydraulic pumps 481 and 482 is less likely to reach the operator, and thus the configuration contributes to an attempt to achieve a more silent environment around the operating seat 8.

As is apparent from the above description and FIG. 22 to FIG. 25, a work vehicle includes: the engine 5 installed in the traveling machine body 2; and the transmission case 17 with which the driving force from the engine 5 is shifted and transmitted to the traveling units 3 and 4 that support the traveling machine body 2. The work vehicle further includes: the hydraulic pumps 481 and 482 for the hydraulic devices; and the gear mechanism 485 with which the driving force from the engine 5 is transmitted to the hydraulic pumps 481 and 482. The hydraulic pumps 481 and 482 are disposed in a driving-force transmittable manner at a portion more on the front side than the rear axle case 19 on one of the left and right sides of the transmission case 17 and below the operating seat 8 on the traveling machine body 2, via the gear case 486 accommodating the gear mechanism 485. Thus, the hydraulic pumps 481 and 482 can be disposed with the portion on the front side of the rear axle case 19, that is, on the inner side of the rear traveling unit 4 in the left and right direction where the work space can be easily provided effectively utilized. This facilitates an attempt to achieve the transmission case 17 with a compact structure. The hydraulic pumps 481 and 482 and the like are disposed below the operating seat 8 so that their operation sound (noise) is less likely to reach the operator. Thus, an attempt to achieve a more silent environment around the operating seat 8 can also be facilitated.

The traveling operation members 44 and 45 and the work operation member 46 that are manually operated are disposed on the other one of the left and right sides of the operating seat 8 corresponding to the other one of the left and right sides of the transmission case 17. Thus, the hydraulic system such as the hydraulic pumps 481 and 482 and the double oil filters 656 are collectively provided on one of the left and right sides of the transmission case 17, whereas the operation system such as the traveling operation members 44 and 45 and the work operation member 46 are collectively provided on the other one of the left and right sides of the transmission case 17. Thus, the maintenance for the hydraulic system can be collectively performed on one of the left and right sides of the transmission case 17, whereas the maintenance for the operation system can be collectively performed on the other one of the left and right sides of the transmission case 17. All things considered, the assemblability and the maintainability of the transmission case 17 can be improved.

Next, an arrangement structure of various valves 632 to 635 for the forward/backward traveling switching mechanism 501 is described with reference to FIG. 14, FIG. 16, FIG. 17, and FIG. 26 to FIG. 28. As described above, the engine 5 is installed on the pairs of left and right engine frames 14 and left and right vehicle body frames 15 forming the frame member. The transmission case 17 (intermediate case 114) is coupled to the rear portions of the left and right vehicle body frames 15 while being sandwiched by a total of four vehicle body coupling shaft members 115 and 116. The engine 5 and the transmission case 17 are coupled in a driving-force transmittable manner, via the driving force transmission shaft 29.

As illustrated in FIG. 16, FIG. 17, and FIG. 26 to FIG. 28, the transmission case 17 includes: the forward traveling low speed hydraulic clutch 537 and the forward traveling high speed hydraulic clutch 539 as the forward traveling hydraulic clutch with which the normal rotation output toward the traveling units 3 and 4 is connected or disconnected; the forward traveling low speed clutch solenoid valve 632 (forward traveling valve) with which the forward traveling low speed hydraulic clutch 537 is operated; the forward traveling high speed clutch solenoid valve 633 (forward traveling valve) with which the forward traveling high speed hydraulic clutch 539 is operated; the backward traveling hydraulic clutch 541 with which a reverse rotation output toward the traveling units 3 and 4 is connected or disconnected; the backward traveling clutch solenoid valve 634 (backward traveling valve) with which the backward traveling hydraulic clutch 541 is operated; and the master control solenoid valve 635 (master valve) with which the hydraulic oil supplying to the clutch solenoid valves 632 to 634 is controlled.

A part of the hydraulic circuit 620, establishing connection between the traveling hydraulic pump 482 as the hydraulic pressure source and the hydraulic clutches 537, 539, and 541, is formed on the front lid member 491 that is detachably fastened to the front surface of the transmission case 17, that is the front surface of the front transmission case 112. The clutch solenoid valves 632, 633, and 634 and the master control solenoid valve 635 are disposed on the front surface side of the front lid member 491.

In the embodiment, the clutch solenoid valves 632, 633, and 634 and the master control solenoid valve 635 are assembled to the oil path block 660 to form a unit. The oil path block 660 in which the clutch solenoid valves 632, 633, and 634 and the master control solenoid valve 635 are assembled is detachably fastened on the front surface side of the front lid member 491. As can be seen in the front view in FIG. 26, the forward traveling low speed clutch solenoid valve 632, the forward traveling high speed clutch solenoid valve 633, the master control solenoid valve 635, and the backward traveling clutch solenoid valve 634 are respectively positioned on the upper left side, the upper right side, the lower left side, and the lower left side of the front surface of the oil path block 660.

Figure 16:
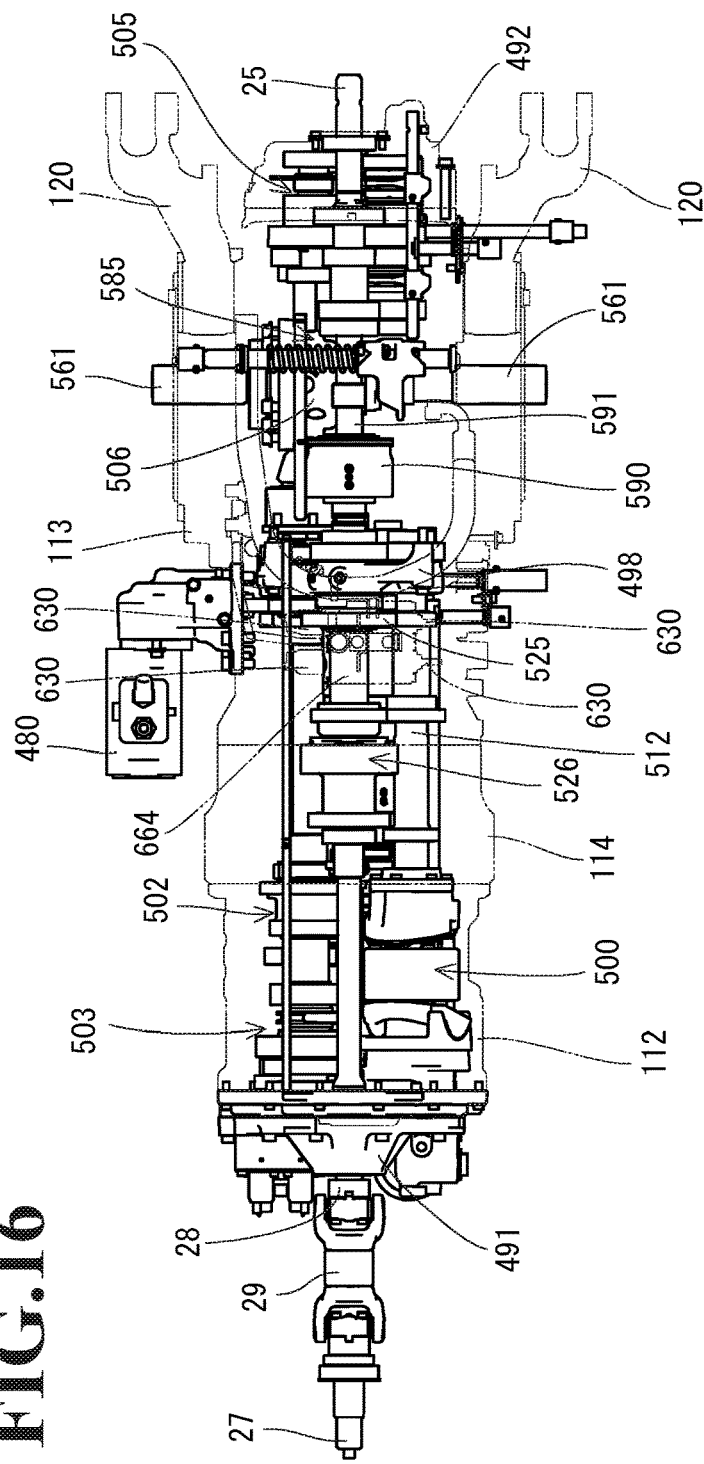
FIG. 16 is a plan view illustrating the internal structure of the transmission case.
Figure 17:
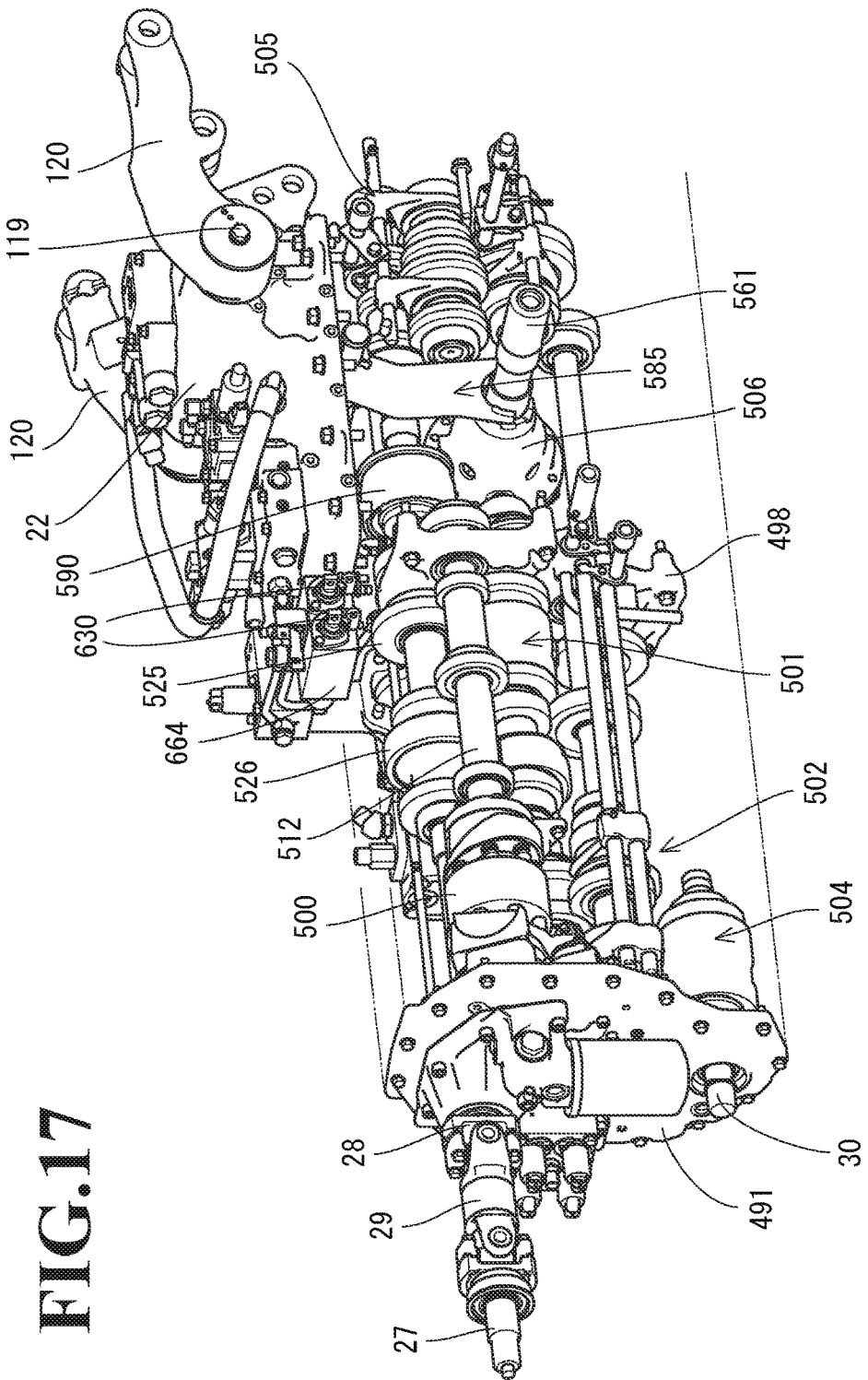
FIG. 17 is a perspective view illustrating the internal structure of the transmission case.

As can be seen in FIG. 16 and FIG. 17, the forward/backward traveling switching mechanism 501 is positioned on the front side in the transmission case 17 (in the intermediate case 114 and the front side of the rear transmission case 113 (in the intermediate case 114)

As is apparent from the above description and FIG. 14, FIG. 16, FIG. 17, and FIG. 26 to FIG. 28, a work machine includes: the engine 5 installed in the traveling machine body 2 supported by the traveling units 3 and 4; and the transmission case 17 incorporating the hydraulic continuously variable transmission 500 that shifts the driving force from the engine 5. The forward/backward traveling switching mechanism 501 configured to switch the output from the hydraulic continuously variable transmission 500 between the normal rotation and the reverse rotation directions is disposed in the transmission case 17. The engine 5 is installed on the front portion of the frame members 14 and 15 forming the traveling machine body 2. The transmission case 17 is coupled to the rear portion of the frame members 14 and 15. The engine 5 and the transmission case 17 are coupled to each other in a driving force transmittable manner via the driving force transmission shaft 29. This structure includes: the forward traveling valves 632 and 633 for the forward traveling hydraulic clutches 537 and 539 that enable and disable the normal rotation output to be transmitted toward the traveling units 3 and 4; the backward traveling valve 634 for the backward traveling hydraulic clutch 541 that enable and disable the reverse rotation output to be transmitted toward the traveling units 3 and 4; and the master valve 635 that controls the hydraulic oil supplying to the forward traveling valves 632 and 633 and the backward traveling valve 634. The part of the hydraulic circuit 620, establishing connection between the hydraulic pressure source 482 and the hydraulic clutches 537, 539, and 541, is formed on the front lid member 491 that is detachably attached to close the front surface opening of the transmission case 17. The forward traveling valves 632 and 633, the backward traveling valve 634, and the master valve 635 are attached on the front surface side of the front lid member 491. Thus, the forward traveling valves 632 and 633, the backward traveling valve 634, and the master valve 635 can be disposed with a dead space between the engine 5 and the transmission case 17 effectively used, whereby space saving can be achieved.

The forward traveling valves 632 and 633, the backward traveling valve 634, and the master valve 635 are assembled to the oil path block 660 to form a unit. The oil path block 660 is detachably attached on the front surface side of the front lid member 491. Thus, a compact hydraulic system related to the traveling of the work vehicle can be achieved. Assembling processes for the hydraulic system related to the traveling can be reduced in a manufacturing line for the work vehicle. The forward traveling valves 632 and 633, the backward traveling valve 634, and the master valve 635 can be attached to and detached from the front surface side of the front lid member 491 by attaching and detaching the oil path block 660, whereby a maintainability of the valves 632 to 635 can be improved.

The forward traveling hydraulic clutches 537 and 539 and the backward traveling hydraulic clutch 541 of the forward/backward traveling switching mechanism 501 are disposed on the front side in the transmission case 17. Thus, a group of the valves 632 to 635 and a group of the hydraulic clutches 537, 539, and 541 can be arranged closed to each other in the front and rear direction. Thus, the group of the valves 632 to 635 and the group of the hydraulic clutches 537, 539, and 541 can be connected to each other with the hydraulic piping having a short length, whereby the hydraulic piping can be provided with a simple routing and a hydraulic pressure loss can be reduced.

Figure 15:
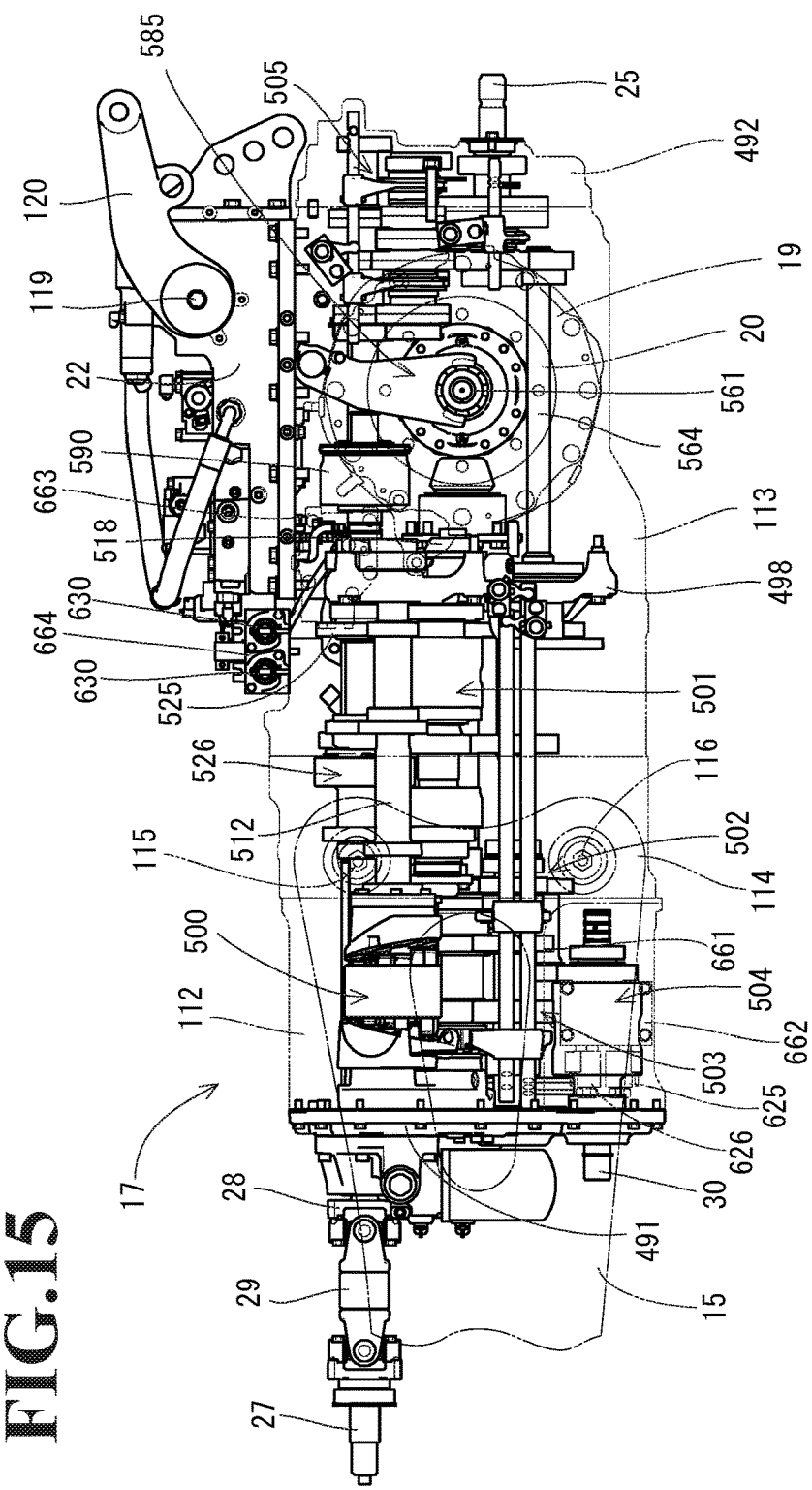
FIG. 15 is a left side view illustrating an internal structure of a transmission case.

Next, an arrangement structure of various valves 625 and 626 for the two-wheel drive/four-wheel drive switching mechanism 504 is described with reference to FIG. 14, FIG. 15, FIG. 17, and FIG. 26 to FIG. 28. As illustrated in FIG. 15, FIG. 17, and FIG. 26 to FIG. 28, the transmission case 17 includes: the double speed hydraulic switching valve 625 (double speed valve) for the double speed hydraulic clutch 573 forming the two-wheel drive/four-wheel drive switching mechanism 504; and the four-wheel drive hydraulic switching valve 626 (four-wheel drive valve) for the four-wheel drive hydraulic clutch 575 also forming the two-wheel drive/four-wheel drive switching mechanism 504. As illustrated in FIG. 15 and FIG. 17, the two-wheel drive/four-wheel drive switching mechanism 504 is positioned in the front chamber 495 (front transmission case 112) of the transmission case. Thus, the double speed hydraulic clutch 573 and the four-wheel drive hydraulic clutch 575 are accommodated in the front transmission case 112.

A recessed portion 661 recessed inward in the left and right direction is formed on a front side lower portion of the left outer surface of the transmission case 17, that is, on a lower portion of the left outer surface of the front transmission case 112. In this embodiment, the portion where the recessed portion 661 is formed and the two-wheel drive/four-wheel drive switching mechanism 504 (the double speed hydraulic clutch 573 and the four-wheel drive hydraulic clutch 575) overlap each other in side view. The double speed hydraulic switching valve 625 and the four-wheel drive hydraulic switching valve 626 are attached to the recessed portion 661 via an oil path base 662. As can be seen in the front view in FIG. 26, the four-wheel drive hydraulic switching valve 626 and the double speed hydraulic switching valve 625 are respectively positioned on the upper side and the lower side on the front surface of the oil path base 662. Thus, the double speed hydraulic switching valve 625, four-wheel drive hydraulic switching valve 626, and the oil path base 662 are disposed at positions overlapping the double speed hydraulic clutch 573 and four-wheel drive hydraulic clutch 575 in side view.

The double speed hydraulic switching valve 625, the four-wheel drive hydraulic switching valve 626, and the oil path base 662 are positioned in the recessed portion 661 of the front transmission case 112. Thus, the double speed hydraulic switching valve 625, the four-wheel drive hydraulic switching valve 626, and the oil path base 662 have outer sides in the left and right direction covered with the left vehicle body frame 15 forming the frame member in this embodiment (see FIG. 15, and FIG. 27).

As is apparent from the above description and FIG. 14, FIG. 15, FIG. 17, and FIG. 26 to FIG. 28, a work vehicle includes: the engine 5 installed in the traveling machine body 2 supported by the four front and rear wheels 3 and 4; and the transmission case 17 incorporating the hydraulic continuously variable transmission 500 that shifts the driving force from the engine 5. The transmission case 17 incorporates the two-wheel drive/four-wheel drive switching mechanism 504 for switching between the two wheel drive and the four wheel drive of the four front and rear wheels 3 and 4. The double speed valve 625 for the double speed hydraulic clutch 573 forming the two-wheel drive/four-wheel drive switching mechanism 504 the four-wheel drive valve 626 for the four-wheel drive hydraulic clutch 575 forming the two-wheel drive/four-wheel drive switching mechanism 504 are provided. The double speed valve 625 and the four-wheel drive valve 626 are disposed at positions overlapping with the double speed hydraulic clutch 573 and the four-wheel drive hydraulic clutch 575 on one of the left and right side surfaces of the transmission case 17 in side view. Thus, the group of the valves 625 and 626 and the group of the hydraulic clutches 573 and 575 are arranged closed to each other, whereby the group of valves 625 and 626 and the group of the hydraulic clutches 573 and 575 can be connected to each other with the hydraulic piping having a short length. All things considered, the hydraulic piping can be provided with a simple routing and a hydraulic pressure loss can be reduced.

Specifically, in this embodiment, the engine 5 is installed in the front portion of the frame members 14 forming the traveling machine body 2. The intermediate case 114 of the transmission case 17 is coupled to the rear portion of the frame members 14 and 15. The recessed portion 661, recessed inward in the left and right direction, is formed on one of the left and right portions of the front case 112. The double speed valve 625 and the four-wheel drive valve 626 are attached to the recessed portion 661. The double speed valve 625 and the four-wheel drive valve 626 have the outer sides in the left and right direction covered with one of the left and right frame members 15. Thus, the front case 112 of the transmission case 17 and one of the left and right frame members 15 sandwich the left and right sides of the double speed valve 625 and the four-wheel drive valve 626, whereby the double speed valve 625 and the four-wheel drive valve 626 can be protected with the front case 112 of the transmission case 17 and one of the left and right frame members 15. All things considered, a risk of mud of a paddy field and the like making the double speed valve 625 and the four-wheel drive valve 626 dirty or damaged can be reduced.

Next, an arrangement structure of the PTO valves 627 and 628 for operating the PTO hydraulic clutch 590 is described with reference to FIG. 14, FIG. 15, FIG. 17, FIG. 27, and FIG. 28. As illustrated in FIG. 15, FIG. 17, FIG. 27, and FIG. 28, the transmission case 17 includes: the PTO hydraulic clutch 590 with which the transmission of the driving force to the PTO transmission mechanism 505 is enabled/disabled; and the PTO valve case 663 accommodating the PTO clutch solenoid valve 627 and the switching valve 628 (PTO valve) for operating the PTO hydraulic clutch 590. As illustrated in FIG. 15, and FIG. 17, the PTO hydraulic clutch 590 and the PTO transmission mechanism 505 are positioned in the rear chamber 496 of the transmission case 17 (in the rear side portion of the rear transmission case 113). Thus, the PTO hydraulic clutch 590 and the PTO transmission mechanism 505 are accommodated in the rear transmission case 113.

As illustrated in FIG. 15, the PTO valve case 663 is disposed at the position of the left outer surface of the transmission case 17, that is, the front portion of the left outer surface of the rear transmission case 113, overlapping with the PTO hydraulic clutch 590 in side view. As described above, the pump case 480, accommodating the work machine hydraulic pump 481 and the traveling hydraulic pump 482 driven by the rotary driving force from the engine 5, is attached to the front portion of the right outer surface of the rear transmission case 113. Thus, the pump case 480 and the PTO valve case 663 are positioned on the left and right sides of the rear transmission case 113.

As is apparent from the above description and FIG. 14, FIG. 15, FIG. 17, FIG. 27, and FIG. 28, a work vehicle includes: the engine 5 installed in the traveling machine body 2; and the transmission case 17 incorporating the hydraulic continuously variable transmission 500 that shifts the driving force from the engine 5. The transmission case 17 incorporates: the PTO transmission mechanism 505 with which the driving force from the engine 5 is shifted and transmitted to the PTO shaft 25 protruding rearward from the transmission case 17; and the PTO hydraulic clutch 590 with which the transmission of the driving force to the PTO transmission mechanism 505 is enabled and disabled. The work vehicle includes the PTO valves 627 and 628 for operating the PTO hydraulic clutch 590. The PTO valves 627 and 628 are disposed at positions of one of the left and right side surfaces of the transmission case 17 overlapping with the PTO hydraulic clutch 590 in side view. Thus, the PTO valves 627 and 628 and the PTO hydraulic clutch 590 are closely arranged, whereby the PTO valves 627 and 628 and the PTO hydraulic clutch 590 can be connected to each other with the hydraulic piping having a short length. Thus, the hydraulic piping can be provided with a simple routing and a hydraulic pressure loss can be reduced.

Specifically, in the embodiment, the PTO valves 627 and 628 are positioned on the one of the left and right surfaces of the rear case 113 that is more on the front side than the rear axle case 19 in the rear case 113 and is positioned on the opposite side of the hydraulic pumps 481 and 482. Thus, the hydraulic pumps 481 and 482 and the PTO valves 627 and 628 are separately arranged on the left and right sides of the rear case 113. Thus, the hydraulic pumps 481 and 482 and the PTO valves 627 and 628 can be efficiently arranged with the portion on the front side of the rear axle case 19 where the work space can be easily provided effectively utilized. All things considered, the maintenance work for the hydraulic pumps 481 and 482 and the PTO valves 627 and 628 can be easily performed on the front side of the rear axle case 19.

Next, an arrangement structure of the pair of brake cylinders 630 for operating the left and right brake mechanisms 563 and the auto brake solenoid valves 631 (auto brake valves) for controlling hydraulic oil supplying to the brake cylinders 630 is described with reference to FIG. 14 to FIG. 17, FIG. 22, FIG. 27, and FIG. 28. As illustrates in the FIG. 15 to FIG. 17, FIG. 22, FIG. 27, and FIG. 28, the pair of brake cylinders 630 and the pair of auto brake solenoid valves 631 are disposed more on the front side than the hydraulic lifting and lowering mechanism 22 on the upper surface of the transmission case 17, that is, on the front portion of the upper surface of the rear transmission case 113. In this configuration, the pair of brake cylinders 630 and the pair of auto brake solenoid valves 631 are assembled to the brake control case 664 to form a unit. The brake control case 664 in which the pair of brake cylinders 630 and the pair of auto brake solenoid valves 631 are assembled is detachably fastened to the front portion of the upper surface of the rear transmission case 113.

The PTO valve case 663 is disposed on the left outer surface of the transmission case 17, that is, on the front portion of the left outer surface of the rear transmission case 113. As described above, the brake control case 664 is disposed on the front portion of the upper surface of the rear transmission case 113. Thus, the PTO valve case 663 and the brake control case 664 are disposed close to each other on the outer surface side of the rear transmission case 113. The hydraulic piping for the brake control case 664 and the hydraulic piping for the PTO valve case 663 (the PTO clutch solenoid valve 627 and the switching valve 628) are close to each other and thus are provided to be commonly used for the cases.

As is apparent from the above description and FIG. 14 to FIG. 17, FIG. 22, FIG. 27, and FIG. 28, a work vehicle includes: the engine 5 installed in the traveling machine body 2; the transmission case 17 incorporating the hydraulic continuously variable transmission 500 that shifts the driving force from the engine 5; and the rear traveling units 4 provided to the left and right sides of the transmission case 17 via the rear axle cases 19. The left and right brake mechanisms 563 for performing a braking operation for the left and right rear traveling unit 4 are disposed in the transmission case 17. The hydraulic lifting and lowering mechanism 22 is mounted on the upper surface of the transmission case 17. The work vehicle further includes: the pair of brake cylinders 630 for operating the brake mechanisms 563; and the auto brake valve 631 for controlling hydraulic oil supplying to the brake cylinders 630. The pair of brake cylinders 630 and the pair of auto brake valves 631 are assembled to the brake control case 664 to form a unit. The brake control case 664 is disposed more on the front side than the hydraulic lifting and lowering mechanism 22 on the upper surface of the transmission case 17. Thus, the brake control case 664 in which the pair of brake cylinders 630 and the pair of auto brake valves 631 are assembled can be disposed with the dead space on the upper surface of the transmission case 17 effectively utilized, whereby space saving can be achieved. Thus, a compact hydraulic system related to the braking of the work vehicle can be achieved. Assembling processes for the hydraulic system related to the braking can be reduced in a manufacturing line for the work vehicle. The pair of brake cylinders 630 and the pair of auto brake valves 631 can be attached to and detached from the portion on the upper surface of the transmission case 17 more on the front side than the hydraulic lifting and lowering mechanism 22 by attaching and detaching the brake control case 664. Thus, the maintainability of the brake control case 664 can be improved.

Specifically, in the embodiment, the transmission case 17 is divided into three sections of the front case 112, the intermediate case 114, and the rear case 113. The brake control case 664 is attached to the front portion of the upper surface of the rear case 113. The rear case 112 incorporates: the PTO transmission mechanism 505 with which the driving force from the engine 5 is shifted and transmitted to the PTO shaft 25 protruding rearward from the transmission case 17; and the PTO hydraulic clutch 590 that engages and disengages the transmission of the driving force to the PTO transmission mechanism 505. The PTO valves 627 and 628 for operating the PTO hydraulic clutch 590 are attached to one of the left and right side surfaces of the rear case 113. The brake control case 664 and the PTO valves 627 and 628 are arranged close to each other. Thus, the common hydraulic piping can be provided for the brake control case 664 and the PTO valves 627 and 628. The brake control case 664 and the PTO valves 627 and 628 can be connected to each other with the hydraulic piping having a short length. Thus, the hydraulic piping can be provided with a simple routing and a compact hydraulic system can be achieved in the work vehicle as a whole. Furthermore, a hydraulic pressure loss can be reduced.

Figure 18:
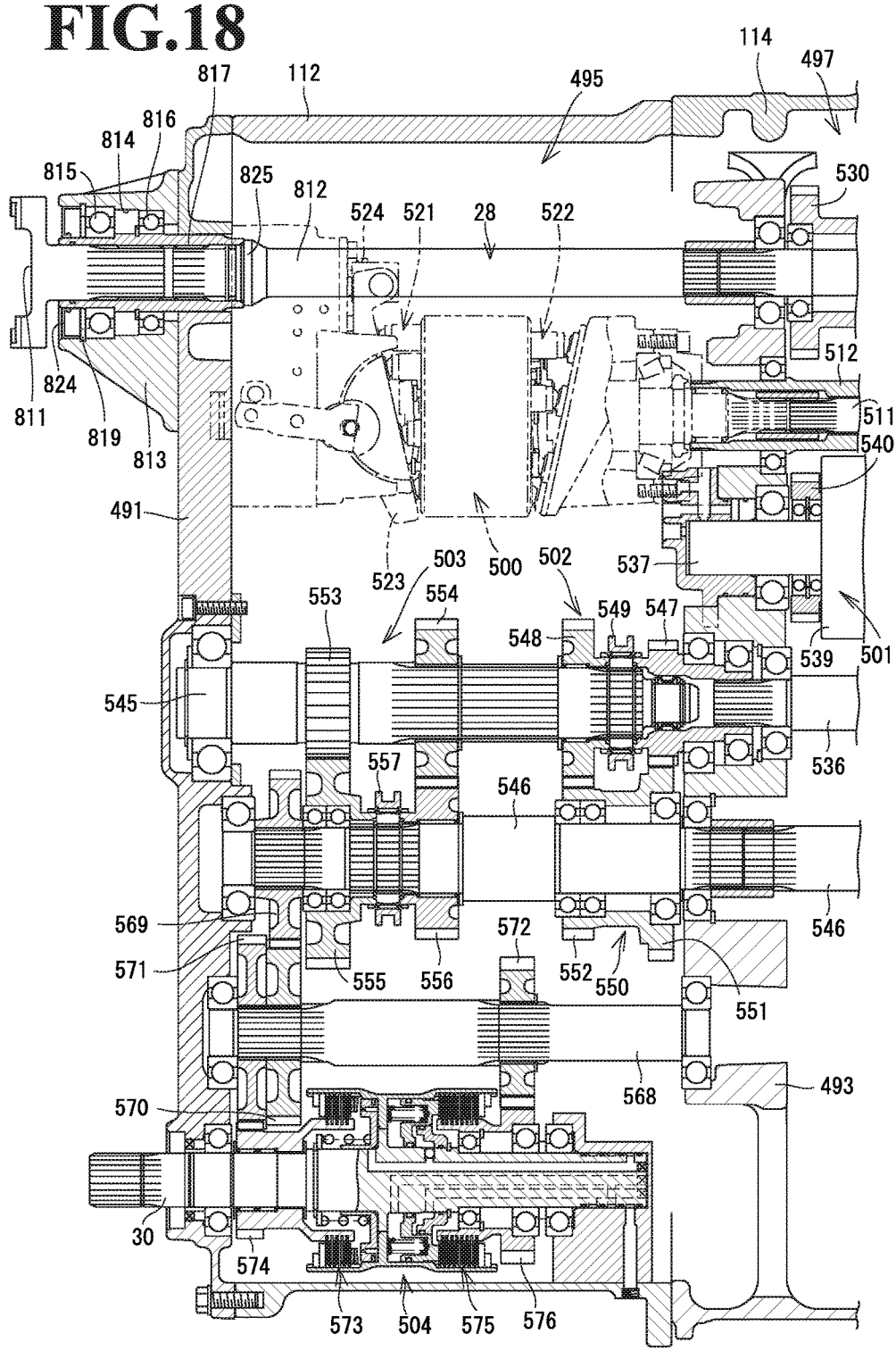
FIG. 18 is a left cross-sectional view illustrating the front portion of the transmission case.
Figure 19:
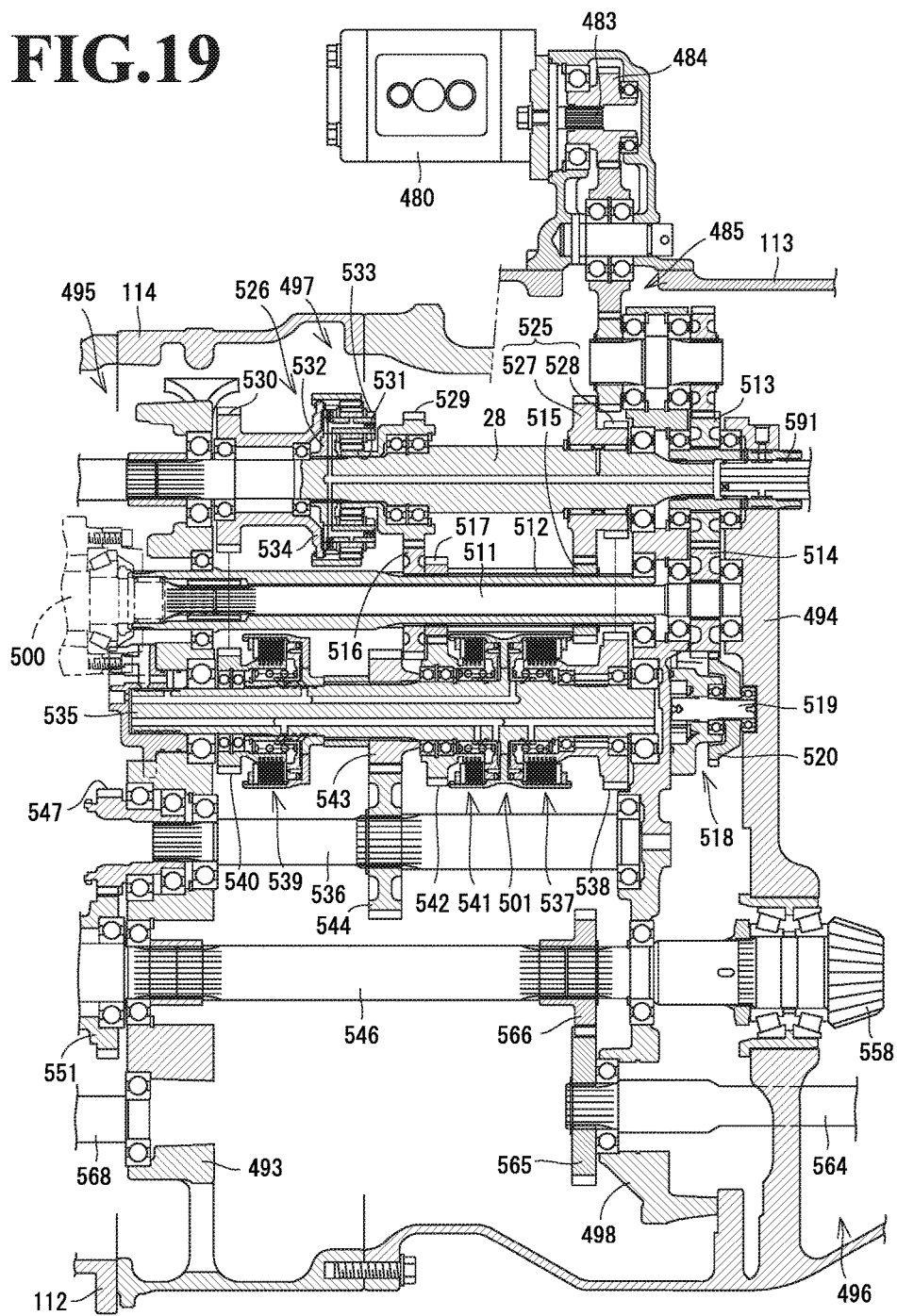
FIG. 19 is a left cross-sectional view illustrating an intermediate portion of the transmission case.
Figure 29:
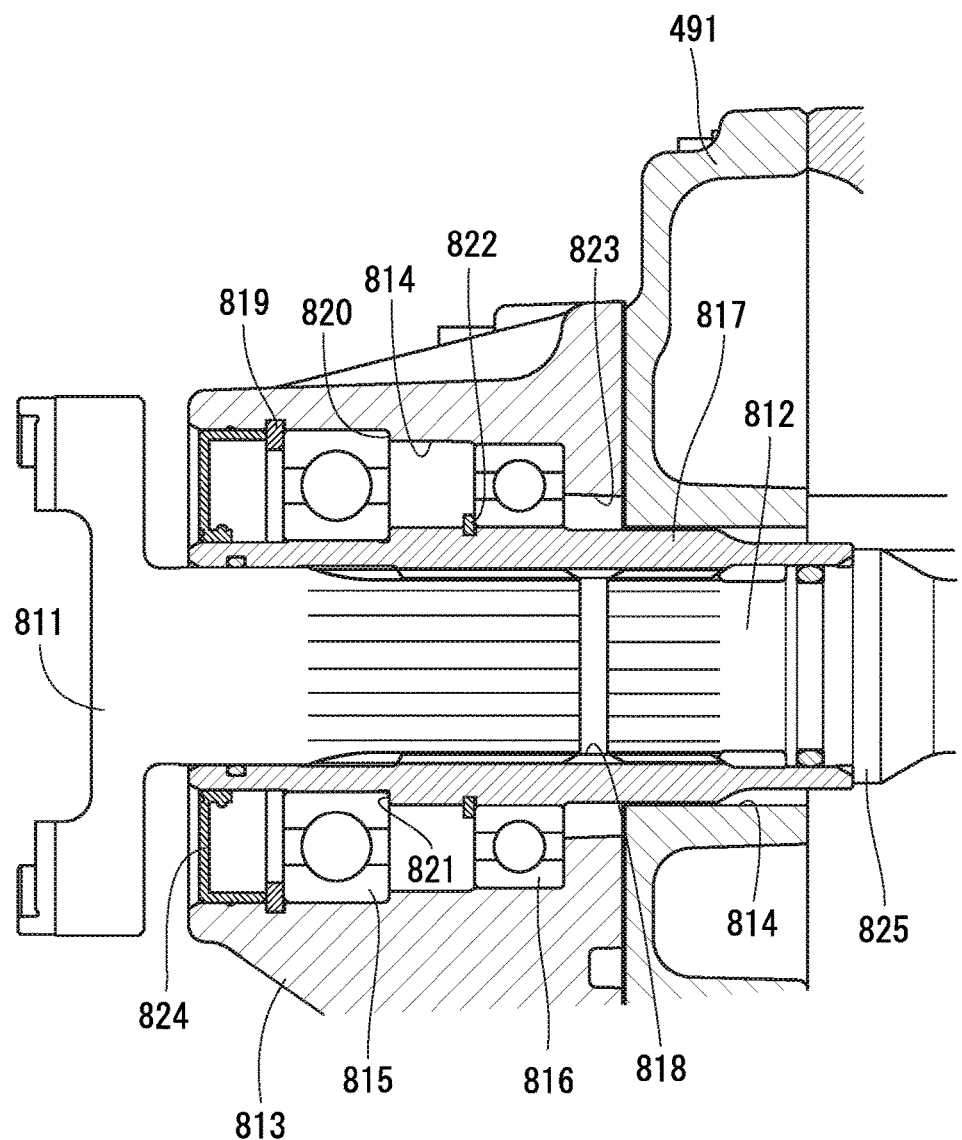
FIG. 29 is a left side cross-sectional view of a portion around a main transmission input shaft.

Next, a detail structure of the main transmission input shaft 28 is described with reference to FIG. 18, and FIG. 29 to FIG. 31. As illustrated in FIG. 18 and FIG. 29, the main transmission input shaft 28 with which the driving force is transmitted in to the transmission case from the driving force transmission shaft 29 includes: a front input shaft 811 protruding forward from the front lid member 491; and a rear input shaft 812 supported in the transmission case 17.

The front lid member 491 of the embodiment includes a front surface block member 813 on the upper portion side of the front surface. The front surface block member 813 is bolted onto the upper portion side of the front surface of the front lid member 491. An insertion hole 814 as a through hole extending concentrically in the front and rear direction is formed on the main body of the front lid member 491 and the front surface block member 813. A boss cylinder member 817 as a coupling is rotatably inserted in the insertion hole 814 of the front lid member 491 via a pair of front and rear bearing members 815 and 816. The boss cylinder member 817 has a rear end side loosely fit to a portion of the insertion hole 814 on the side of the main body of the front lid member 491.

A spline portion 818 is formed on an inner circumference side of the boss cylinder member 817. The rear end side of the front input shaft is coupled to the front side of the spline portion 818 in such a manner that the shaft can slide in the front and rear direction but cannot be relatively rotated (spline fitting). The rear end side of the rear input shaft 812 is coupled to the rear side of the spline portion 818 in such a manner that the shaft can slide in the front and rear direction but cannot be relatively rotated (spline fitting). Thus, the front input shaft 811 and the rear input shaft 812 are coupled to each other in such a manner as the be slidable in the front and rear direction but cannot rotate relative to each other, via the boss cylinder member 817. A flange portion 825 protruding radially outward is formed on the front portion side of the rear input shaft 812. In a state where the boss cylinder member 817 is inserted in the insertion hole 814 of the front lid member 491, the rear end side of the boss cylinder member 817 is in contact with the flange portion 825 of the rear input shaft 812 from the forward side.

A stopper ring 819 in a snap ring form is detachably attached to a front portion of an inner circumference of the insertion hole 814 on the side of the front surface block member 813. A front annular rib portion 820, protruding radially inward, is formed on an intermediate portion (on the rear side of the stopper ring 819) of the inner circumference of the insertion hole 814 on the side of the front surface block member 813. The front annular step portion 821 protruding radially outward in such a manner as to correspond to the front annular step portion is formed in an intermediate portion of the outer circumference of the boss cylinder member 817. The stopper ring 819 and the front annular rib portion 820 and front annular step portion 821 sandwich the front bearing member 815 as one of the pair of front and rear bearing members 815 and 816 in the front and rear direction.

An engagement ring 822 in a snap ring form is attached to a portion of the intermediate portion of the outer circumference of the boss cylinder member 817 more on the rear side than the front annular step portion 821. A rear annular rib portion 823 protruding radially inward is formed in a rear portion of the inner circumference of the insertion hole 814 on the side of the front surface block member 813. The engagement ring 822 and the rear annular rib portion 823 sandwich the rear bearing member 816 in the front and rear direction. The insertion hole 814 has an opening portion on the front end side is closed by an annular seal member 824 fit on the front end side of the boss cylinder member 817. The insertion hole 814 of the embodiment has an inner diameter gradually increase from the rear end side toward the front end side. It is a matter of course that the front bearing member 815 has a larger outer diameter than the rear bearing member 816.

In the embodiment, the boss cylinder member 817 on which the bearing members 815 and 816 are fit is inserted in the insertion hole 814 of the front lid member 491. The rear end side of the rear end side is in contact with the flange portion 825 of the rear input shaft 812 from the front side. The stopper ring 819 is attached to the front portion of the inner circumference of the insertion hole 814, and the stopper ring 819 is in contact with the front side end of the front bearing member 815. As a result, the boss cylinder member 817 is held by the stopper ring 819 and the flange portion 825 of the rear input shaft 812 in such a manner as to be prevented from being pulled out together with the bearing members 815 and 816.

For example, when the maintenance work such as cleaning of a portion around the main transmission input shaft 28 is performed, the coupling between the driving force transmission shaft 29 and the front input shaft 811 is released, and the front input shaft 811 is pulled out from the boss cylinder member 817 in a forward direction. Then, the annular seal member 824 is removed from the front end side of the insertion hole 814, and the stopper ring 819 attached to the front portion of the inner circumference of the insertion hole 814 is removed. Then, the boss cylinder member 817 is pulled out from the insertion hole 814 in the forward direction together with the bearing members 815 and 816. As a result, a disassembling operation of removing an input unit, including the front input shaft 811, the bearing members 815 and 816, and the boss cylinder member 817, with the rear input shaft 812 remaining in the transmission case 17 is completed. The procedure is performed in the reverse order when the input unit is assembled in the transmission case 17 (front lid member 491).

Figure 30:
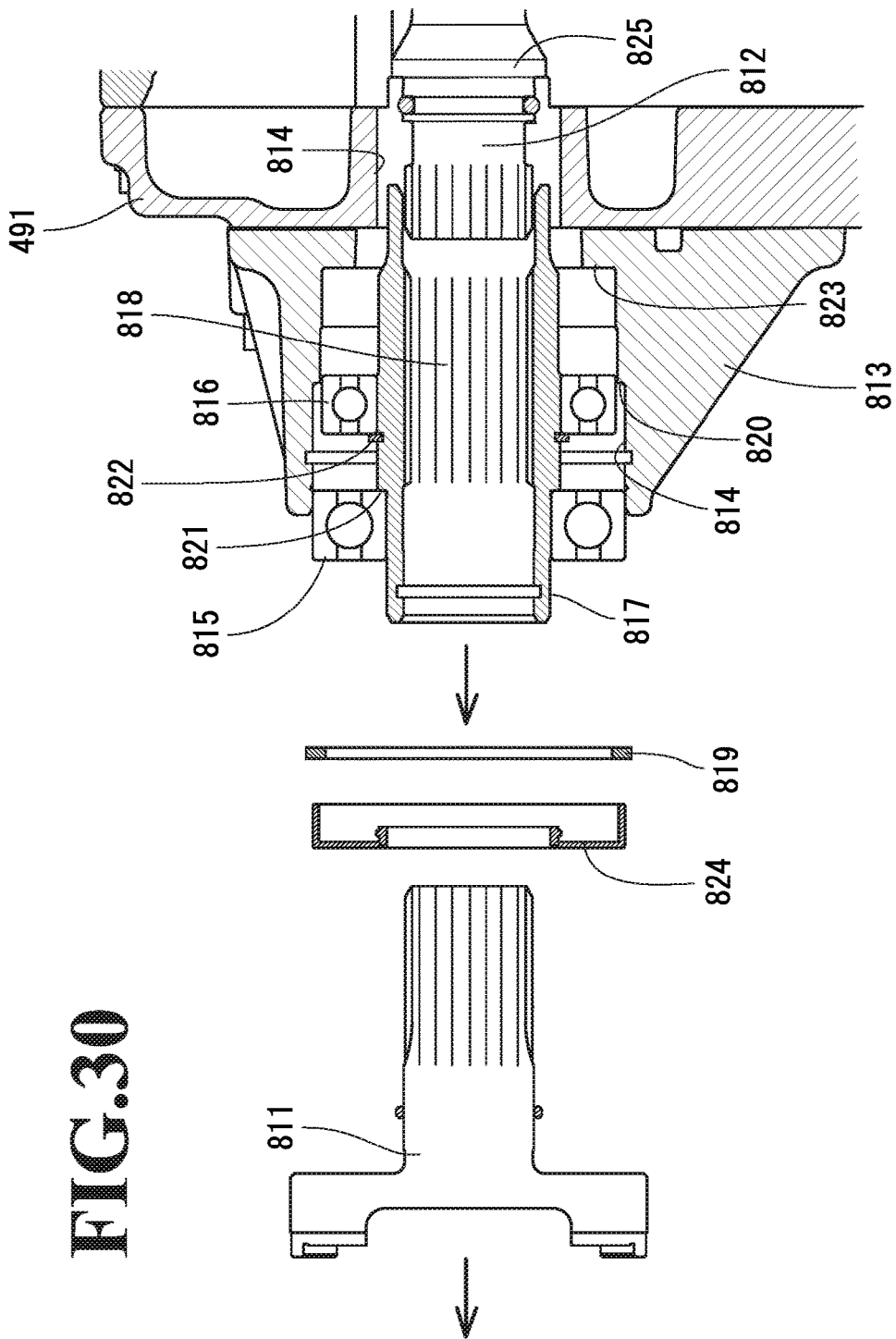
FIG. 30 is a cross-sectional view of a separated state illustrating how a front input shaft is pulled out.
Figure 31:
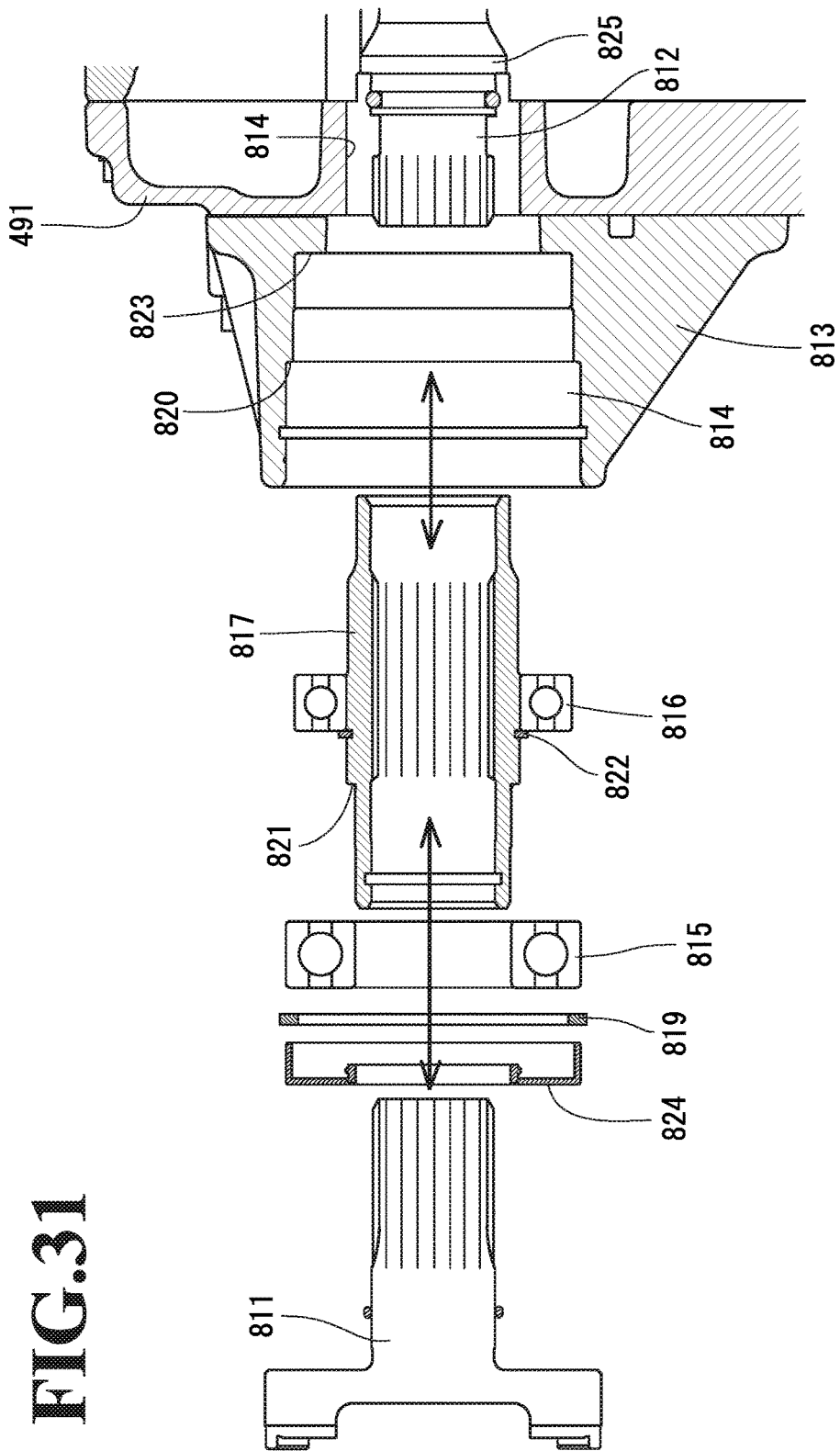
FIG. 31 is a cross-sectional view of a separated state illustrating the front input shaft, a bearing member, and a coupling.

As is apparent from the above description and FIG. 29 to FIG. 31, the main transmission input shaft 28 with which the driving force is transmitted into the transmission case 17 from the driving force transmission shaft 29 is provided. The main transmission input shaft 28 is formed of separate components including: the front input shaft 811 protruding forward from the front lid member 491; and the rear input shaft 812 in the transmission case 17. The coupling 817 is rotatably fit in the insertion hole 814, in the form of the through hole formed in the front lid member 491 in the front and rear direction, via the bearing members 815 and 816. The front input shaft 811 and the rear input shaft 812 are coupled to each other in such a manner as to be slidable in the front and rear direction but not rotatable with respect to each other. The front input shaft 811, the bearing members 815 and 816, and the coupling 817 can be pulled out in the forward direction with the rear input shaft 812 remaining in the transmission case 17. Thus, the unit including the front input shaft 811, the bearing members 815 and 816, and the coupling 817 can be detachably attached to the front lid member 491 of the transmission case 17. For example, when the maintenance work such as cleaning of the portion around the main transmission input shaft 28 is performed, the input unit including the front input shaft 811, the bearing members 815 and 816, and the coupling 817 can be easily replaced with the rear input shaft 812 remaining in the transmission case 17. Thus, even when the bearing members 815 and 816 and the like are damaged by muddy water entering from the side of the front input shaft 815, the transmission case 17 needs not to be disassembled. Instead, only the input unit including the front input shaft 811, the bearing members 815 and 816, and the coupling 817 needs removed to be replaced or for performing cleaning. All things considered, much higher assemblability/disassemblability of the driving force input system with respect to the transmission case 17 can be achieved.

The configuration of the portions in the present invention is not limited to that in the illustrated embodiment, and can be changed in various ways without departing from the gist of the present invention.

The embodiment of the present invention relates to a work vehicle including a work vehicle for farming such as a tractor and a special work vehicle such as a crane truck, for example.

What is claimed is:

1. A work vehicle comprising:
an engine installed in a traveling machine body supported by a traveling unit; and
a transmission case incorporating a hydraulic continuously variable transmission configured to shift driving force from the engine,
wherein the transmission case incorporates a forward/backward traveling switching mechanism configured to switch an output from the hydraulic continuously variable transmission between normal rotation and reverse rotation directions,
wherein the engine is installed in a front portion of a frame member forming the traveling machine body,
wherein the transmission case is coupled to a rear portion of the frame member,
wherein the engine and the transmission case are coupled to each other in a driving-force transmittable manner via a driving force transmission shaft,
wherein the work vehicle further comprises:
a forward traveling valve for a forward traveling hydraulic clutch configured to enable and disable a normal rotation output transmitted toward the traveling unit;
a backward traveling valve for a backward traveling hydraulic clutch configured to enable and disable a reverse rotation output transmitted toward the traveling unit; and
a master valve configured to control hydraulic oil supplying to the forward traveling valve and the backward traveling valve,
wherein a part of a hydraulic circuit establishing connection between a hydraulic pressure source and the hydraulic clutches is formed on a front lid member that is detachably attached to close a front surface opening of the transmission case, and
wherein the forward traveling valve, the backward traveling valve, and the master valve are attached on a front surface side of the front lid member.

2. The work vehicle according to claim 1,
wherein the forward traveling valve, the backward traveling valve, and the master valve are assembled to an oil path block to form a unit, and
wherein the oil path block is attached to the front surface side of the front lid member.

3. The work vehicle according to claim 1, wherein the forward traveling hydraulic clutch and the backward traveling hydraulic clutch of the forward/backward traveling switching mechanism are disposed on a front side in the transmission case.

4. The work vehicle according to claim 1, further comprising a main transmission input shaft with which driving force is transmitted into the transmission case from the driving force transmission shaft,
wherein the main transmission input shaft is formed of separate sections including: a front input shaft protruding forward from the front lid member; and a rear input shaft in the transmission case,
wherein a coupling is rotatably fit in an insertion hole, in a form of a through hole formed in the front lid member in a front and rear direction, via a bearing member,
wherein the front input shaft and the rear input shaft are coupled to the coupling in such a manner as to be slidable in the front and rear direction and to be not relatively rotatable, and
wherein the front input shaft, the bearing member, and the coupling are able to be pulled out in a forward direction with the rear input shaft remaining in the transmission case.

5. The work vehicle according to claim 4,
wherein a rear end side of the coupling is in contact with a flange portion of the rear input shaft, and
wherein the coupling is detachably held by the front lid member together with the bearing member with a stopper ring that contacts a front end side of the bearing member fit on an inner circumference side of the insertion hole.

6. The work vehicle according to claim 1,
wherein the transmission case incorporates a two-wheel drive/four-wheel drive switching mechanism configured to switch between two wheel drive and four wheel drive of four front and rear wheels as the traveling unit,
wherein the work vehicle comprises:
a double speed valve for a double speed hydraulic clutch forming the two-wheel drive/four-wheel drive switching mechanism; and
a four-wheel drive valve for a four-wheel drive hydraulic clutch forming the two-wheel drive/four-wheel drive switching mechanism, and
wherein the double speed valve and the four-wheel drive valve are disposed at positions on one of left and right side surfaces of the transmission case overlapping with the double speed hydraulic clutch and the four-wheel drive hydraulic clutch in side view.

7. The work vehicle according to claim 6,
wherein the transmission case is divided into three sections including a front case, an intermediate case, and a rear case,
wherein the double speed hydraulic clutch and the four-wheel drive hydraulic clutch are disposed in the front case, and
wherein the double speed valve and the four-wheel drive valve are attached to one of left and right surfaces of the front case.

8. The work vehicle according to claim 7,
wherein the engine is installed in the front portion of the frame member forming the traveling machine body,
wherein the intermediate case of the transmission case is coupled to the rear portion of the frame member,
wherein a recess portion recessed inward in a left and right direction is formed on one of left and right sides of the front case,
wherein the double speed valve and the four-wheel drive valve are attached to the recessed portion, and
wherein the double speed valve and the four-wheel drive valve have outer sides in the left and right direction covered with the frame member on one of left and right sides.

9. The work vehicle according to claim 1, further comprising rear traveling units provided on left and right sides of the transmission case via rear axle cases,
wherein left and right brake mechanisms with which a braking operation is performed on the left and right rear traveling units are disposed in the transmission case,
wherein a hydraulic lifting and lowering mechanism is installed on an upper surface of the transmission case,
wherein the work vehicle further comprises:
a pair of brake cylinders with which the brake mechanisms perform the braking operation; and
a pair of auto brake valves configured to control hydraulic oil supplying to the brake cylinders, wherein the pair of brake cylinders and the pair of auto brake valves are assembled to a brake control case to form a unit, and wherein the brake control case is disposed on a portion of the upper surface of the transmission case more on a front side than the hydraulic lifting and lowering mechanism.

10. The work vehicle according to claim 9, wherein the transmission case is divided into three sections including a front case, an intermediate case, and a rear case, and wherein the brake control case is attached on a front portion of an upper surface of the rear case.

11. The work vehicle according to claim 1, wherein the transmission case incorporates: a PTO transmission mechanism with which driving force from the engine is shifted and transmitted to a PTO shaft protruding rearward from the transmission case; and a PTO hydraulic clutch configured to enable and disable transmission of the driving force to the PTO transmission mechanism, wherein the work vehicle further comprises a PTO valve with which the PTO hydraulic clutch is operated, and wherein the PTO valve is disposed at a position on one of left and right side surfaces of the transmission case overlapping with the PTO hydraulic clutch in side view.

12. The work vehicle according to claim 11, wherein the transmission case is divided into three sections including a front case, an intermediate case, and a rear case, wherein the PTO hydraulic clutch and the PTO transmission mechanism are disposed in the rear case, and wherein the PTO valve is attached to one of left and right surfaces of the rear case.

* * * * *